(12) United States Patent
Hatton et al.

(10) Patent No.: US 12,454,472 B2
(45) Date of Patent: Oct. 28, 2025

(54) TARGET SPECIES RECOVERY AND RELATED SYSTEMS AND METHODS

(71) Applicant: Massachusetts Institute of Technology, Cambridge, MA (US)

(72) Inventors: Trevor Alan Hatton, Sudbury, MA (US); Xiao Su, Urbana, IL (US); Cameron G. Halliday, Wokingham (GB)

(73) Assignee: Massachusetts Institute of Technology, Cambridge, MA (US)

( * ) Notice: Subject to any disclaimer, the term of this patent is extended or adjusted under 35 U.S.C. 154(b) by 938 days.

(21) Appl. No.: 17/272,007

(22) PCT Filed: Aug. 28, 2019

(86) PCT No.: PCT/US2019/048463
§ 371 (c)(1),
(2) Date: Feb. 26, 2021

(87) PCT Pub. No.: WO2020/047032
PCT Pub. Date: Mar. 5, 2020

(65) Prior Publication Data
US 2022/0119283 A1    Apr. 21, 2022

Related U.S. Application Data

(60) Provisional application No. 62/725,143, filed on Aug. 30, 2018, provisional application No. 62/723,914, filed on Aug. 28, 2018.

(51) Int. Cl.
*C02F 1/469*    (2023.01)
*C02F 1/461*    (2023.01)
(Continued)

(52) U.S. Cl.
CPC ............ *C02F 1/469* (2013.01); *C02F 1/4691* (2013.01); *C02F 2001/46138* (2013.01);
(Continued)

(58) Field of Classification Search
CPC .............. C02F 2101/20; C02F 2101/22; C02F 2101/103; C02F 2001/46138;
(Continued)

(56) References Cited

U.S. PATENT DOCUMENTS 6,709,567 B1    3/2004    Sale et al.
2011/0162965 A1*    7/2011    Kim ...................... C02F 1/4691
204/632

(Continued)

FOREIGN PATENT DOCUMENTS

WO    WO 2017/075263 A1    5/2017

OTHER PUBLICATIONS

Frenzel et al. "Electrochemical reduction of dilute chromate solutions on carbon felt electrodes" J. Appl. Electrochem. 2006, 36, 323-332 (Year: 2006).*

(Continued)

*Primary Examiner* — Luan V Van
*Assistant Examiner* — Alexander R. Parent
(74) *Attorney, Agent, or Firm* — Wolf, Greenfield & Sacks, P.C.

(57) ABSTRACT

The recovery of target species, and related systems and methods, are generally described.

18 Claims, 49 Drawing Sheets

(51) Int. Cl.
*C02F 101/00* (2006.01)
*C02F 101/10* (2006.01)
*C02F 101/20* (2006.01)
*C02F 101/22* (2006.01)

(52) U.S. Cl.
CPC .... *C02F 2101/006* (2013.01); *C02F 2101/10* (2013.01); *C02F 2101/103* (2013.01); *C02F 2101/20* (2013.01); *C02F 2101/22* (2013.01); *C02F 2209/06* (2013.01)

(58) Field of Classification Search
CPC ...... C02F 1/4691; C02F 1/4678; C02F 1/469; C02F 1/4693; C02F 1/4695; C02F 1/4696; C02F 1/4698; C25B 1/00; C25B 1/01; C25B 1/22; C25B 1/50
USPC .......................................................... 205/357
See application file for complete search history.

(56) References Cited

U.S. PATENT DOCUMENTS

| | | | |
|---|---|---|---|
| 2012/0199486 A1* | 8/2012 | Kang | C02F 1/4691 427/126.3 |
| 2017/0113951 A1* | 4/2017 | Su | C02F 1/469 |

OTHER PUBLICATIONS

Manning et al. "Spectroscopic Investigation of Cr(III)- and Cr(VI)-Treated Nanoscale Zerovalent Iron" Environ. Sci. Technol. 2007, 41, 586 (Year: 2007).*

Hu et al. "Nitrate electro-sorption/reduction in capacitive deionization using a novel Pd/NiAl-layered metal oxide film electrode" Chemical Engineering Journal 335 (2018) 475-482 (Year: 2017).*

Farmer et al. ("Electrosorption of Chromium Ions on Carbon Aerogel Electrodes as a Means of Remediating Ground Water." Energy & Fuels 1997, 11, 337-347) (Year: 1997).*

Fan et al. ("Electro-removal of arsenic(III) and arsenic(V) from aqueous solutions by capacitive deionization" Journal of Hazardous Materials 312 (2016) 208-215) (Year: 2016).*

Jerkiewicz ("Standard and Reversible Hydrogen Electrodes: Theory, Design, Operation, and Applications" ACS Catal. 2020, 10, 8409-8417) (Year: 2020).*

International Preliminary Report on Patentability for International Application No. PCT/US2019/048463, mailed Mar. 11, 2021.

Ahualli et al., Use of Soft Electrodes in Capacitive Deionization of Solutions. Environ Sci Technol. May 2, 2017;51(9):5326-5333. doi: 10.1021/acs.est.6b06181. Epub Apr. 3, 2017.

Alsbaiee et al., Rapid removal of organic micropollutants from water by a porous β-cyclodextrin polymer. Nature. Jan. 14, 2016;529(7585):190-4. doi: 10.1038/nature16185. Epub Dec. 21, 2015. Methods included. 17 pages total.

Bruckenstein et al., Time-Resolved Mono-anion, Di-anion, and Solvent Transfers into a Poly(vinylferrocene)-Modified Electrode. Journal of the Electrochemical Society. 1998;145(2):L24-6.

Carlin et al., Polymer Films on Electrodes: XVI. In Situ Ellipsometric Measurements of Polybipyrazine, Polyaniline, and Polyvinylferrocene Films. J. Electrochem. Soc. 1985;132:353-9.

Dixit et al., Comparison of arsenic(V) and arsenic(III) sorption onto iron oxide minerals: implications for arsenic mobility. Environ Sci Technol. Sep. 15, 2003;37(18):4182-9. doi: 10.1021/es030309t.

Elimelech et al., The future of seawater desalination: energy, technology, and the environment. Science. Aug. 5, 2011;333(6043):712-7. doi: 10.1126/science.1200488.

Farmer et al., Electrosorption of Chromium Ions on Carbon Aerogel Electrodes as a Means of Remediating Ground Water. Energy Fuels. 1997;11(2):337-47. Epub Mar. 19, 1997.

Fendorf et al., Kinetics of Chromate Reduction by Ferrous Iron. Environ. Sci. Technol. 1996;30(5):1614-7. Epub Apr. 25, 1996.

Fishman et al., Accuracy of exchange-correlation functionals and effect of solvation on the surface energy of copper. Physical Review B. 2013;87:245402. Epub Jun. 3, 2013. 7 pages.

Frenzel et al., Electrochemical reduction of dilute chromate solutions on carbon felt electrodes. Journal of Applied Electrochemistry. 2006;36:323-32. Epub Nov. 24, 2005.

Glidle et al., Use of neutron reflectivity to measure the dynamics of solvation and structural changes in polyvinylferrocene films during electrochemically controlled redox cycling. Langmuir. 2009;25:4093-103. Epub Dec. 29, 2008.

Grimme et al., A consistent and accurate ab initio parametrization of density functional dispersion correction (DFT-D) for the 94 elements H-Pu. J Chem Phys. Apr. 21, 2010;132(15):154104. doi: 10.1063/1.3382344. 19 pages.

Hu et al., Removal and recovery of Cr(VI) from wastewater by maghemite nanoparticles. Water Res. Nov. 2005;39(18):4528-36. doi: 10.1016/j.watres.2005.05.051. Epub Sep. 15, 2005.

Huang et al., Adsorption of Chromium(VI) from Aqueous Solutions Using Cross-Linked Magnetic Chitosan Beads. Ind. Eng. Chem. Res. 2009;48(5):2646-51. Epub Feb. 5, 2009.

Jarup, Hazards of heavy metal contamination. British Medical Bulletin. Dec. 2003;68:167-82.

Jureviciute et al., Counter-ion specific effects on charge and solvent trapping in poly(vinylferrocene) films. Journal of Electroanalytical Chemistry. 2000;488(1):73-81.

Kikuchi et al., Changes in aquatic toxicity of potassium dichromate as a function of water quality parameters. Chemosphere. Mar. 2017;170:113-117. doi: 10.1016/j.chemosphere.2016.11.158. Epub Dec. 2, 2016.

Kim et al., Low Energy Desalination Using Battery Electrode Deionization. Environ. Sci. Technol. Lett. 2017;4(10):444-9. Epub Sep. 21, 2017.

Kresse et al., Efficient iterative schemes for ab initio total-energy calculations using a plane-wave basis set. Phys Rev B Condens Matter. Oct. 15, 1996;54(16):11169-11186. doi: 10.1103/physrevb.54.11169.

Kresse et al., From ultrasoft pseudopotentials to the projector augmented-wave method. Phys. Rev. B. 1999;59:1758-75. Epub Jan. 15, 1999.

Kushima et al., Charging/Discharging Nanomorphology Asymmetry and Rate-Dependent Capacity Degradation in Li-Oxygen Battery. Nano Lett. Dec. 9, 2015;15(12):8260-5. doi: 10.1021/acs.nanolett.5b03812. Epub Nov. 10, 2015.

Kushima et al., Liquid cell transmission electron microscopy observation of lithium metal growth and dissolution: Root growth, dead lithium and lithium flotsams. Nano Energy. 2017;32:271-9. Epub Dec. 7, 2016.

Lee et al., Hybrid capacitive deionization to enhance the desalination performance of capacitive techniques. Energy & Environmental Science. 2014;7:3683-9. Epub Aug. 20, 2014. Author manuscript provided. 7 pages.

Liu et al., Review on carbon-based composite materials for capacitive deionization. RSC Adv. 2015;5:15205-25. Epub Jan. 15, 2015.

Mandal et al., Arsenic round the world: a review. Talanta. Aug. 16, 2002;58(1):201-35.

Manning et al., Spectroscopic Investigation of Cr(III)- and Cr(VI)-Treated Nanoscale Zerovalent Iron. Environ. Sci. Technol. 2007;41(2):586-92. Epub Dec. 7, 2006.

Mao et al., Polyvinylferrocene for noncovalent dispersion and redox-controlled precipitation of carbon nanotubes in nonaqueous media. Langmuir. Aug. 6, 2013;29(31):9626-34. doi: 10.1021/la401440w. Epub Jul. 24, 2013.

Mathew et al., Implicit solvation model for density-functional study of nanocrystal surfaces and reaction pathways. J. Chem. Phys. 2014;140:084106. Epub Feb. 26, 2014. 8 pages.

Mizunuma et al., Investigation of ion and solvent transport accompanying redox reactions of polyvinylferrocene films using an in situ electrochemical quartz crystal microbalance technique. Bull. Chem. Soc. Jpn. Oct. 1991;64:2887-93.

Nakahama et al., The effect of composition of a ferrocene-containing redox polymer on the electrochemistry of its thin film coatings on electrodes. J. Electroanal. Chem. 1983; 158:303-22.

(56) References Cited

OTHER PUBLICATIONS

Nakano et al., Adsorption mechanism of hexavalent chromium by redox within condensed-tannin gel. Water Res. Feb. 2001;35(2):496-500. doi: 10.1016/s0043-1354(00)00279-7.

National Research Council, Alternatives for Ground Water Cleanup. The National Academies Press. Washington, DC. 1994:334 pages.

Niu et al., In situ observation of random solid solution zone in $LiFePO_4$ electrode. Nano Lett. Jul. 9, 2014;14(7):4005-10. doi: 10.1021/nl501415b. Epub May 13, 2014.

Pater et al., Film mass and volume changes accompanying redox-driven solvent and salt transfer during redox switching of polyvinylferrocene films. J. Chem. Soc. Faraday Trans. 1998;94:1097-103.

Patterson et al., Reduction of Hexavalent Chromium by Amorphous Iron Sulfide. Environ. Sci. Technol. 1997;31(7):2039-44. Epub Jun. 30, 1997.

Rana-Madaria et al., Removal of Chromium from Aqueous Solutions by Treatment with Carbon Aerogel Electrodes Using Response Surface Methodology. Ind. Eng. Chem. Res. 2005;44(17):6549-59. Epub Jul. 23, 2005.

Recillas et al., Chromium VI adsorption on cerium oxide nanoparticles and morphology changes during the process. J Hazard Mater. Dec. 15, 2010;184(1-3):425-431. doi: 10.1016/j.jhazmat.2010.08.052. Epub Aug. 21, 2010.

Rengaraj et al., Removal of chromium from water and wastewater by ion exchange resins. J Hazard Mater. Oct. 12, 2001;87(1-3):273-87. doi: 10.1016/s0304-3894(01)00291-6.

Santhosh et al., Magnetic $SiO2@CoFe2O4$ nanoparticles decorated on graphene oxide as efficient adsorbents for the removal of anionic pollutants from water. Chem. Eng. J. Aug. 15, 2017;322:472-87.

Sharma et al., Groundwater contaminated with hexavalent chromium [Cr (VI)]: a health survey and clinical examination of community inhabitants (Kanpur, India). PLoS One. 2012;7(10):e47877. doi: 10.1371/journal.pone.0047877. Epub Oct. 24, 2012. 7 pages.

Su et al., Anion-Selective Redox Electrodes: Electrochemically Mediated Separation with Heterogeneous Organometallic Interfaces. Advanced Functional Materials. May 2016;26(20):3394-404. Epub Apr. 23, 2016.

Su et al., Asymmetric Faradaic systems for selective electrochemical separations. Energy & Environmental Science. 2017;10:1272-83. Epub Apr. 18, 2017.

Su et al., Electrochemically-mediated selective capture of heavy metal chromium and arsenic oxyanions from water. Nature Communications. 2018;9:4701. 9 pages.

Su et al., Electrosorption at functional interfaces: from molecular-level interactions to electrochemical cell design. Physical Chemistry Chemical Physics. 2017;35:23570-84. Epub Jun. 29, 2017.

Su et al., Redox-electrodes for selective electrochemical separations. Advances in Colloid and Interface Science. 2017;244:6-20. Epub Sep. 9, 2016.

Suss et al., Water desalination via capacitive deionization: what is it and what can we expect from it? Energy & Environmental Science. 2015;8:2296-319. Epub May 5, 2015.

Tang et al., A grid-based Bader analysis algorithm without lattice bias. J Phys Condens Matter. Feb. 25, 2009;21(8):084204. doi: 10.1088/0953-8984/21/8/084204. Epub Jan. 30, 2009. 7 pages.

Zhao et al., Energy consumption and constant current operation in membrane capacitive deionization. Energy & Environmental Science. 2012;11:9520-7. Epub Jul. 5, 2012.

International Search Report and Written Opinion from corresponding International Patent Application No. PCT/US2019/048463, mailed Nov. 21, 2019.

Su, et al. "Electrochemically-mediated selective capture of heavy metal chromium and arsenic oxyanions from water," Nature Communications, 9, Article No. 4701. Published online Nov. 8, 2018.

\* cited by examiner

| Oxyanions & Relevant Competing Anions | State at ~1.1V vs SHE | State at ~0V vs SHE | State Prior | State After |
|---|---|---|---|---|
| Cl | $Cl^-/ClO_4^-$ | $Cl^-/ClO_4^-$ | - | - |
| Br | $Br^-$ | $Br^-$ | - | - |
| S | $SO_4^{2-}$ | $SO_4^{2-}$ | - | - |
| Se | $SeO_4^{2-}$ | $Se$ | 6 | 0 |
| N | $NO_3^-$ | $NO_3^-$ | - | - |
| P | $PO_4^{3-}$ | $PO_4^{3-}$ | - | - |
| As | $HAsO_4^{2-}/H_2AsO_4^-$ | $HAsO_4^{2-}/H_2AsO_4^-$ | - | - |
| Sb | $Sb(OH)_6^-$ | $Sb(OH)_6^- / Sb(OH)_6$ | 5 | 5 / 4 |
| Tc | $TcO_4^-$ | $TcO(OH)_2$ | 7 | 4 |
| Cr | $CrO_4^{2-} / HCrO_4^-$ | $Cr^{3+}$ | 6 | 3 |
| Mo | $MoO_4^{2-}$ | $MoO_4^{2-}$ | - | - |
| W | $WO_4^{2-}$ | $WO_4^{2-}$ | - | - |
| V | $VO_2(OH)^{2-}$ | $VO_2(OH)^{2-} / VO^{2+}$ | 5 | 5 / 4 |

Figure 26

TARGET SPECIES RECOVERY AND RELATED SYSTEMS AND METHODS

RELATED APPLICATIONS

This application is a national stage filing under 35 U.S.C. § 371 of International Patent Application No. PCT/US2019/048463, filed Aug. 28, 2019, and entitled "Target Species Recovery and Related Systems and Methods," which claims priority under 35 U.S.C. § 119 (e) to U.S. Provisional Patent Application No. 62/723,914, filed Aug. 28, 2018, and entitled "Electrochemically-Mediated Recovery, and/or Remediation, of Heavy Metals Using Faradaic Polymers," and to U.S. Provisional Patent Application No. 62/725,143, filed Aug. 30, 2018, and entitled "Target Species Recovery and Related Systems and Methods," each of which is incorporated herein by reference in its entirety for all purposes.

TECHNICAL FIELD

The recovery of target species, and related systems and methods, are generally described.

SUMMARY

Target species recovery and related systems and methods are generally described. The subject matter of the present invention involves, in some cases, interrelated products, alternative solutions to a particular problem, and/or a plurality of different uses of one or more systems and/or articles.

Certain embodiments are directed to a method. In some embodiments, the method comprises applying an electrical potential across a first electrode comprising a first conductive substrate and a first redox species immobilized to the first conductive substrate and a second electrode, such that a target species comprising a heavy metal, a transition metal, and/or a metalloid is adsorbed on the first electrode. In some embodiments, the method further comprises releasing the target species from the first electrode such that, after the release, the heavy metal, transition metal, and/or metalloid has an oxidation state that is different from the oxidation state of the heavy metal, transition metal, and/or metalloid just prior to the adsorption of the target species on the first electrode.

Certain aspects are related to electrochemical systems. In some embodiments, the electrochemical system comprises a first electrode comprising a first conductive substrate and a first redox species immobilized to the first conductive substrate, wherein the first redox species is selective toward a target species; and a second electrode; wherein the target species comprises a heavy metal, a transition metal, and/or a metalloid.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 26 is a table indicating anions (e.g., oxyanions) that could be adsorbed by electrodes (e.g., electrodes comprising PVF) under neutral pH, according to some embodiments.

DETAILED DESCRIPTION

Figure 1A:
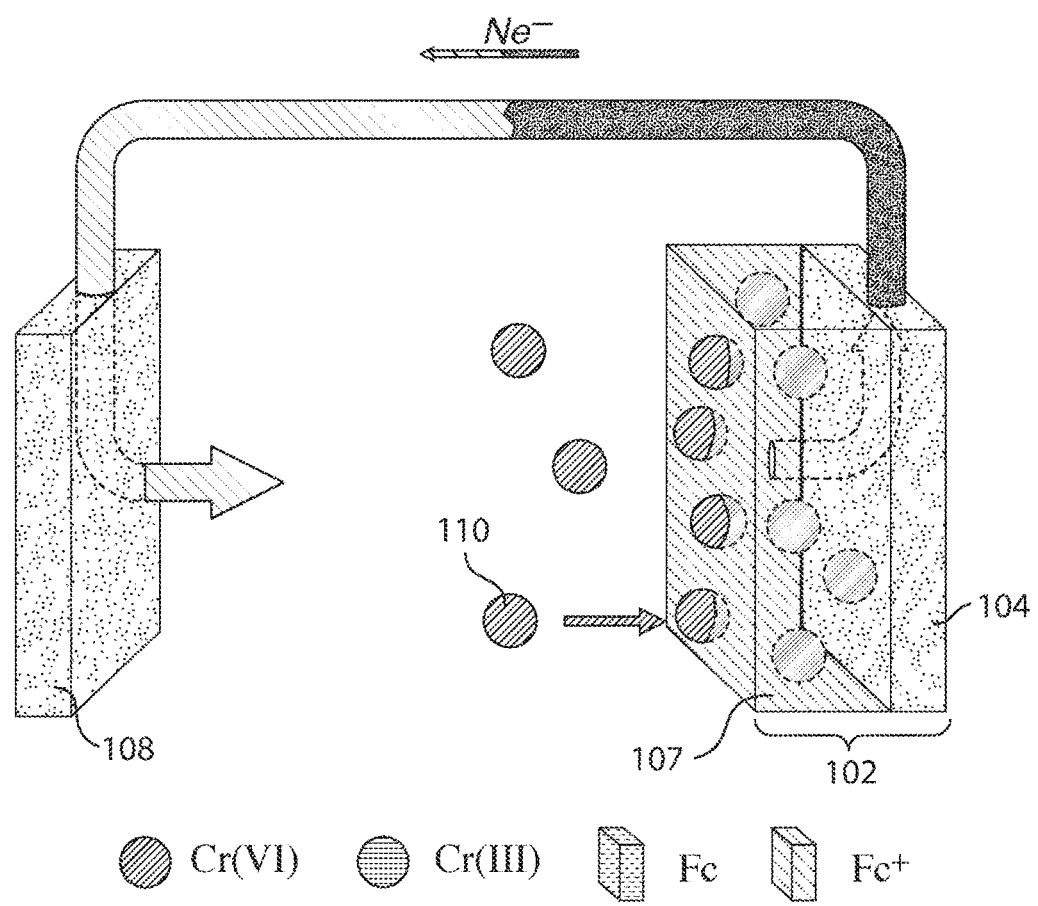
FIG. 1A is a schematic diagram of a method involving adsorbing a target species on a first electrode, according to some embodiments.

The present disclosure is directed to the electrochemical recovery of target species. In certain embodiments, the recovered species may be electrochemically converted (e.g., such that the oxidation state of a heavy metal, a metalloid, and/or a transition metal within the target species is altered).

Certain aspects are related to an electrochemical separation device with redox-functionalized electrode(s) tuned to selectively interact with target species comprising a heavy metal, a transition metal, and/or a metalloid. The selective interaction can occur, for example, during modulation of an electrical potential applied to the electrodes, thereby separating the target species from solution. In one example, a redox species that is selective toward a target electron donating portion of the target species (e.g., a heavy metal, a transition metal, and/or a metalloid that donates one or more electrons) of an anion is immobilized to an anodic electrode. Upon application of an electrical potential, in accordance with certain embodiments, the redox species of the anodic electrode is oxidized, which captures target anions through the target electron donating functional group of the target anions. In some embodiments where the redox species is a metallocene, the selectivity relies on the direct interaction of the target anion with the cyclopentadienyl ring of the metallocene. The captured target anions can be subsequently released or desorbed by reversal (partial or complete, including V=0) of the applied electrical potential. In some embodiments, the release is accompanied by a change in pH. In some such embodiments, the release is accompanied by a change in oxidation state of the heavy metal, the transition metal, and/or the metalloid of the target species.

Certain embodiments are related to the successful use of Faradaic metallopolymers for separation of heavy metals, transition metals, and/or metalloids for water purification and recovery. Some embodiments are related to the use of Faradaic metallopolymers for the recovery of dissolved ions (e.g., dissolved heavy metal ions, dissolved transition metal ions, and/or dissolved metalloid ions) from metal processing. Certain embodiments are related to the use of Faradaic metallopolymers for the mining of metals (e.g., through "leaching" processes). Certain embodiments are related to the use of redox-active metallopolymer electrodes (including, but not limited to, those including poly(vinyl)ferrocene) for the selective removal of chromium and arsenic from water upon electrochemical oxidation of the electrode. In some embodiments, an uptake greater than 100 mg Cr/g adsorbent can be achieved. In some embodiments, a reversible working capacity of more than 99% can be achieved. In some embodiments, the interaction is controlled solely by electrochemical potential, in the presence of excess chloride and other competing ions.

Certain embodiments are related to the use of these Faradaic systems for environmental remediation. For example, certain embodiments are related to the adsorption of a toxic metal, and the release of that toxic metal as a less harmful species. As one non-limiting example, chromium bound ions can be released, in some embodiments, in the less harmful trivalent form under a reduction potential for the polymer electrode.

Certain embodiments are related to the use of Faradaic polymers for valuable metal recovery, selectively. Certain embodiments are related to the use of the systems and methods described herein to solutions containing heavy metal oxyanions (and/or metalloid oxyanions, and/or transition metal oxyanions). Examples of such oxyanions include, but are not limited to those of environmental concern (e.g., arsenic) and/or those for value-added recovery (e.g., vanadium). Metals encompass a wide range of transition metals, including chromium, tungsten, vanadium, and molybdenum, among others.

Certain embodiments are related to the utilization of a charge-transfer based mechanism for selective recovery of heavy metal ions (and/or metalloid ions, and/or transition metal ions) using polymers. Without wishing to be bound by any particular theory, underlying mechanisms for molecular selectivity were investigated through electronic structure calculations, indicating a strong charge transfer to oxyanions which correlated with the strength of molecular binding.

According to some aspects, methods are provided. In some embodiments, the method comprises applying an electrical potential across a first electrode and a second electrode. The first electrode can comprise, in some embodiments, a first conductive substrate and a first redox species immobilized to the first conductive substrate. Examples of materials that can be used to make all or a part of the first conductive substrate and the first redox species are described in more detail below. As one non-limiting example, the first conductive substrate can comprise carbon nanotubes, and the first redox species can comprise a metallopolymer (e.g., a metallopolymer comprising ferrocene). In accordance with certain embodiments, the redox species can be selected, modified, or otherwise configured to selectively interact with a target species. The interaction between the redox species and the target species may be activated, in some embodiments, by a Faradaic/redox reaction. Examples of such target species are described elsewhere herein. In some embodiments, the electrical potential can be applied such that a target species comprising a heavy metal, a transition metal, and/or a metalloid is adsorbed on the first electrode. The adsorption can be achieved, according to certain embodiments, due to a Faradaic/redox reaction between the redox species of the electrode and the target species.

Certain embodiments comprise releasing the target species from the first electrode. In some embodiments, the release of the target species can be achieved by modifying the electric potential that is applied between the electrodes. In some embodiments, after the release, the heavy metal, transition metal, and/or metalloid has an oxidation state that is different from the oxidation state of the heavy metal, transition metal, and/or metalloid just prior to the adsorption of the target species on the first electrode. In some embodiments, the heavy metal, transition metal, and/or metalloid has an oxidation state after release such that the toxicity of the target species after release is less than the toxicity of the target species before adsorption. In some cases, the target species can be toxic prior to adsorption and non-toxic after release.

In some embodiments, the heavy metal, transition metal, and/or metalloid has an oxidation state after release such that the economic value of the target species after release is greater than the economic value of the target species before adsorption. In some cases, the target species in its oxidation state prior to adsorption can be uneconomical to recover, but after its release, its new oxidation state makes it economical to recover.

In addition to inventive methods, inventive electrochemical systems are also provided. In some embodiments, an electrochemical system comprises a first electrode and a second electrode. As noted above, the first electrode can comprise a first conductive substrate and a first redox species immobilized to the first conductive substrate. In some embodiments, the first redox species is selective toward a target species comprising a heavy metal, a transition metal, and/or a metalloid.

As noted above, certain aspects are related to inventive methods. In some embodiments, the method comprises applying an electrical potential across a first electrode and a second electrode. In some embodiments, the first electrode comprises a first conductive substrate and a first redox species immobilized to the first conductive substrate. In some embodiments, the electrical potential is less than 1.2 V vs. a standard hydrogen electrode (SHE). In some embodiments, the electrical potential is between or equal to 1.2 V and 0.8 V vs. SHE. In some embodiments, the electrical potential is between or equal to 1.2 V and 0.6 V vs. Ag/AgCl. A parameter is said to have a value that is "between or equal to" two values if the value of the parameter is between the two endpoints established by those values, or if the value of the parameter is either of those values. For example, an electrical potential is "between or equal to 1.2 V and 0.6 V" if that electrical potential is 0.6 V, 1.2 V, or any value between 0.6 V and 1.2 V.

In some embodiments, the method further comprises contacting the first electrode with a fluid source comprising a target species. In some embodiments, the fluid source comprises an electrolyte. In some embodiments, the method comprises applying an electrical potential across a first electrode and a second electrode such that a target species is adsorbed on the first electrode. In some embodiments, in addition to or in place of applying an electrical potential across the first electrode and the second electrode, the method comprises chronopotentiometrically charging a first electrode by applying a constant current across a first electrode and a second electrode of between or equal to 0.1 mA/cm$^2$ and 1 mA/cm$^2$ such that a target species is adsorbed on the first electrode.

In some embodiments, the first electrode comprises conductive carbon. In some embodiments, the conductive carbon comprises carbon nanotubes, carbon fibers, activated carbon, porous carbon, and/or carbon aerogel.

In some embodiments, the method comprises adsorbing between or equal to 10 mg and 200 mg (or between or equal to 20 mg and 200 mg, between or equal to 50 mg and 200 mg, or between or equal to 100 mg and 200 mg) of target species per gram of first redox species.

In some embodiments, the target species comprises a transition metal, a metalloid, and/or a heavy metal.

The "transition metal" elements are scandium (Sc), yttrium (Y), lanthanum (La), actinium (Ac), titanium (Ti), zirconium (Zr), hafnium (Hf), rutherfordium (Rf), vanadium (V), niobium (Nb), tantalum (Ta), dubnium (db), chromium (Cr), molybdenum (Mo), tungsten (W), seaborgium (Sg), manganese (Mn), technetium (Tc), rhenium (Re), bohrium (Bh), iron (Fe), ruthenium (Ru), osmium (Os), hassium (Hs), cobalt (Co), rhodium (Rh), iridium (Ir), meitnerium (Mt), nickel (Ni), palladium (Pd), platinum (Pt), darmstadtium (Ds), copper (Cu), silver (Ag), gold (Au), roentgenium (Rg), zinc (Zn), cadmium (Cd), mercury (Hg), and copernicium (Cn).

As used herein, the "metalloids" are boron (B), silicon (Si), germanium (Ge), arsenic (As), antimony (Sb), tellurium (Te), and Astatine (At).

As used herein, the term "heavy metal" is used to refer to the following elements: titanium, vanadium, chromium, manganese, iron, cobalt, nickel, copper, zinc, gallium, germanium, arsenic, zirconium, niobium, molybdenum, technetium, ruthenium, rhodium, palladium, silver, cadmium, indium, tin, tellurium, lutetium, hafnium, tantalum, tungsten, rhenium, osmium, iridium, platinum, gold, mercury, thallium, lead, bismuth, polonium, astatine, lanthanum, cerium, praseodymium, neodymium, promethium, samarium, europium, gadolinium, terbium, dysprosium, holmium, erbium, thulium, ytterbium, actinium, thorium, protactinium, uranium, neptunium, plutonium, americium, curium, berkelium, californium, einsteinium, fermium, nobelium, radium, lawrencium, rutherfordium, dubnium, seaborgium, bohrium, hassium, meitnerium, darmstadtium, roentgenium, and copernicium. As is evident from this list, certain metalloids (e.g., germanium, arsenic, tellurium, astatine) are considered heavy metals.

While target species comprising a transition metal, a metalloid, and/or a heavy metal are primarily described, other target species are also possible. In some embodiments, the target species comprises sulfur (e.g., a sulfate), nitrogen (e.g., a nitrate), and/or phosphorus (e.g., a phosphate). In each embodiment in which a transition metal, a metalloid, and/or a heavy metal are mentioned in the target species, sulfur, nitrogen, and/or phosphorus could be present (in addition to, or in place of, the transition metal, the metalloid, and/or the heave metal), in certain cases.

In some embodiments, the target species is capable of forming a stable oxyanion in water. In certain embodiments, the target species is capable of forming a stable oxyanion in water under ambient conditions.

In some embodiments, the target species comprises and/or is an anion. In some embodiments, the target species comprises and/or is an oxyanion (i.e., an anion that includes at least one oxygen atom). Exemplary target species include, but are not limited to, $Cr_2O_7^{2-}$, $CrO_4^{2-}$, $HCrO_4^-$, $H_2AsO_4^-$, $HAsO_4^{2-}$, $AlO^{2-}$, $AgO^-$, $HAuO_3^{2-}$, $HCoO_2^-$, $CuO_2^{2-}$, $FeO_4^{2-}$, $MnO_4^-$, $MnO_4^{2-}$, $Mn(OH)_3^-$, $SO_4^{2-}$, $SO_5^{2-}$, $HSO_5^-$, $SeO_4^{2-}$, $H_2SeO_4^-$, $SeO_3^{2-}$, $HSeO_3^-$, $NO_3^-$, $PO_4^{3-}$, $HPO_4^{2-}$, $H_2PO_4^-$, $H_2PO_3^{2-}$, $HPO_3^{2-}$, $H_2PO_2^-$, $ReO_4^-$, $Sb(OH)_6^-$, $Sb(OH)_4^-$, $Sc(OH)_4^-$, $TcO_4^-$, $TcO(OH)_3^{—-}$, $MoO_4^{2-}$, $HMoO_4^-$, $NbO_3^-$, $Ni(OH)_3^{—-}$, $UO_2(OH)_3^-$, $WO_4^{2-}$, $VO_2(OH)^{2-}$, $VO_3OH^{2-}$, and $ZnO_2^{2-}$. In some embodiments, the target species is and/or comprises a heavy metal oxyanion (HMOA).

In some embodiments, the target species comprises As, Sb, Tc, Cr, Mo, W, and/or V. In some embodiments, the target species comprises As, Cr, and/or V.

In some embodiments, the target species comprises any ionic variation of hexavalent chromium (VI). In some embodiments, the hexavalent chromium (VI) is present as $Cr_2O_7^{2-}$, $CrO_4^{2-}$, and/or $HCrO_4^-$.

In some embodiments, the target species is at a concentration of between or equal to 10,000 ppb and 100 ppb in the fluid source prior to applying the electric potential. In some embodiments, a salt competing with the target species for adsorption is at a concentration of between or equal to 1.1 times and 400 times (e.g., between or equal to 200 times and 400 times) that of the target species in the fluid source prior to applying the electric potential.

In some embodiments, the method comprises releasing the target species from the first electrode. In some embodiments, releasing the target species comprises applying a second electrical potential to the first electrode such that the target species is released from the first electrode. In some embodiments, the second electrical potential is between or equal to 0.3 V and −0.3 V vs. Ag/AgCl. In some embodiments, the second electrical potential is between or equal to 0.4 V and −0.4 V vs. SHE.

In some embodiments, releasing the target species comprises no potential applied to the first electrode such that the target species is released by diffusion from the first electrode.

In some embodiments, releasing the target species comprises releasing at least 60 wt %, at least 70 wt %, at least 80 wt %, at least 85 wt %, at least 90 wt %, at least 95 wt %, at least 99 wt %, or at least 99.9 wt % of the target species from the first electrode.

In some embodiments, after the release of the target species from the first electrode, the oxidation state of the transition metal element, the metalloid, and/or the heavy metal within the target species can be different from the oxidation state the transition metal element, the metalloid, and/or the heavy metal had just prior to adsorption. For example, in some embodiments in which the target species comprises a metalloid, the metalloid can have a first oxidation state just prior to adsorption onto the first electrode. The adsorption and release process, can, in some embodiments, change the oxidation state of the metalloid such that, after the target species is released, the metalloid has a different oxidation state than it had just prior to adsorption. As another example, in some embodiments in which the target species comprises a heavy metal, the heavy metal can have a first oxidation state just prior to adsorption onto the first electrode. The adsorption and release process, can, in some embodiments, change the oxidation state of the heavy metal such that, after the target species is released, the heavy metal has a different oxidation state than it had just prior to adsorption. As yet another example, in some embodiments in which the target species comprises a transition metal, the transition metal can have a first oxidation state just prior to adsorption onto the first electrode. The adsorption and release process, can, in some embodiments, change the oxidation state of the transition metal such that, after the target species is released, the transition metal has a different oxidation state than it had just prior to adsorption.

In some embodiments, after the release of the target species from the first electrode, the oxidation state of sulfur within the target species can be different from the oxidation state the sulfur had just prior to adsorption. In some embodiments, after the release of the target species from the first electrode, the oxidation state of phosphorus within the target species can be different from the oxidation state the phosphorus had just prior to adsorption. In some embodiments, after the release of the target species from the first electrode, the oxidation state of nitrogen within the target species can be different from the oxidation state the nitrogen had just prior to adsorption.

In some embodiments, the adsorption and release of the target species results in a reduction of the oxidation state of a metalloid, a heavy metal, and/or a transition metal within the target species.

Examples of oxidation state transitions include, but are not limited to: the transition from Se(VI) to Se(O); the transition from Sb(V) to Sb(IV); the transition of Cr(VI) to Cr(III); the transition of Tc(VII) to Tc(IV); the transition of V(V) to V(IV); the transition of As(VIII) to As(III); the transition of Co(III) to Co(II); the transition of Fe(VI) to Fe(II); the transition of Fe(VI) to Fe(III); the transition of Mn(VII) to Mn(II); the transition of Mn(VI) to Mn(II); the transition of Mn(IV) to Mn(II); the transition of S(VIII) to S(VI); the transition of P(V) to P(III); the transition of P(V) to P(I); the transition of P(III) to P(I); the transition of Re(VII) to Re(III); the transition of Se(VI) to Se(V); the transition of Se(VI) to Se(IV); the transition of Se(V) to Se(IV); the transition of Tc(V) to Tc(IV); the transition of Sb(V) to Sb(III); the transition of Sb(IV) to Sb(III); and/or the transition of any of V(VI), V(V), V(IV), and/or V(III) to V(V), V(IV), V(III), and/or V(II).

In some embodiments, the method comprises electrochemically transforming the target species by reduction or oxidation. In some embodiments, the method comprises electrochemically transforming an element of the target species (e.g., a heavy metal, a transition metal, and/or a metalloid) from a positive oxidation state to a lower positive oxidation state.

In some embodiments, after the release, the heavy metal, transition metal, and/or metalloid has an oxidation state that is different from the oxidation state of the heavy metal, transition metal, and/or metalloid just prior to the adsorption of the target species on the first electrode. In some embodiments, the target species comprises chromium in oxidation state VI, Cr(VI), just prior to its adsorption on the first electrode, and, after the target species has been released from the first electrode, the target species comprises Cr(III). In some embodiments, the target species comprises vanadium in oxidation state V, V(V), just prior to its adsorption on the first electrode, and, after the target species has been released from the first electrode, the target species comprises V(VI).

In some embodiments, the method further comprises altering the pH of a fluid in contact with the first electrode, such that the fluid has a first pH value prior to the adsorption of the target species on the first electrode and the fluid has a second pH value after the release of the target species. In some embodiments, the first pH value is different from the second pH value by at least 0.5 pH units, at least 1.0 pH units, at least 2.0 pH units, or at least 3.0 pH units (and/or, in some embodiments, up to 4.0 pH unit, up to 5.0 pH units, up to 6.0 pH units, up to 7.0 pH units, or more). In some embodiments, the first pH value is higher than the second pH value.

In some embodiments, the method comprises splitting water at the second electrode (e.g., via electrolysis). In some embodiments, the splitting of water at the second electrode generates protons and lowers the pH of the fluid in contact with the first electrode. In some embodiments, the lower pH encourages favorable speciation.

In some embodiments, the method comprises inhibiting (or preventing) the splitting of water at the second electrode to inhibit (or prevent) the generation of protons. In some such embodiments, this can sustain the pH of the fluid. In some embodiments the constant pH encourages favorable speciation.

As noted above, certain aspects are related to inventive electrochemical systems. In some embodiments, the electrochemical system comprises a first electrode. In some such embodiments, the first electrode comprises a first conductive substrate. In some embodiments, the first conductive substrate comprises conductive carbon. In some embodiments, the conductive carbon comprises carbon nanotubes, carbon fibers, activated carbon, and/or carbon aerogel. In some embodiments, the first electrode comprises a first redox species immobilized to the first conductive substrate. In some embodiments, the first redox species is a conductive polymer. Further examples of redox species are described below. In some embodiments, the conductive polymer is a redox-responsive polymer. In some embodiments, the conductive polymer is a metallopolymer and/or a conjugated organic polymer. In some embodiments, the metallopolymer is polyvinylferrocene. In some embodiments, the first electrode comprises polyvinylferrocene and carbon nanotubes.

In some embodiments, the first redox species is selective toward a target species (e.g., any of the target species described elsewhere herein).

In some embodiments, the electrochemical system comprises a second electrode. In some embodiments, the system is configured such that it is capable of adsorbing the target species when an electrical potential is applied across the first electrode and the second electrode. In some embodiments, the system is capable of releasing the target species in a different oxidation state when the electrical potential is altered. In some embodiments, the system is configured such that it is capable of adsorbing the target species when an electrical potential is applied across the first electrode and the second electrode, and it is capable of releasing the target species in a different oxidation state when the electrical potential is altered.

As used herein, an "electrochemical system" is a system that is configured to provide an electrical potential across electrodes to induce one or more chemical reactions at the electrodes. "Electrochemical reactions" are those reactions within the electrochemical system that, directly or indirectly, produce or consume electrons. Upon application of an electrical potential, the electrons generated by a voltage generator can be transferred between an anode and a cathode. Generally, electrochemical reactions include at least one oxidation reaction and at least one reduction reaction. In most cases, the oxidation electrochemical reaction generates electrons, and the reduction electrochemical reaction consumes electrons.

Generally, an "electrode" corresponds to a solid material within the electrochemical system at which a reduction or oxidation reaction can occur. An anode is an electrode at which oxidation occurs during application of an electrical potential, and a cathode is an electrode at which reduction occurs during application of an electrical potential.

The electrochemical system may also include, according to certain embodiments, other optional components such as, for example, an electrolyte (e.g., a liquid electrolyte which may, for example, facilitate the transport of ions between the electrodes of the electrochemical system during operation), a vessel (e.g., any suitable container), external electrical connections, and the like.

As used herein, the term "immobilized" refers to a redox species that is coupled, directly or indirectly, to an electrode is not able to move freely from one electrode to another electrode. The term "coupled" as used herein means to chemically associate one entity with another. A non-limiting example of a coupled entity is a coupled moiety. In some embodiments, the coupling is covalent. For example, metallocene is covalently attached to a polymer such as polyvinyl(ferrocene). In non-covalent embodiments, the non-covalent coupling is mediated by non-covalent interactions including but not limited to charge interactions, affinity interactions, metal coordination, physical adsorption, hydrophobic interactions, hydrogen bonding interactions, van der Waals interactions, dipole-dipole interactions, and/or combinations thereof. In some embodiments, the coupling is encapsulation.

Another aspect described herein provides an electrochemical system that utilizes chemical interaction(s) to target a specific species based on redox mediation. The electrochemical system comprises, in some embodiments, (a) a first electrode comprising a solid substrate comprising a first redox species, wherein the first redox species is selective toward a target anion based on a first specific chemical interaction between the first redox species and the target anion, wherein the first specific chemical interaction is activated by a first Faradaic/redox reaction; and (b) a second electrode.

In some embodiments of various first electrodes described herein, the first redox species in an oxidized state selectively binds to a target species. For example, in accordance with certain embodiments, the first redox species in an oxidized state is selective toward a target species when it has a higher affinity for the target species than for a non-target species, e.g., by at least about 1.1-fold, at least about 1.5-fold, at least about 2-fold, at least about 3-fold, at least about 4-fold, at least about 5-fold, at least about 10-fold, at least about 25-fold, at least about 50-fold, at least about 100-fold, at least about 200-fold, at least about 300-fold, at least about 400-fold, at least about 500-fold, at least about 1000-fold or more. Alternatively, in accordance with certain embodiments, the first redox species in an oxidized state is selective toward a target species when a separation factor of a target species (relative to a non-target species) is at least 5 or more, including, e.g., at least 10, at least 20, at least 30, at least 40, at least 50, at least 60, at least 70, at least 80, at least 90, at least 100, at least 125, at least 150, at least 175, at least 200, at least 250, at least 300, at least 350, at least 400, at least 450, at least 500, or more.

As used herein, the term "redox species" generally refers to any species or a portion thereof that can be oxidized and/or reduced during or upon electrical stimulation, or can undergo a Faradaic reaction. For example, the term redox species may refer to aa molecule, compound, or other species, or a portion thereof (such as a molecular or functional moiety of a molecule or compound) that can be oxidized and/or reduced during or upon application of an electrical potential, or can undergo a Faradaic reaction. For example, in some embodiments, a redox species comprises one or more molecular moieties that accept and/or donate one or more electrons depending on its redox state. Thus, in some embodiments, the redox species can form part (e.g., a molecular moiety) of a small molecule, a compound, a polymer molecule, or can exist as an individual molecule or compound.

In some embodiments of various first electrodes described herein, the first redox species can be oxidized to comprise an electron-receptor moiety upon application of an electrical potential. Examples of such a first redox species include, but are not limited to, organometallic compounds or polymers, an organic species (e.g., polymers), or a crystalline solid. An organometallic compound is generally a compound comprising at least one metal-carbon (M-C) bond where the carbon is part of an organic group. Examples of such organic group include, but are not limited to, alkyl (e.g., methyl), alkylidene (e.g., carbene), alkenyl (e.g., vinyl), allyl (e.g., —$C_3H_5$), alkylidyne (e.g., carbyne), 1,3-butadienyl (e.g., —$C_4H_5$), cyclobutadienyl (e.g., —$C_4H_3$), cyclopentadienyl ($C_5H_5$), aryl (e.g., phenyl, naphthyl), and cyclooctatetraenyl (e.g., —$C_8H_7$). The metal in the metal-carbon (M-C) bond of organometallic compounds can include, in accordance with certain embodiments, metals (e.g., Li, Mg, and Al), metalloids, and transition metals (e.g., Fe, Co, Cr, and Ni). Organometallic compounds include, among others, metallocenes, polymers and derivatives, metal-bipyridine systems, ferricyanide type systems, porphyrins, phthalocyanines, and pincer-ligand metal systems. An organometallic polymer is a polymer comprising an organometallic compound, e.g., a polymer comprising metallocene. An exemplary organometallic polymer includes, but is not limited to polyvinyl(ferrocene).

Additional non-limiting examples of the first redox species that can be used in various first electrodes include polymeric redox-systems, e.g., polyaniline-type systems, polypyrrole, polythiophene, and their derivatives; crystalline solids, e.g., redox-active metal-based nanoparticles, redox-active heteropolyacids, redox-active metal-organic frameworks, redox-active crystalline polymer frameworks (e.g., covalent-organic frameworks); cyclodextrin-based systems, metal-polypyridyl systems, metal-dicarbamates, cryptands, redox-active arenes, dendrimers comprising redox-active centers, and redox-active organic macrocycles.

In some embodiments, the first redox species present in the first electrode (e.g., anode) comprises a metallocene. A metallocene is a compound comprising two cyclopentadienyl rings and a metal center coordinated in a sandwich structure, wherein the metal center is oxidized to form a metal ion upon electrical stimulation. Thus, in some embodiments, the present disclosure provides an electrochemical device or system comprising a first electrode that comprises a metallocene-comprising solid substrate, wherein the metallocene is selective toward a target functional group of a target inorganic or organic molecule (e.g., a neutral or charged inorganic or organic molecule); and a second electrode (e.g., cathode).

In some embodiments of various first electrodes described herein, the first redox species or metallocene comprises a ferrocene-based redox species. In some embodiments, the cyclopentadienyl ligand or ring of ferrocenium (oxidized state of ferrocene) can form a hydrogen bond with an anion, e.g., an anion comprising a carboxylate moiety, a sulfonate moiety, or a phosphonate moiety.

In some embodiments involving various first electrodes described herein, the first redox species or metallocene may interact with a moiety of an inorganic ion (e.g., but not limited to nitrates, phosphates, fluorides, among others), or a moiety of a neutral molecule. Accordingly, some embodiments of the electrochemical devices or systems described herein can be used to separate inorganic ions or neutral molecules from other competing species (e.g., dissolved ionic and/or neutral species) in the solution.

In some embodiments, the first electrode contains the first redox species (e.g., as described herein) in an amount of greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt %. In certain embodiments, the first electrode contains the first redox species (e.g., as described herein) in an amount of less than or equal to 100 wt %, less than or equal to 99 wt %, less than or equal to 95 wt %, less than or equal to 90 wt %, less than or equal to 80 wt %, less than or equal to 70 wt %, or less than or equal to 60 wt %. Combinations of the above-referenced ranges are also possible (e.g., greater than or equal to 20 wt % and less than or equal to 100 wt %). Other ranges are also possible.

In one embodiment, the first electrode contains the solid substrate and the first redox species (e.g., described herein) in an amount as described above, wherein the first redox species is dispersed in the solid substrate and is stabilized through non-covalent interactions (e.g., π-π interactions) with the solid substrate.

In various embodiments of the electrochemical devices or systems described herein, the second electrode can be electrically conductive and electrochemically inert (e.g., carbon, and/or platinum); or a conductive electrode functionalized with a second redox species. In some embodiments, the second redox species in the second electrode can be (i) the same redox species as in the first electrode; (ii) a redox species with identical chemical identity to the redox species of the first electrode, but in a different oxidation state; or (iii) a redox species that has a different charge and chemical identity from that of the first redox species of the first electrode. In some embodiments, the use of platinum or carbon in the second electrode can induce water splitting during operation (and, in some cases, a pH decrease, such as those described above). In some embodiments, the use of a second electrode functionalized with a second redox species can reduce or eliminate the pH change.

In some embodiments, the second redox species can be a molecule, compound, or polymer comprising an electron-acceptor moiety. The molecule, compound, or polymer comprising an elector-acceptor moiety can be a charged species or a neutral species. For example, a charged redox species can comprise a charged organometallic compound, which becomes neutrally charged upon reduction. In some embodiments, the charged organometallic compound can be a metallocenium-based species, e.g., but not limited to cobaltocenium-based redox species (e.g., cobaltocenium hexafluorphosphate or cobaltocenium-containing polymer such as poly(2-(methacrylolyoxy)ethyl cobaltocenium)). Other charged organometallic compounds that can be used to functionalize the second electrode include, but are not limited to, ruthenium-based redox species (e.g., cis-dichlorobis(2,2'-bipyridine)ruthenium(II)-based molecules or -containing polymer, or ferrocenium-based redox species. In some embodiments, the second redox species can be a neutral molecule, compound, or polymer comprising an electron-acceptor moiety that becomes negatively charged upon reduction. Exemplary neutral redox species includes organic conducting polymers comprising electron-acceptor moieties, e.g., poly(anthraquinone), or ferricyanide-based redox species (e.g., complexes of ferricyanide such as potassium ferricyanide).

In some embodiments, the second redox species can be a charged species of the first redox species described herein, which is reduction favorable. Non-limiting examples of such first species that can be used to form a charged species include quinone containing polymers (e.g., polyanthraquinone), Cobaltocenium containing polymers (e.g., poly(2-(methacrylolyoxy)ethyl cobaltocenium), and polypyrrole, as well as other possible redox-active species including, e.g., cyclodextrin-based systems, metal-polypyrridyl systems, metal-dicarbamates, cryptands, dendrimers comprising redox-active centers, and redox-active organic macrocycles.

In some embodiments, it is desirable to have the second redox species of the second electrode chemically different from the first redox species of the first electrode to form an asymmetric redox-based electrochemical device or system. Asymmetric redox-based electrochemical devices or systems may facilitate efficient separation of a diluted target species from a complex background (e.g., the presence of competing ions at a concentration that is at least 100-fold higher than that of the target species) with substantially constant pH over a wide range of current densities at a high current efficiency. In some embodiments, the current densities can range from about 0.5 A/cm$^2$ to about 10 A/cm$^2$, or about 0.8 A/cm$^2$ to about 8 A/cm$^2$. In some embodiments, the current efficiency can be at least about 90% or higher, including, e.g., at least about 95%, at least about 96%, at least about 97%, at least about 98%, or higher.

In some embodiments, the second electrode contains the second redox species (e.g., as described herein) in an amount of greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt %. In certain embodiments, the second electrode contains the second redox species (e.g., as described herein) in an amount of less than or equal to 100 wt %, less than or equal to 99 wt %, less than or equal to 95 wt %, less than or equal to 90 wt %, less than or equal to 80 wt %, less than or equal to 70 wt %, or less than or equal to 60 wt %. Combinations of the above-referenced ranges are also possible (e.g., greater than or equal to 20 wt % and less than or equal to 100 wt %). Other ranges are also possible.

In some embodiments involving the systems described herein, the selectivity of the first electrode (e.g., a metallocene-based electrode) for a target species can be enhanced through tuning of a target species to be separated, composition of an electrolyte, and/or modification of the composition of the redox species (e.g., the metallocene rings). For example, in some embodiments, the chromatographic resolution between different target species may be achieved by performing experimental and/or computational studies. Additionally or alternatively, the binding energies of the metallocenes to various target species can be tuned by functionalization of the target species. In some instances, modification of the metallocene rings, e.g., by adding electron withdrawing and/or electron donating functional groups can modulate the strength of the bonding between the first electrode and the target species.

In some embodiments, the redox material can be selected to be an electrochemically-activated redox material with site(s) that can provide strong charge-transfer interactions with oxyanions which contain an atom (e.g., a metalloid, heavy metal, and/or transition metal) that is strongly electron donating to the oxygen groups.

In some embodiments involving the electrochemical devices or systems described herein, the solid substrate forming the electrodes can be porous, e.g., the solid substrate can comprise pores. As used herein, a "pore" generally refers to a conduit, void, or passageway, at least a portion of which is surrounded by a medium in which the pore is formed such that a continuous loop may be drawn around the pore while remaining within the medium. "Externally-accessible pores" are pores within the porous medium that are not completely surrounded by the solid material from which the porous medium is made, and thus, are accessible from outside the solid material from which the porous medium is made by a fluid (e.g., a liquid, gas, and/or supercritical fluid). The externally-accessible pores may be, according to certain embodiments, accessible by an electrolyte of the electrochemical system. Voids within a material that are completely surrounded by the solid material from which the porous medium is formed (and thus, not accessible from outside the porous medium, e.g. closed cells) are not externally-accessible pores. Pores may comprise any suitable cross-sectional shape such as, for example, circular, elliptical, polygonal (e.g., rectangular, triangular, etc.), irregular, and the like. In certain embodiments, the porous structure provides facile ion diffusion and high externally-accessible surface area of the pores that can be contacted by an external fluid (e.g., the electrolyte during operation of the electrochemical system).

In certain embodiments, any art-recognized electrode material can be used in the solid substrate to form the anodic and/or second electrodes described herein. In general, the solid substrate can comprise one or more electrically conducting materials, e.g., including but not limited to copper, carbon nanotubes, carbon paste, graphite, graphene, titanium, brass, silver, platinum, gold, ceramic material, and/or combinations thereof. The solid substrate can be in the form of a layer, a mesh, a film, or a plate. In one embodiment, the solid substrate for use in the electrodes of the electrochemical devices or systems described herein comprises a network of carbon nanotubes.

In some embodiments, the first and/or second electrodes may be in contact with a fluid electrolyte (e.g., a liquid and/or supercritical fluid electrolyte). In some embodiments, the first and/or second electrodes are in contact with a liquid electrolyte. Generally, the electrolyte is capable of conducting ions but is not capable of conducting a sufficient amount of electricity to result in a short circuit of the electrochemical system. The pH of the electrolyte can be neutral, acidic, or basic. In some embodiments, the pH of the electrolyte can range from pH 1 to about pH 14. In some embodiments, the electrolyte has a pH that is above the isoelectric point of the target molecule (e.g., organic or inorganic molecules) for anion-selective separation. In some embodiments, the electrolyte has a pH that is below the isoelectric point of a cation species (e.g., organic or inorganic species) to be separated for cation-selective separation.

In some embodiments, the pH of the electrolyte can vary during the operation of the electrochemical systems described herein. In some embodiments, the pH of the electrolyte is substantially the same (e.g., within 10%, within 5%, or less) during the operation of the electrochemical systems described herein.

The electrolyte might not always be present in the electrochemical system. For example, in some cases, the electrochemical system may not include some components of an electrolyte until the electrochemical system is in use. This may be the case, for example, when it is desired to transport the electrochemical systems in a dry state and/or when the components of the electrolyte material are readily available at the point of use (e.g., in the case where a water-based electrolyte is used and water is readily available at the point of use). In some embodiments, the electrochemical system includes the electrolyte salt (e.g., sodium chloride, sodium phosphate, or another suitable salt), but does not include water. In some such embodiments, water may be added to the electrochemical system at the point of use.

Generally, as noted above, the electrolyte serves as a medium for the transport of ions between the anode and the cathode. According to certain embodiments, the electrolyte may comprise one or more target species to be separated. In some embodiments, the electrolyte may comprise one or more dissolved salts. The salt may, according to certain embodiments, act as a pH buffer in the electrochemical system. The electrolyte may also contain, according to certain embodiments, one or more byproducts of the electrochemical reaction(s) employed by the electrochemical system.

In some embodiments, the electrolyte is an aqueous electrolyte. In some such embodiments, the electrolyte contains water in an amount of at least 50 wt %, at least 75 wt %, at least 90 wt %, or more.

In certain embodiments, the electrochemical system may comprise additional components. For example, the electrochemical system may further comprise, according to certain embodiments, electrical contact pads and/or electrical leads (which can be connected to, for example, an external electrical potential generator, e.g., a voltage generator).

Other non-limiting examples of additional components include pumps, valves, storage tanks, flow meters, and mixers. In some embodiments, the electrochemical system may comprise a pump which is fluidically connected to the electrolyte. In certain embodiments, the electrochemical system may comprise a valve which is capable of allowing any gases or supercritical fluids generated during electrochemical system operation (e.g., hydrogen) to escape. In some embodiments, the electrochemical system may comprise a valve which is capable of allowing water and/or seawater into the chamber, in which the electrodes are placed. Additionally, in some embodiments, additional components such as structures, supports, and non-conductive separators may be present.

In certain embodiments, the electrochemical devices or systems described herein can be designed to introduce asymmetric Faradaic processes on both first and second electrodes to provide ionic selectivity as well as high adsorption capacity and charge storage (e.g., higher energy and power densities), as compared to purely conductive double-layer electrodes.

For example, in some embodiments, an asymmetric electrochemical system described herein comprises (i) a first electrode comprising a first solid substrate (e.g., a dispersion of carbon nanotubes) and a metallocene (e.g., ferrocene) or a metallocene-comprising polymer (e.g., ferrocene-comprising polymer such as polyvinyl(ferrocene) dispersed in the first solid substrate; and (ii) a second electrode comprising a second solid substrate (e.g., a dispersion of carbon nanotubes) and a redox species dispersed therein, wherein the redox species is chemically different from the metallocene or metallocene-comprising polymer used in the first electrode. By way of example only, when the metallocene or metallocene-comprising polymer used in first electrode is based on ferrocene, the second redox species used in the second electrode can be any metallocene or metallocene-comprising polymer that is not based on ferrocene. For example, the second redox species used in the second electrode may comprise a cobaltocenium-containing polymer such as poly(2-(methacrylolyoxy)ethyl cobaltocenium) or PMAECoCp2.

In some embodiments, the electrochemical system described herein can comprise more than one set (e.g., 2 sets or more, 3 sets or more, 4 sets or more, 5 sets or more, 10 sets or more, or 20 sets or more) of the first and second electrodes arranged in series or in parallel. In some embodiments where the first and second electrodes are asymmetric (e.g., when the first and second electrodes have chemically different redox species), the electrodes can be arranged in series.

In some embodiments, the target cationic species and/or anionic species is present in the fluid source in a micromolar range or in a nanomolar range. In some embodiments, the target cationic species and/or anionic species can be a micropollutant or a nanopollutant. A micropollutant is a target species to be separated from a fluid source present at a micromolar concentration. Non-limiting examples of micromolar concentration ranges include from about 0.1 micromolar to 100 micromolar, from about 0.5 micromolar to about 50 micromolar, and from about 0.5 micromolar to about 25 micromolar. A nanopollutant is a target species to be separated from a fluid source present at a nanomolar concentration. Non-limiting examples of nanomolar concentration ranges include from about 0.01 nM to about 1000 nM, or from about 0.1 nM to about 500 nM, or from about 1 nM to about 500 nM.

In some embodiments, the fluid source can comprise other competing non-target cations or anions present at a concentration that is significantly higher (e.g., at least 5-fold or higher, including, e.g., at least 10-fold, at least 25-fold, at least 50-fold, at least 100-fold, at least 200-fold, at least 300-fold, at least 400-fold, at least 500-fold) than that of the target cationic species or target anionic species.

The electrochemical systems described herein may be operated at a variety of suitable temperatures. According to certain embodiments, the electrochemical system is operated at a temperature such that the electrolyte remains in liquid and/or supercritical fluid form. In certain embodiments, the electrochemical system is operated at a temperature such that the electrolyte remains in liquid form. For example, according to certain embodiments, the electrochemical system may be operated at any temperature between 0° C. and 100° C. when under atmospheric pressure (i.e., 1 atm) or greater (e.g., at the increased pressure imposed by hydrostatic pressure underwater).

The electrochemical systems described herein may be operated at a variety of suitable pressures. According to certain embodiments, the electrochemical system is operated at a pressure such that the electrolyte remains in liquid and/or supercritical fluid form. In certain embodiments, the electrochemical system is operated at a pressure such that the electrolyte remains in liquid form.

The electrochemical systems described herein may be operated with an electrolyte at a variety of suitable ionic strength ranging from 0 mM (e.g., water-based or organic solvent-based electrolyte) to up to 10 M (e.g., a salt-based electrolyte).

The electrochemical systems described herein may be operated at a variety of suitable pHs. According to certain embodiments, the electrochemical system is operated with a neutral electrolyte (e.g., at pH 7). In some embodiments, the electrochemical system is operated with an acidic electrolyte (e.g., below pH 7, e.g., pH 6, pH 5, pH 4, or lower). In some embodiments, the electrochemical system is operated with a basic electrolyte (e.g., above pH 7, e.g., pH 8, pH 9, pH 10, pH 11, pH 12, or higher). In some embodiments of anion-selective separation, the electrochemical system is operated with an electrolyte that has a pH above the isoelectric point of a target molecule (e.g., an organic or inorganic molecule) to be separated. In some embodiments of cation-selective separation, the electrochemical system is operated with an electrolyte that has a pH below that of the isoelectric point of a cation species to be separated.

In some embodiments, the electrical potential applied to the electrodes (e.g., the first electrode) can be equal to or less than 2 V or lower, e.g., equal to or less than 1.5 V, equal to or less than 1.0V, equal to or less than 0.8 V, equal to or less than 0.6 V, equal to or less than 0.4 V or lower. In some embodiments, the electrical potential applied to the electrodes (e.g., the first electrode) can be at least 0.1 V, at least 0.2 V, at least 0.3 V, at least 0.4 V, at least 0.5 V, at least 0.6 V, at least 0.7 V, at least 0.8 V, at least 0.9 V, or at least 1.0 V. Combinations of the above-referenced ranges are also possible. For example, in some embodiments, the electrical potential applied to the electrodes (e.g., the first electrode) ranges from 0.1 V to 0.8 V. Other combinations are also possible.

Various embodiments of the methods described herein can further comprise reversing the applied electrical potential (e.g., partially or completely reversal including when the applied electrical potential is off, i.e., V=0) to release the bound target molecule and/or captured cationic species from the electrodes.

The electrode systems described herein can be cycled for at least 200 cycles or more with a minimal loss (e.g., less than 10% loss, or less than 5% loss) in electrochemical charge. In some embodiments, the electrode systems can be cycled for at least 300 cycles, at least 400 cycles, at least 500 cycles, at least 600 cycles, at least 700 cycles, at least 800 cycles, at least 900 cycles, at least 1000 cycles, or more, with a minimal loss (e.g., less than 10% loss, or less than 5% loss) in electrochemical charge.

In some embodiments where the cathodic and first electrodes are asymmetric redox-activated (e.g., cathodic and first electrodes have redox species of different charges and chemical identity), the electrochemical devices or systems have the capability of suppressing parasitic reactions that would be otherwise present in electrochemical systems without asymmetric redox-activated electrodes, thus increasing separation as well as energy storage performance. This may be applicable for both organic solvent phase-based and water phase-based application (e.g. suppression of electrolyte destruction, prevention of water reduction or water oxidation). Accordingly, in another aspect, a method of increasing separation efficiency of a target molecule (e.g., an organic or inorganic molecule) from a fluid source or increasing energy storage performance of an electrochemical device or system is described herein. In certain embodiments, such a method comprises: (a) placing in a fluid source (i) a first electrode comprising a first solid substrate and a first redox species immobilized to the first solid substrate; and (ii) a second electrode comprising a second solid substrate and a second redox species immobilized to the solid second substrate, wherein the second redox species is chemically different from the first redox species and the first and second redox species have different charges; and (b) applying an electrical potential across the first electrode and the second electrode such that the first redox species transforms to an oxidized state and selectively binds to a target electron-donating functional group of a target molecule (e.g., an organic or inorganic molecule) present in the fluid source and the second redox species undergoes a self-exchange reaction within the second electrode. Thus, in certain embodiments, the separation efficiency or energy storage performance of the electrochemical device or system is increased by diverting at least a portion of electron transfer toward the self-exchange reaction of the second redox species and suppressing or reducing electron transfer toward the fluid source. In some embodiments, the fluid source can be an aqueous fluid (e.g., a liquid comprising water in an amount of at least 50 wt %, at least 75 wt %, at least 90 wt %, or more). In alternative embodiments, the fluid source can an organic fluid (e.g., a liquid comprising organic solvent in an amount of at least 50 wt %, at least 75 wt %, at least 90 wt %, or more).

In some embodiments, reactive electrochemical separation, in which process intensification can be achieved by combining the reaction step with the product recovery. In some embodiments, the systems and/or methods described herein can be used as part of an environmental remediation process.

Turning now to the figures, several non-limiting embodiments are described in further detail. However, it should be understood that the current disclosure is not limited to only those specific embodiments described herein. Instead, the various disclosed components, features, and methods may be arranged in any suitable combination as the disclosure is not so limited.

FIG. 1A is a schematic diagram of a method involving adsorbing a target species on a first electrode, according to some embodiments. The depicted method includes applying an electrical potential across a first electrode 102 comprising a first conductive substrate 104 and a first redox species 106 (shown in FIG. 1B) immobilized to first conductive substrate 104 and a second electrode 108, such that a target species 110 comprising a heavy metal, a transition metal, and/or a metalloid is adsorbed on first electrode 102. In some embodiments, at least a portion of first redox species 106 is oxidized during at least a portion of the application of the electrical potential, to form oxidized first redox species 107, e.g., as depicted in FIG. 1A.

Figure 1B:
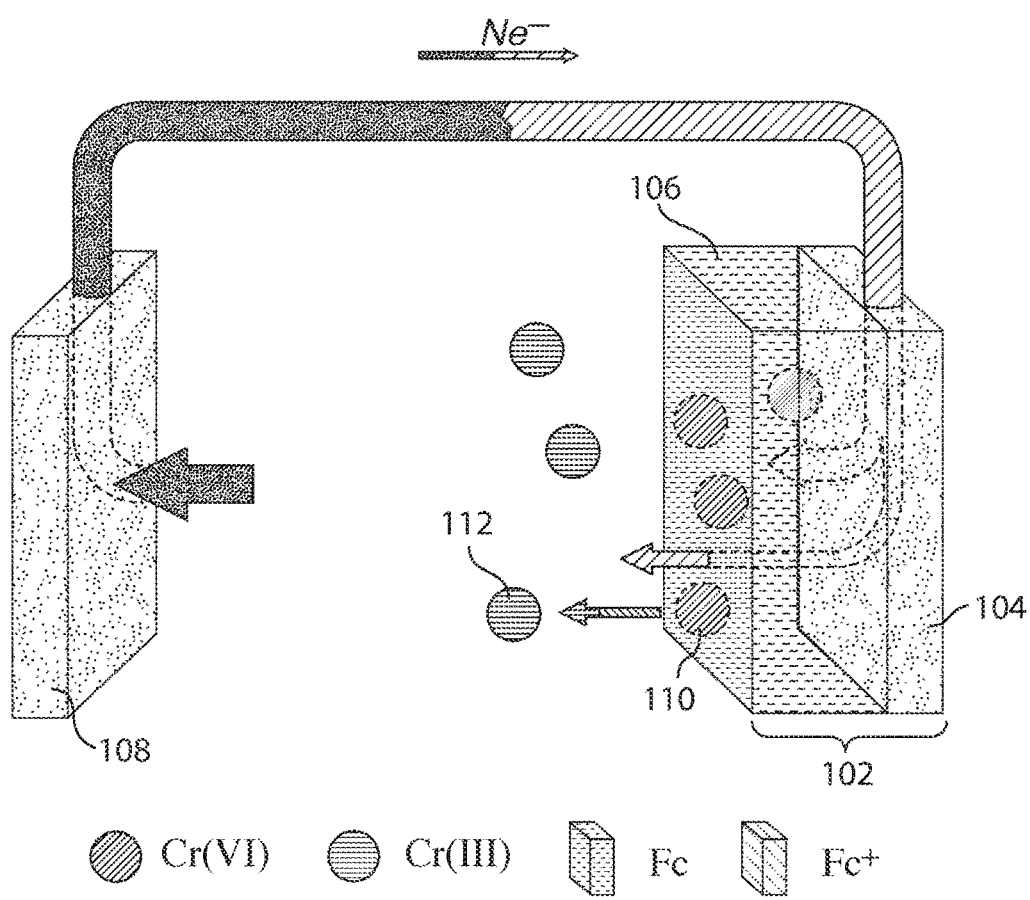
FIG. 1B is a schematic diagram of a method involving releasing a target species from a first electrode, potentially following from one or more method steps described regarding FIG. 1A, according to some embodiments.

FIG. 1B is a schematic diagram of a method involving releasing a target species from a first electrode, potentially following from one or more method steps described regarding FIG. 1A, according to some embodiments. The depicted method includes releasing target species 110 from first electrode 102 such that, after the release, the heavy metal, transition metal, and/or metalloid of released target species 112 has an oxidation state that is different from the oxidation state of the heavy metal, transition metal, and/or metalloid just prior to the adsorption of target species 110 on first electrode 102. In some embodiments, releasing target species 110 from first electrode 102 comprises applying a second electrical potential across first electrode 102 and second electrode 108 in the opposite direction to the electrical potential used for adsorbing target species 110 on first electrode 102. In some embodiments, at least a portion of redox species 107 is reduced during at least a portion of the application of the second electrical potential to re-form reduced first redox species 106.

U.S. Provisional Patent Application No. 62/723,914, filed Aug. 28, 2018, and entitled "Electrochemically-Mediated Recovery, and/or Remediation, of Heavy Metals Using Faradaic Polymers," and U.S. Provisional Patent Application No. 62/725,143, filed Aug. 30, 2018, and entitled "TARGET SPECIES RECOVERY AND RELATED SYSTEMS AND METHODS," are each incorporated herein by reference in their entireties for all purposes. International Patent Application Publication No. WO 2017/075263, published on May 4, 2017, filed as Application No. PCT/US2016/059193 on Oct. 27, 2016, and entitled "Electrochemical Devices or Systems Comprising Redox-Functionalized Electrodes and Uses Thereof" is incorporated herein by reference in its entirety for all purposes.

The following examples are intended to illustrate certain embodiments of the present invention, but do not exemplify the full scope of the invention.

Example

The removal of highly toxic, ultra-dilute contaminants of concern such as heavy metals has been a primary challenge for clean water technologies. Chromium and arsenic are among the most prevalent pollutants in both urban and agricultural waters, usually present in anionic form. Current separation processes have limitations in tackling minority ions due at least to the lack of molecular selectivity. This example demonstrates the effectiveness of redox-active metallopolymer electrodes based on poly(vinyl)ferrocene for the selective removal of chromium and arsenic from water upon electrochemical oxidation of the electrode. An uptake greater than 100 mg Cr/g adsorbent was achieved, with a reversible working capacity of more than 99% controlled solely by electrochemical potential, in the presence of excess chloride and other competing ions. The chromium bound ions were released in the less harmful trivalent form under a reduction potential for the polymer electrode. The electrochemical response of the metallopolymer was observed at the nanoscale by in-situ transmission electron microscopy (TEM) in a custom manufactured liquid cell to provide insight into the fast swelling of the polymer during electrochemical modulation due at least to the associated ion-insertion process, pointing to anion adsorption as an early step in the process. The underlying mechanisms for molecular selectivity were investigated through electronic structure calculations, indicating a strong charge transfer to oxyanions which correlated with the strength of molecular binding. Chromium and arsenic were remediated efficiently at concentrations as low as 100 ppb in the presence of an over 200-fold excess of competing salt, to establish an integrated platform for tandem water purification and environmental remediation.

The issues of anthropogenic water pollution and geographical scarcity of clean water on a global scale are some of the main engineering challenges of the 21$^{st}$ century. Heavy metal contaminants have been a major health and environmental hazard across the world. Chromium, in particular, is a priority target for the Environmental Protection Agency (EPA) due at least to its prevalence and high degree of toxicity; it is among the 10 most frequently detected groundwater contaminants at hazardous waste sites, and one of the 14 most toxic heavy metals, especially when present in its hexavalent, oxyanion state (e.g. $Cr_2O_7^{2-}$, $CrO_4^{2-}$, $HCrO_4^-$). Major sources of pollution include tanneries and metal plating, and are of concern both in the U.S. and the developing world. Whereas trivalent Cr(III) is a naturally occurring form in the earth's crust, hexavalent Cr(VI) is an anthropogenic chemical—as such, the development of energy-efficient pathways for capture of Cr(VI) and conversion to Cr(III) is key to long-term environmental sustainability. Arsenic is another heavy metal in its highly soluble oxyanion form that has received strong interest both in North America and developing countries due at least to its acute health effects, and wide prevalence from both natural and anthropogenic sources. Conventional methods for heavy metal removal involve ion-exchange or chemical resins for adsorption, which often require co-reagents or excessive regeneration chemicals, and can suffer from slow kinetics with processing times on the order of hours.

The development of smart-materials for water purification and environmental remediation has received intense attention recently, with micropollutants and trace contaminants being key areas of concern. Electrosorption-based processes often offer an attractive platform due at least to their modularity and the absence of a chemical regeneration step, based on a wide variety of materials platforms for both deionization and selective ion removal. Redox-active materials have recently been demonstrated to be a promising platform for separations due at least to their molecular selectivity and electronic tunability. Metallopolymer-based electrodes, especially poly(vinyl)ferrocene (PVF), have shown remarkable ion-uptake capacities for organic contaminants based on electrochemically-activated chemical interactions. The main features of these systems are the fast electron transfer and redox processes at moderate potentials (<1.2 V vs SHE), which allow reversible adsorption and desorption of ionic components by electrochemical modulation of charge and hydrogen-bonding interactions between carboxylates and the metallopolymers. A universal redox-materials platform, targeting the molecular level recognition of heavy metal oxyanions, would overcome a major challenge for environmental remediation, especially in the presence of competing excess anions. Furthermore, the nature of the interaction of these metallopolymers with relevant transition metals has not yet been fully explored.

In the current work, PVF-functionalized electrodes were applied in the removal of anionic chromium and arsenic oxyanions, under a range of different concentrations and electrolyte conditions. In addition, this example provides insight into the transformation of chromium, which is reduced to its trivalent form during release on reduction of the metallopolymer adsorbent. From a general perspective, this example demonstrates the high selectivity of Faradaic electrodes for heavy-metal oxyanion contaminants, with the adsorption and desorption controlled purely by electrochemical modulation. The fundamental interactions regulating the selectivity were shown to depend strongly on solvation effects and on the charge transfer characteristics of the ion-pair, regulated by the electronic structure of the anions and overcoming simple electrostatic attractions. In addition, the nanoscale observation of the metallopolymer film under ion-adsorption under in-situ electrochemical transmission electron microscopy has been pursued. In-situ TEM allows the direct high-resolution imaging and observation of an electrochemical response of a materials interface, and can thus shed light on the kinetics and morphological changes during ion-insertion in a direct manner. These results are expected to serve as an important platform for tailoring advanced redox-materials targeting heavy metal recovery and remediation.

Figure 13:
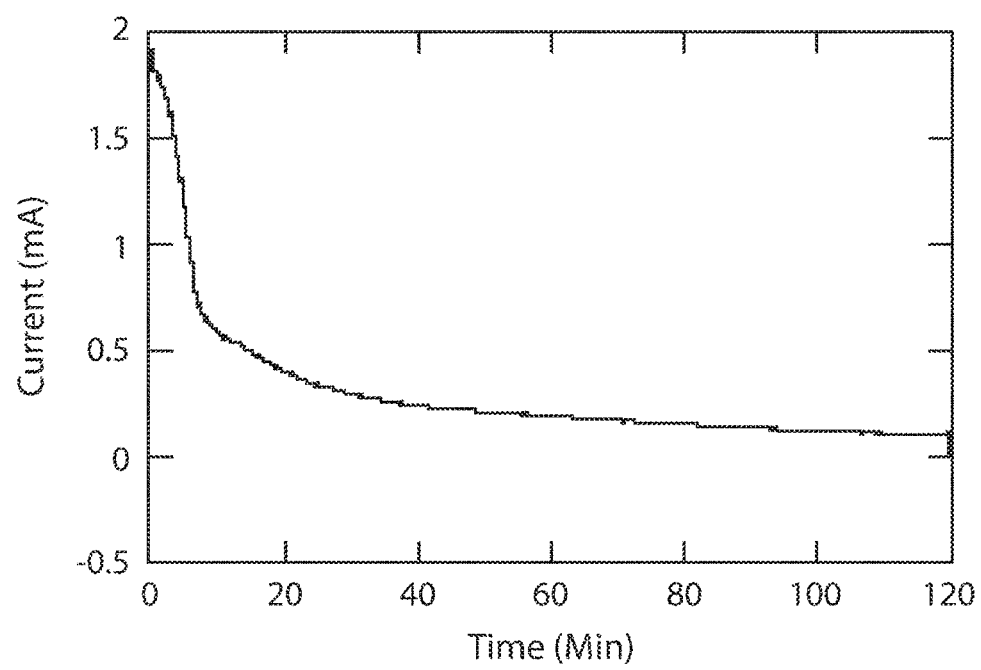
FIG. 13 shows a plot characterizing charging of PVF-CNT electrode during adsorption in 1 mM $(NH_4)_2Cr_2O_7$, 20 mM $NaClO_4$ at +0.8 V vs Ag/AgCl, according to some embodiments.

The effectiveness of PVF as a heterogeneous, electrochemically-mediated adsorbent for the removal of chromate from water was evaluated using uniform, nanostructured films of multiwalled carbon-nanotubes (CNT) and poly (vinyl)ferrocene (PVF) prepared by a drop-casting method. The nanoporous structure of the film was observed by HR-SEM (FIG. 2A), with the iron content confirmed by Energy Dispersive X-ray Spectroscopy (EDS). Chromium adsorption was carried out from a mixture of 1 mM $(NH_4)_2Cr_2O_7$ and 20 mM $ClO_4^-$ under chronoamperometric conditions at +0.8 V vs Ag/AgCl (starting current ~2 mA/cm$^2$ as seen in FIG. 13). After 2 hrs of adsorption, the increase in chromium on the PVF-CNT film was evident through EDS mapping (FIG. 2B). XPS surface analysis also confirmed the high uptake of chromium relative to the CNT control, in which no visible chromium adsorption was observed (FIG. 18-FIG. 19). At 10 mM $Cr_2O_7^{2-}$ and 20 mM $ClO_4$ (equimolar chromium and perchlorate concentrations in the mixture), a molar comparison found a close to stoichiometric ratio between chromium and iron, indicating the strong chromate-ferrocenium binding as an ion pair (Fe2p 1.25:1 Cr$_2$p ratio, Cl<0.1%, from high-resolution XPS quantitation). With chromate as the minority ion (1 mM $Cr_2O_7^{2-}$ and 20 mM $ClO_4$), the degree of competing perchlorate adsorption increased (Cr2p 1.3:1 Cl2p ratio), with the iron to chromium ratio approaching 4:1 (from both survey and high-resolution scans), which approximately correlated with the experimental adsorption capacity of ~60 mg/g (FIG. 2C). A total elemental analysis from the survey scans also pointed to a certain degree of cation (Na$^+$ and NH$_4^+$) insertion within the film (FIG. 18) due at least to charge compensation to ensure electroneutrality.

On varying the potential applied to the PVF-CNT electrode, it was noticed that chromium adsorption was the highest under full oxidation of PVF (at +0.8 V vs Ag/AgCl), with little to no adsorption below +0.4 V (FIG. 2C), with both perchlorate and chloride as the supporting electrolyte. Under higher potentials, more ferrocene units in the electrode became oxidized to allow for chromate binding. As will be discussed later, these observations were also in agreement with the results from in-situ TEM, which showed polymer expansion at the peak redox potential of the CV. An equilibrium isotherm at +0.8 V vs Ag/AgCl showed that a maximum capacity of up to 100 mg chromium/g adsorbent was achieved in perchlorate (FIG. 2D), which was higher than loadings reported for various ion exchange materials and nanoparticle sorbents. An advantage of these redox-electrodes is that they were fully electrochemically-controlled and did not require the addition of chemical regenerants to release the captured ions, with remarkably higher selectivity and adsorption uptake than conventional carbon electrodes. In addition, the adsorption reached fast equilibrium across a range of concentrations (FIG. 2E and FIG. 15), which was remarkable in comparison to various ion-exchange or other electrosorption systems, which often required hours to reach adsorption equilibrium. These fast adsorption rates were comparable to capacitive methods in deionization, with the added advantage of the high selectivity towards the select chromium anions in competition with interfering chloride ions. Neither a control carbon nanotube electrode (pristine CNT at +0.8 V vs Ag/AgCl) nor the neutral PVF-CNT (no voltage applied) exhibited affinity for the dichromate over the competing electrolyte (FIG. 2C and FIG. 2E). Finally, it must be noted that comparable chromium uptakes were obtained by applying chronopotentiometric charging (at current densities varying from 0.1 mA/cm$^2$ to 1 mA/cm$^2$) and also with capacitive counter electrodes made of porous carbons (see FIG. 16).

Figure 2A:
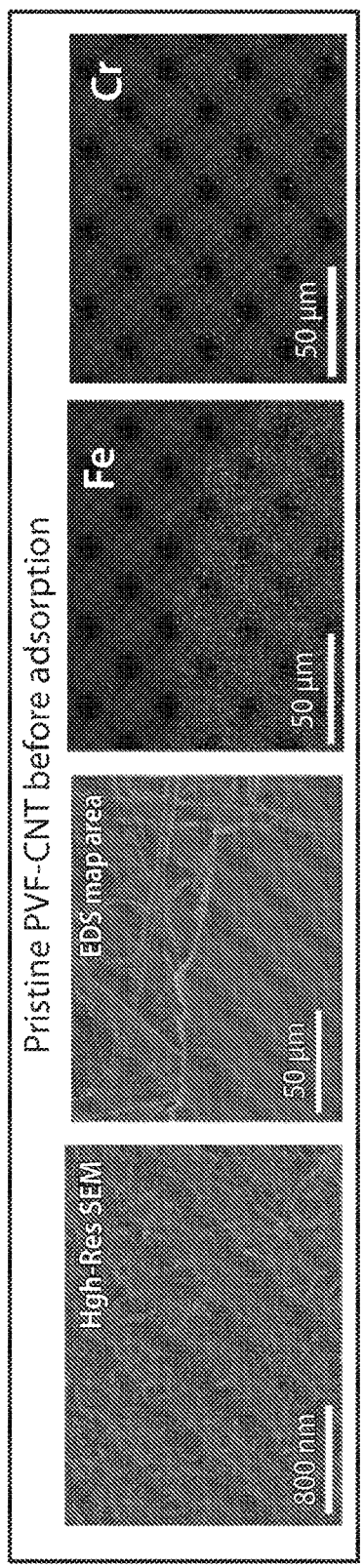
FIG. 2A shows scanning electron microscopy (SEM) micrographs of poly(vinyl)ferrocene (PVF)-multiwalled carbon-nanotubes (CNT) (PVF-CNT) electrodes before the adsorption of chromium, and Energy Dispersive X-Ray Spectroscopy (EDS) mappings of the iron of the metallopolymer PVF, and of adsorbed Cr, according to some embodiments.
Figure 2B:
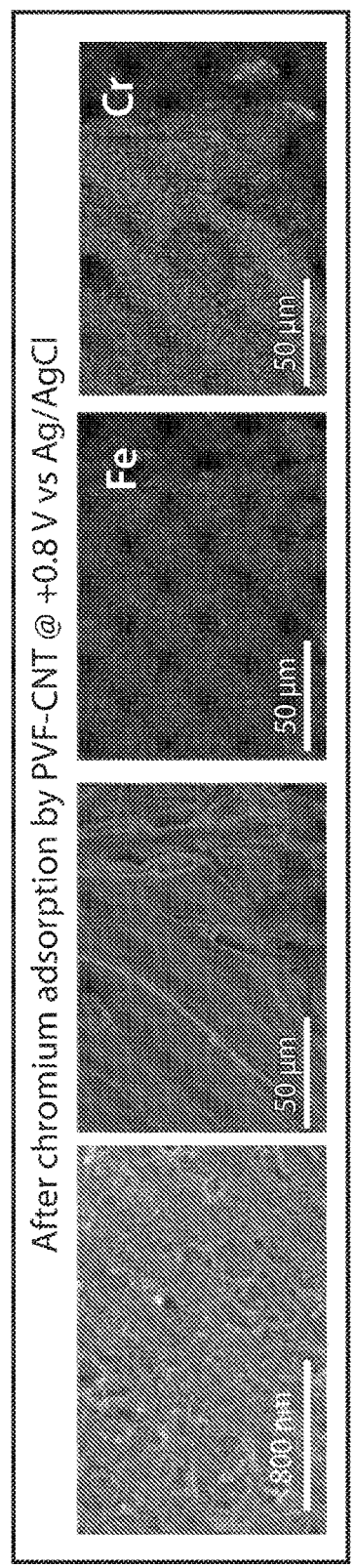
FIG. 2B shows SEM micrographs and EDS mappings after chromium adsorption by the system of FIG. 2A, according to some embodiments.
Figure 2C:
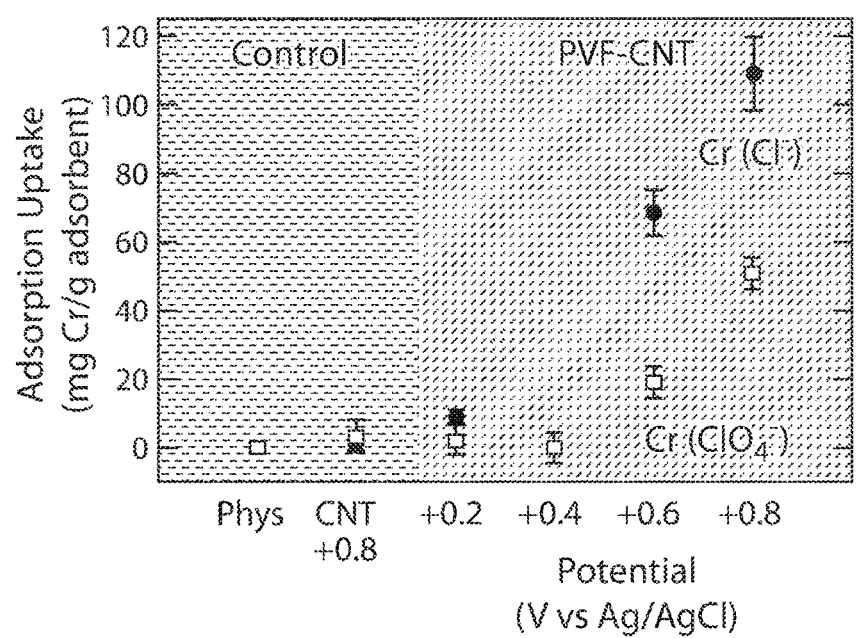
FIG. 2C shows a plot, of adsorption uptake vs. potential (V vs. Ag/AgCl), comparing chromium uptake capacity of PVF-CNT and CNT electrodes, according to some embodiments.
Figure 2D:
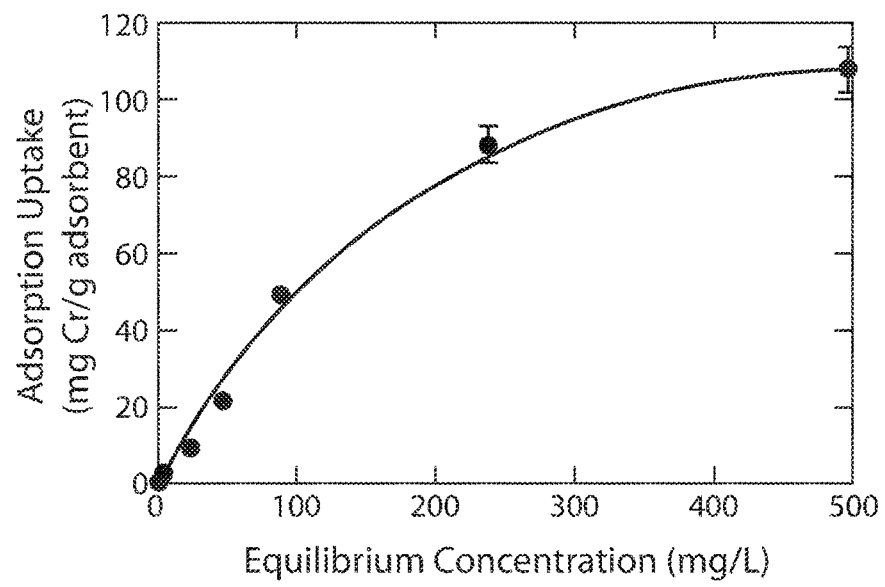
FIG. 2D shows an equilibrium isotherm plot for PVF-CNT at +0.8 V vs Ag/AgCl adsorption for a range of $(NH_4)_2Cr_2O_7$ concentrations in 20 mM $NaClO_4$, according to some embodiments.
Figure 2E:
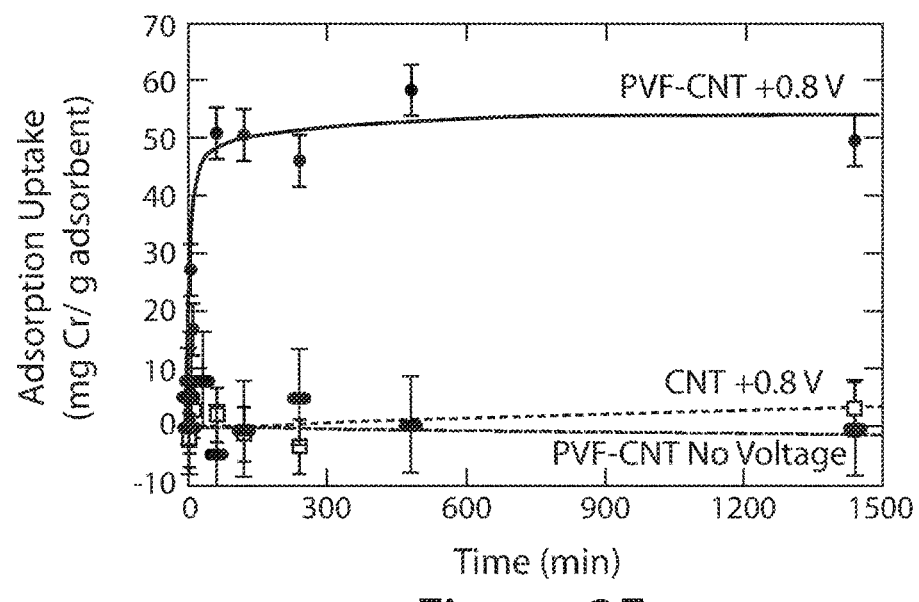
FIG. 2E shows a plot characterizing adsorption kinetics for Cr at 1 mM $(NH_4)_2Cr_2O_7$ in 20 mM $NaClO_4$, according to some embodiments.
Figure 2F:
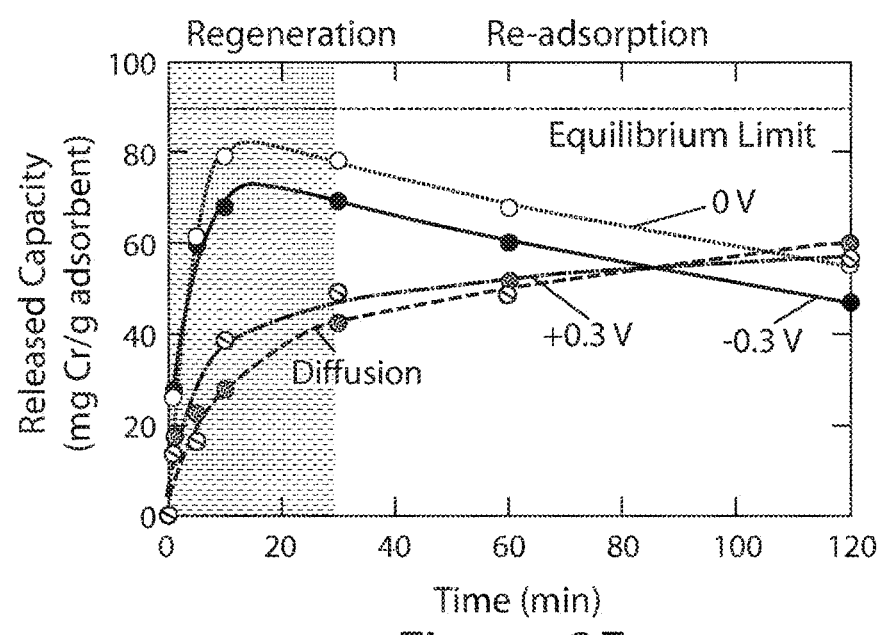
FIG. 2F shows a plot characterizing an effect of discharge potential on regeneration efficiency of the PVF-CNT electrodes, measured by the normalized mass of Cr released (mg Cr/g PVF polymer), according to some embodiments.

FIG. 2A shows: Scanning electron microscopy (SEM) images of the PVF-CNT electrodes before the adsorption of chromium, and EDS mapping of the iron of the metallopolymer, and of adsorbed Cr. FIG. 2B shows: SEM micrographs and EDS mapping after chromium adsorption. The area corresponding to the PVF was also saturated with the adsorbed Cr. FIG. 2C shows: Comparison of chromium uptake capacity of PVF-CNT and CNT electrodes, for 1 mM $(NH_4)_2Cr_2O_7$ in 20 mM $NaClO_4$ and in 20 mM NaCl. No Cr adsorption occurred on a PVF-CNT electrode without potential, and a much higher adsorption capacity for PVF-CNT than pristine CNT was observed at +0.8 V vs Ag/AgCl potential adsorption. FIG. 2D shows: Equilibrium isotherm for PVF-CNT at +0.8 V vs Ag/AgCl adsorption for a range of $(NH_4)_2Cr_2O_7$ concentrations in 20 mM $NaClO_4$. FIG. 2E shows: Adsorption kinetics for Cr at 1 mM $(NH_4)_2Cr_2O_7$ in 20 mM $NaClO_4$. FIG. 2F shows: Effect of discharge potential on regeneration efficiency of the PVF-CNT electrodes, measured by the normalized mass of Cr released (mg Cr/g PVF polymer). Electrodes were charged at +0.8 V (vs Ag/AgCl) and discharged at 0 V, -0.3 V, +0.3 V into 20 mM $NaClO_4$, and dynamic results were compared to a diffusion-controlled case in which the electrode was left in the desorption solution under no applied potential.

Figure 3A:
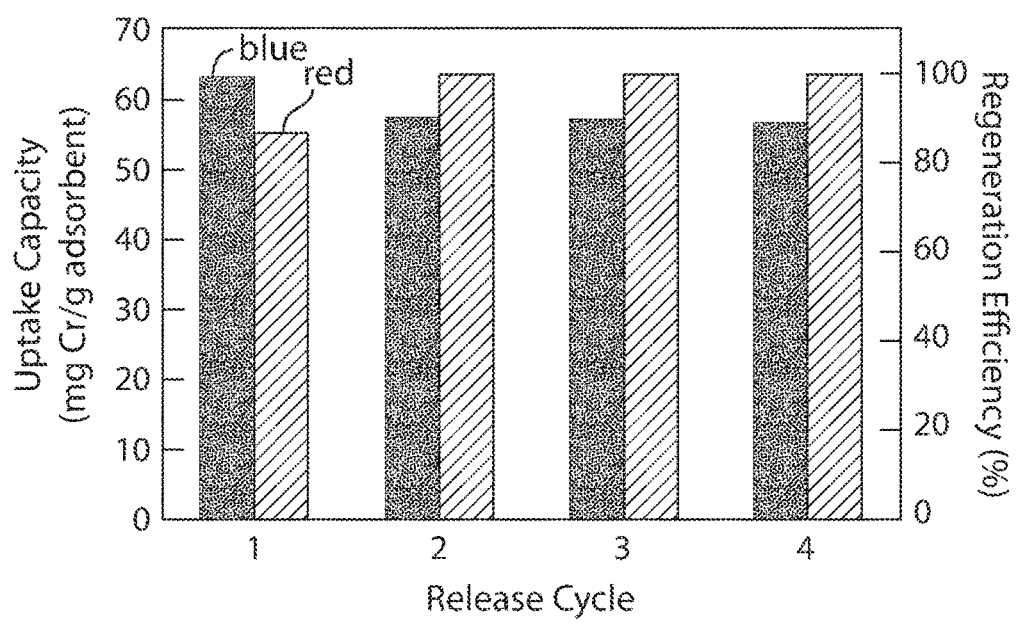
FIG. 3A shows a plot characterizing recyclability of a PVF-CNT electrode over a number of discharge cycles (+0.8 V adsorption, 0 V discharge), according to some embodiments.
Figure 3B:
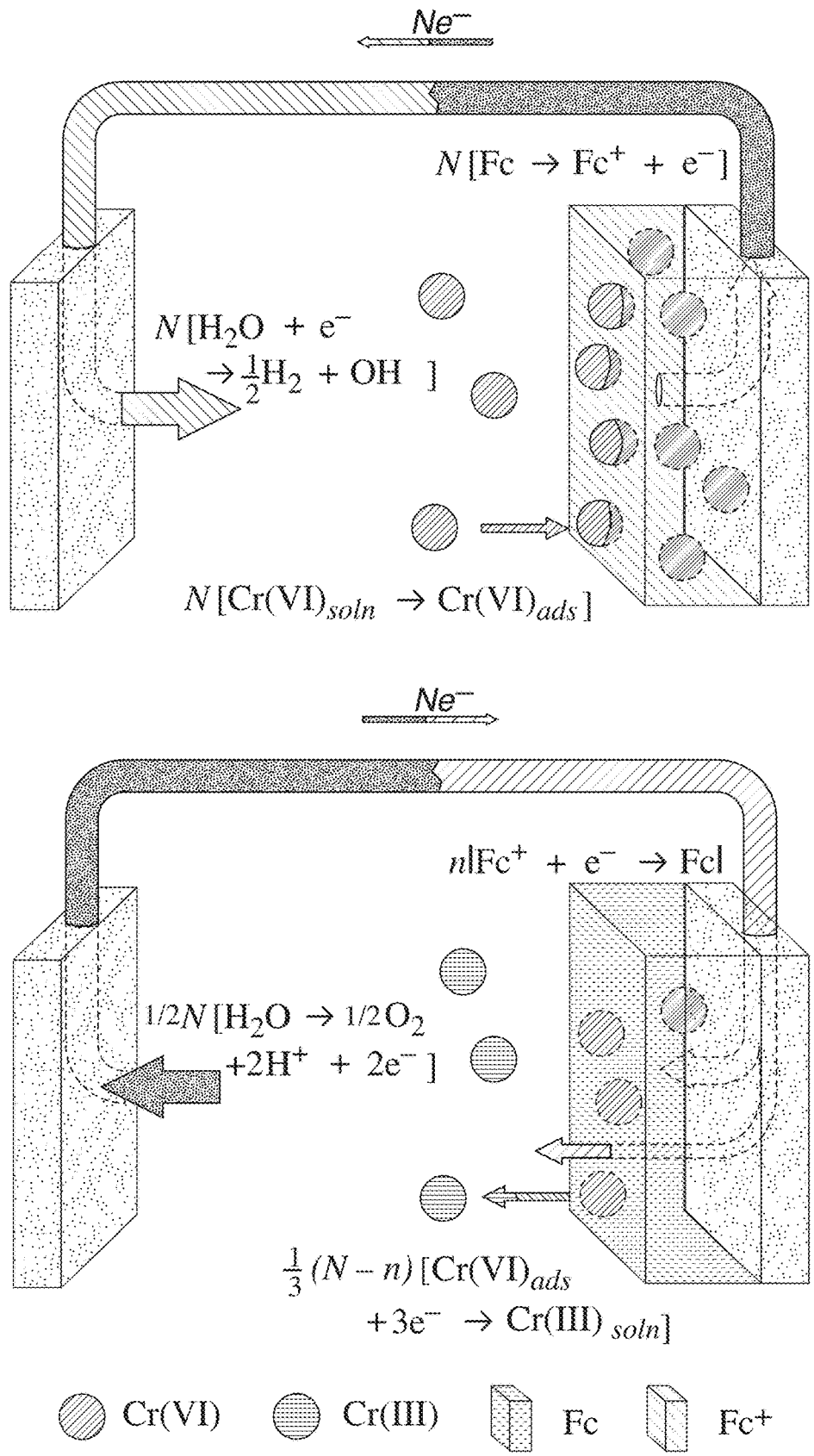
FIG. 3B shows a schematic diagram indicating Faradaic reactions occurring at the surface of an electrode pair, shown during both adsorption and release of chromium ion(s) from an electrode comprising PVF, according to some embodiments.
Figure 3C:
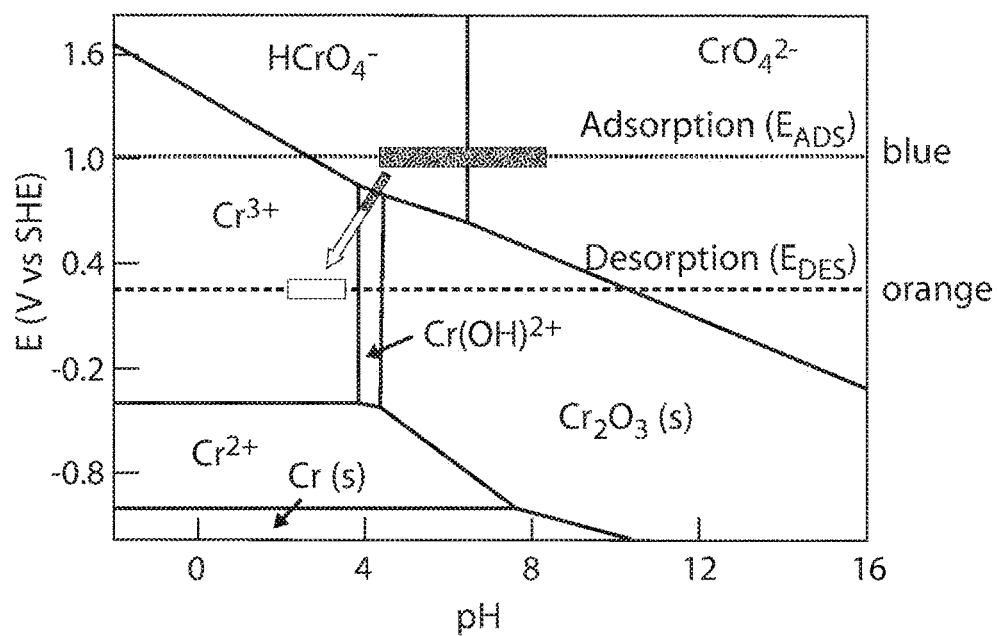
FIG. 3C shows a Pourbaix (E (V)-pH) diagram for chromium speciation predominance, constructed with commercial thermochemical software (FactSage) at 25° C. for 1 mM total chromium concentration in the liquid phase, according to some embodiments.

Regeneration of the redox-electrodes was accomplished through application of a lower potential to reduce $Fc^+$ and release the adsorbed chromium. A series of release conditions were tested including -0.3 V, 0 V, +0.3 V and no applied potential (results shown in FIG. 2F). The release of up to 87% of the adsorbed chromium was achieved at 0 V vs Ag/AgCl. A cycling study was carried out with the electrode charged at +0.8 V vs Ag/AgCl, in the presence of 1 mM chromate for 10 min, and discharged at 0 V vs Ag/AgCl into a clean electrolyte solution for 30 min, which was then assayed for released chromium. FIG. 3A shows that the working capacity of the electrode was retained at close to 55 mg Cr/g adsorbent for a number of cycles with 100% regeneration efficiency per step starting at cycle 2. In addition, no metallopolymer leaching was observed in an ICP assay for Fe in the liquid phase, or from an XPS analysis of the PVF surface (equivalent iron % before and after). FIG. 3A shows: Recyclability of the electrode over a number of discharge cycles (+0.8 V adsorption, 0 V discharge), as given by the normalized mass released (in blue), and the regeneration efficiency (%) in red, the latter denoting the relative amount of Cr recovered relative to that adsorbed in each cycle. FIG. 3B shows: The Faradaic reactions that were occurring at the surface of the electrode pair are shown during both adsorption and release. During adsorption, hexavalent chromate was captured by the anode through selective binding, whereas during release, reduction of ferrocenium to ferrocene and of Cr(VI) to Cr(III) occurred. FIG. 3C shows: The E-pH diagram for chromium speciation predominance, constructed with commercial thermochemical software (FactSage) at 25° C. for 1 mM total chromium concentration in the liquid phase. The adsorption and desorption potentials are noted, with the range of solution conditions marked both for adsorption (in blue) and desorption (in orange).

Figure 21:
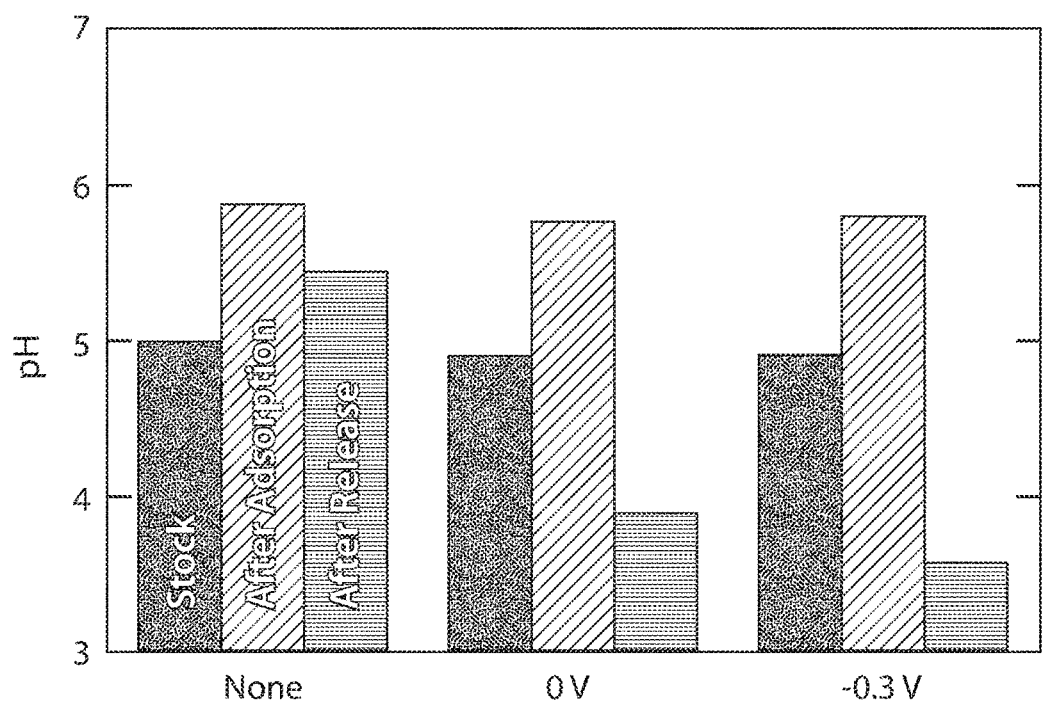
FIG. 21 shows a plot characterizing solution pH before adsorption, after adsorption and after release of chromium (for a swing of 30 min adsorption at +0.8 V vs Ag/AgCl, 30 min release at +0 V vs Ag/AgCl), according to some embodiments.
Figure 22:
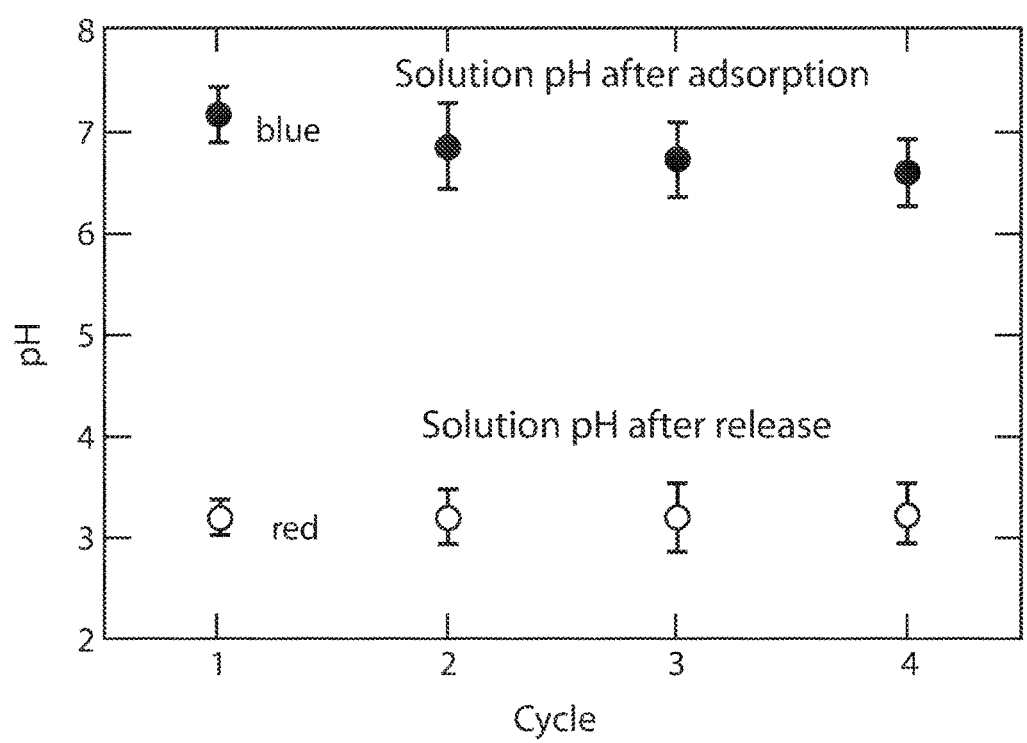
FIG. 22 shows a plot characterizing solution pH after electrosorption of the adsorption stock (in blue), at +0.8 V vs Ag/AgCl in 1 mM dichromate, 20 mM $NaClO_4$ for 30 min, and solution pH of the release solution (20 mM $NaClO_4$) for 30 min (in red), according to some embodiments.

An illustrative scheme showing the full adsorption and release cycle is shown in FIG. 3B. A closer look at the voltage E-pH (aka Pourbaix) diagram increased understanding of the pathways for chromium transformation during this electrochemical process (FIG. 3C). The pH of the adsorption mixture was initially ~pH=5, and slowly increased during adsorption due at least to both water and oxygen reduction at the counter electrode (FIG. 21 and FIG. 22). During discharge, the pH sharply dropped to ~3.2 to 3.5 due at least to water oxidation at the counter electrode. During the adsorption step, an electrochemical potential above +0.8 V vs Ag/AgCl, or 1.0 V vs SHE, was applied, a range over which the anionic chromium dominated ($CrO_4^{2-}$, $HCrO_4^-$, or $Cr_2O_7^{2-}$, depending on the pH and total chromium concentration). Over the range of concentrations tested (0.1 mM-10 mM) and at pH=5, $HCrO_4^-$ was the predominant species prior to adsorption. As shown by XPS, in-situ TEM and the various adsorption tests, there was a strong selectivity of PVF for the chromate species over other competing anions during electrosorption following oxidation of the PVF-CNT electrode. To promote discharge of the captured ions, a lower reduction potential was applied (0 V vs Ag/AgCl, +0.2 V vs SHE), which brought the system down to a region in which cationic forms of chromium predominated (e.g. $Cr(OH)_{3-x}^{x+}$). A negative potential (-0.3 V vs Ag/AgCl), even though it promoted a rapid desorption of the chromium from the ferrocene film, resulted in chromium re-adsorption onto the negatively polarized electrode after a certain period of time, probably due at least to the cationic predominance of $Cr^{3+}$ and $Cr(OH)_2^+$. On the other hand, the +0.3 V run showed a discharge profile comparable to that of the diffusion-controlled release of chromium (FIG. 2F), pointing to a slower reduction of the ferrocene units and subsequent release of chromium. The higher release at an applied potential of 0 V implied a tradeoff between reduction of the metallopolymer and re-adsorption of any cationic chromium.

The spontaneous conversion of Cr(VI) to Cr(III) at the surface of the electrodes was corroborated by the XPS observation of a significant accumulation of $Cr(OH)_{3-x}^{x+}$ on the electrode, based on the binding energy shift (Cr $2p_{1/2}$ at 587.2 eV and Cr $2p_{3/2}$ at 577.7 eV), as well as the Cr(VI) shoulder at 580 eV (FIG. 19). The XPS profile supported the supposition of a surface induced conversion of Cr(VI) to Cr(III). Chromate reduction by free ferrous iron (Fe(II)), in which water acts as a co-reagent, has been reported for natural aquatic systems. This method coupled an electrochemical reduction step following removal of the chromate ions from the feed solution during the oxidation step. A liquid-phase spectrophotometric assay to evaluate the degree of Cr(VI) conversion to Cr(III) in the aqueous phase before and after reduction showed that both the stock solution (containing 1 mM $NH_4Cr_2O_7$) and the supernatant after adsorption contained Cr(VI) as the majority species (>98%). The preservation of the hexavalent form of chromium even after electrochemical treatment under oxidation indicated that application of +0.8 V vs Ag/AgCl did not change the oxidation state of bound Cr(VI). Also, the neutral ferrocene polymer showed no molecular affinity for the anions, as both XPS and spectrophometric assays indicated no conversion of Cr(VI) to Cr(III). However, after discharge at 0 V vs Ag/AgCl, 81% of the released chromium was found to be in the trivalent state of Cr(III), providing strong evidence that the electrochemically-mediated release step promoted the transformation.

Figure 14:
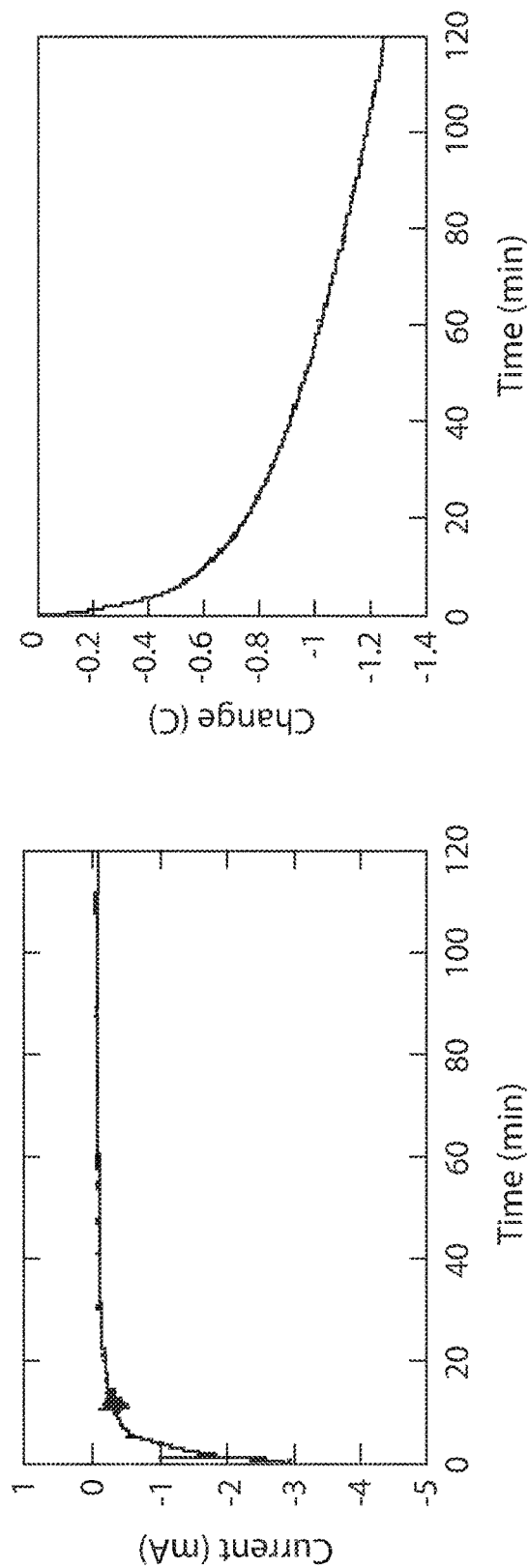
FIG. 14 shows plots characterizing (left) discharge of PVF-CNT electrode, loaded with dichromate under conditions specified in FIG. 13, at +0 V vs Ag/AgCl into clean electrolyte solution (20 mM $NaClO_4$), and (right) charge passed through PVF-CNT at +0 V during regeneration, according to some embodiments.

Without wishing to be bound by any particular theory, it is believed that the anode was important in the synergistic reduction of the chromium oxyanion at the cathode during the release process (FIG. 3B). Not only did water oxidation at the anode provide the electrons for reduction of both PVF and Cr(VI), but the protons produced regulated the pH towards a range in which the cationic species was soluble (see the E-pH diagram in FIG. 3C), and, conveniently, acted as co-reagents in the reduction of Cr(VI) to Cr(III) species. A charge balance on the electrochemical system for electrons transferred to the cathode for Cr(VI) and PVF reduction, and from the anode, with the production of protons, gave a cathode current efficiency of around 100%; the calculated value of ~1.27 Coulomb transferred to the cathode, based on the assumption of full ferrocene reduction coupled with the equivalent Cr(VI) transformation, agreed well with the experimentally determined value of 1.24 Coulomb of charge transferred during regeneration (FIG. 14). The balance of protons (based on pH change and estimated consumption during dichromate conversion) gave a theoretical anodic charge that also matched the cathodic charge. Thus, contrary to some other applications in which Faradaic solvent reactions were detrimental to selective separations and should have been suppressed, it was shown here that for cathodic regeneration of PVF, water oxidation aided in the regulation of the solvent pH in favor of the equilibrium speciation of chromium and enhanced the environmental remediation process.

Figure 4A:
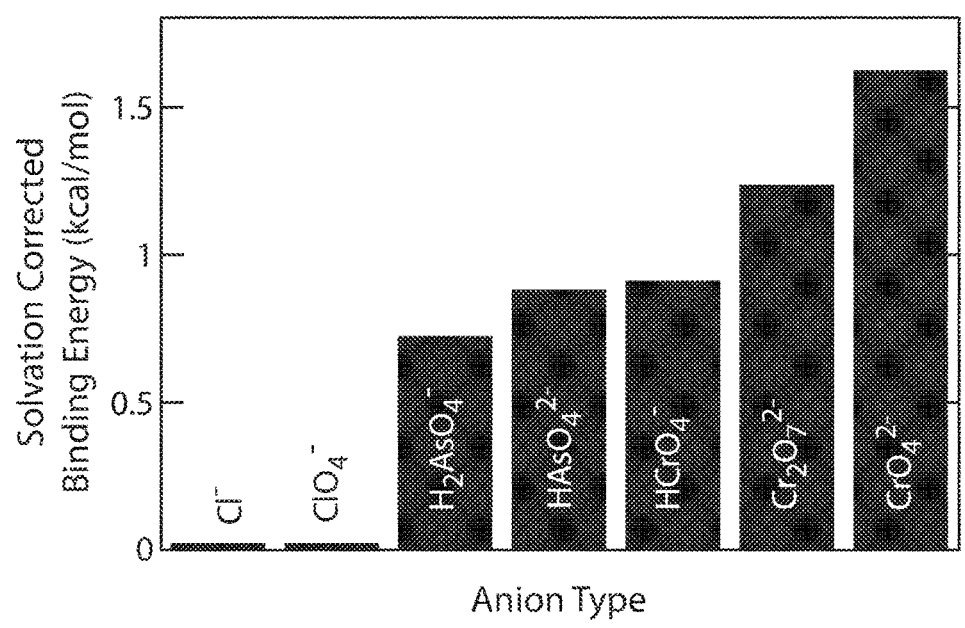
FIG. 4A shows a plot comparison of zero-temperature, solvation corrected binding energies calculated by DFT between ferrocenium and a range of oxyanions, according to some embodiments.
Figure 4B:
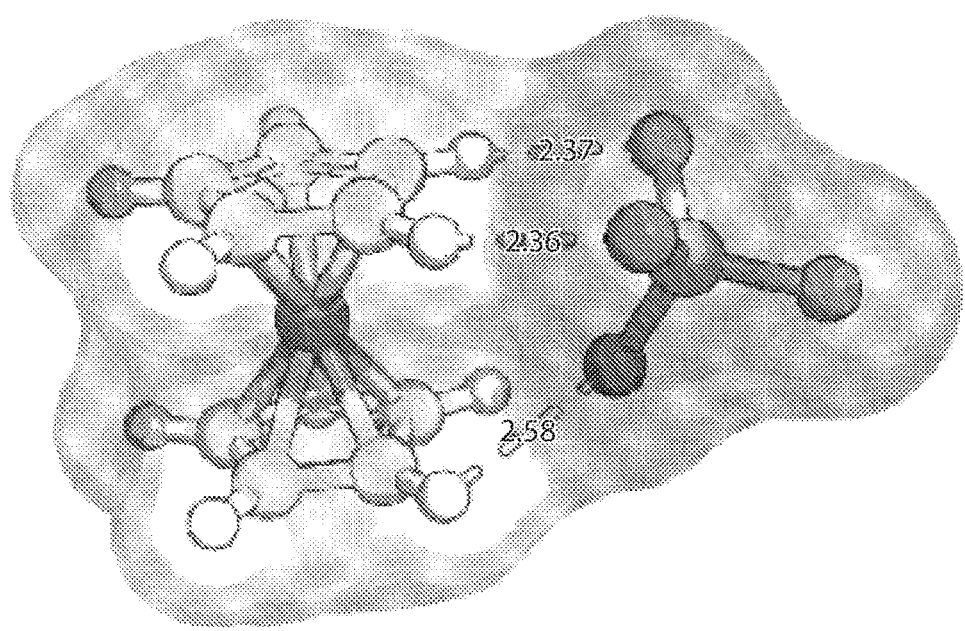
FIG. 4B shows a schematic diagram of an electronic structure optimization of chromate ($CrO_4^{2-}$) with ferrocenium ($Fc^+$), according to some embodiments.

Finally, the selectivity of the electrosorption step for heavy metal oxyanions (chromium and arsenic) over chloride and perchlorate was investigated by density functional theory (DFT) calculations that allowed for water solvation effects. FIG. 4A shows the calculated binding energies between ferrocenium and a range of chromium and arsenic-containing oxyanions ($Cl^-$, $ClO_4^-$, $HCrO_4^-$, $CrO_4^{2-}$, $Cr_2O_7^{2-}$, $H_2AsO_4^-$, and $HAsO_4^{2-}$). In contrast with previous DFT calculations for ferrocene under gas phase conditions, explored here were the strong screening effect of solvation for chloride or perchlorate, and the strong selectivity towards electron-rich HMOAs. The overall binding energy values in the present work were more accurate as these plane-wave based calculations did not need to account for basis-set superposition errors under solvation. For instance, the bindings between $Fc^+$ and $CrO_4^{2-}$, $Cr_2O_7^{2-}$, and $HAsO_4^{2-}$ were calculated to be 1.62, 1.22, and 0.91 kcal/mol, respectively, but only 0.018 and 0.015 kcal/mol for $Cl^-$ and $ClO_4$, even though the geometry optimizations were similar for perchlorates, arsenates and chromates (FIG. 4B). These results strongly implied an underlying electronic effect. The average O—H distance (Cl—H for Fc—Cl) for these structures also corresponded to the shorter $d_{O-H}$ with stronger binding (Table Si).

Figure 4C:
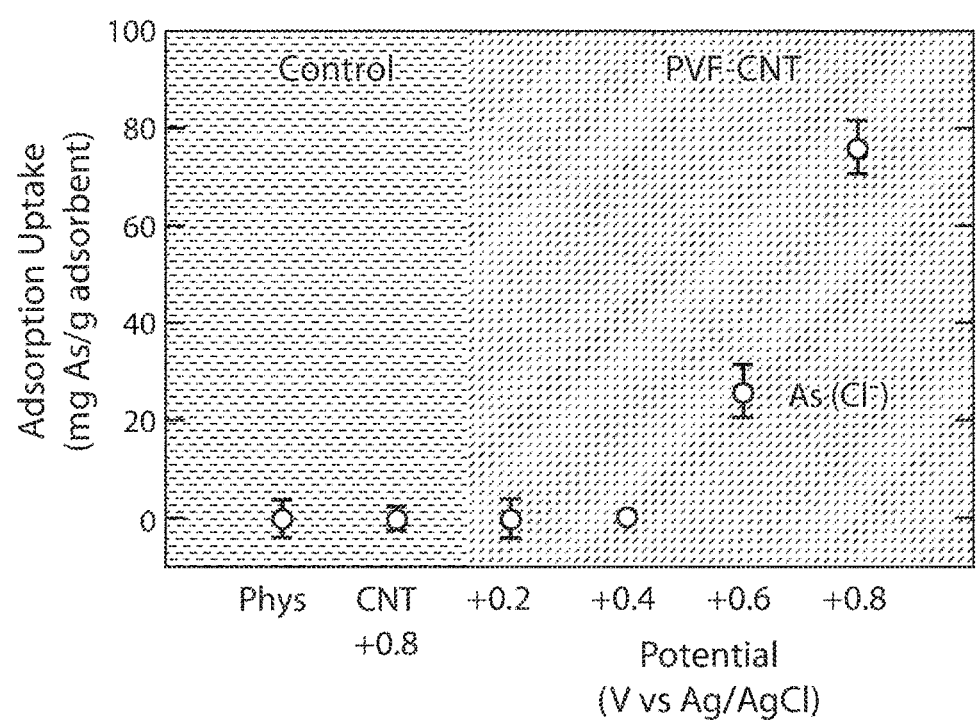
FIG. 4C shows a plot characterizing adsorption capacity of arsenate at 1 mM $KH_2AsO_4$ in the presence of 20 mM NaCl, using PVF-CNT under different applied potentials, according to some embodiments.
Figure 4D:
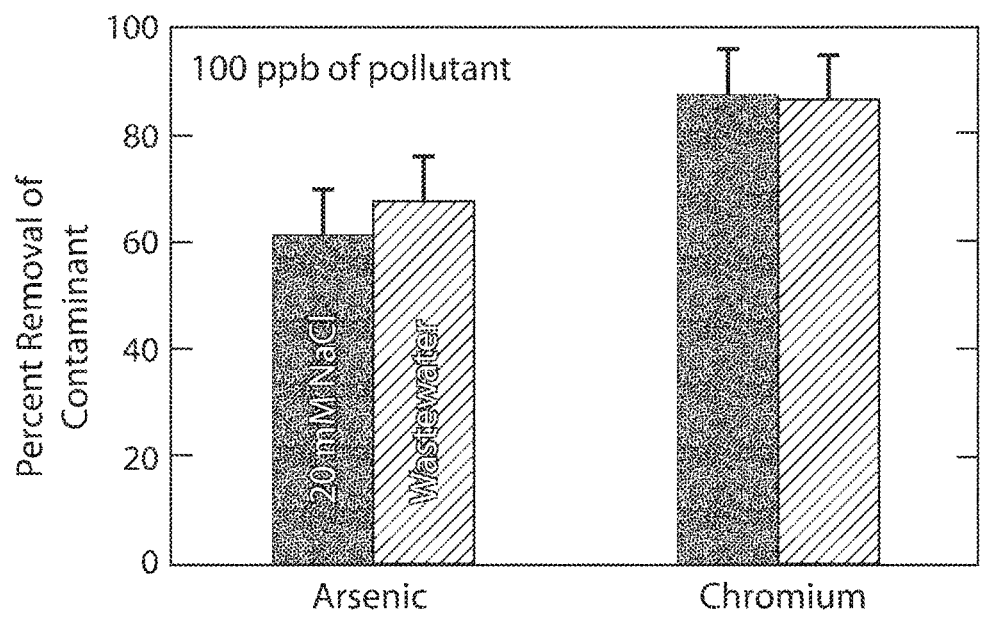
FIG. 4D shows a plot characterizing removal efficiency of chromium and arsenic under different water matrices, including a municipal secondary-effluent solution spiked with Cr and As at 100 ppb for 120 min of charging (4 mg PVF on the electrode), according to some embodiments.

FIG. 4A shows: Comparison of zero-temperature, solvation corrected binding energies calculated by DFT between ferrocenium and a range of oxyanions. The binding energy for chromium and arsenic-based anions was remarkably stronger than for the purely electrostatic attraction of chloride and perchlorate. FIG. 4B shows: Electronic structure optimization of chromate ($CrO_4^{2-}$) with ferrocenium ($Fc^+$), indicating that despite similar structural effects to perchlorate binding, the main governing contribution to selectivity was derived from charge transfer. FIG. 4C shows: Adsorption capacity of arsenate at 1 mM $KH_2AsO_4$ in the presence of 20 mM NaCl, using PVF-CNT under different applied potentials. FIG. 4D shows: Removal efficiency of chromium and arsenic under different water matrices, including a municipal secondary-effluent solution spiked with Cr and As at 100 ppb for 120 min of charging (4 mg PVF on the electrode). A Bader's charge analysis showed that a significant fraction of electrons were transferred from the heavy-metal oxyanions (HMOA) to the oxidized ferrocene centers (Table Si). The strong binding of $Fc^+$ with $CrO_4^{2-}$ and $HAsO_4^{2-}$ corresponded to more electron loss from the anions (0.30, and 0.41 |e|), indicating that charge-transfer played a dominant role in regulating binding selectivity. An atom-by-atom analysis of the electron transfer showed that the oxygens on the HMOAs were much more susceptible to losing electrons to ferrocenium than those from the non-HMOAs, e.g. $Cl^-$ or $ClO_4$, due at least to significant differences in their intrinsic electronegativities, as the $ClO_4$ (containing only halide and oxygen) was clearly more electronegative than $CrO_4^{2-}$ (containing a heavy metal center); thus the electron cloud of $ClO_4$ was much less polarizable than that of $CrO_4^{2-}$, and much less attracted to $Fc^+$. This electron cloud polarizability/charge transfer can be quantified in terms of the ionization potential (I.P.) of the solvated anions, I.P.=$E_A^{0/-} - E_A^{-/2-}$, which was interpreted as the energy required to remove one electron. A higher I.P. value indicated a higher barrier for electron-transfer, roughly correlating with a weak $Fc^+$ binding. Under water solvation, the calculated I.P. values of $Cl^-$ and $ClO_4$ (>7.2 eV) were higher than those of the chromates and arsenates studied here. Furthermore, the I.P. values for $CrO_4^{2-}$ and $HAsO_4^{2-}$ were smaller than those for all other anions (5.6 and 5.2 eV), consistent with the higher charge transfer and stronger binding.

While qualitatively powerful, zero-temperature calculations generally cannot be compared directly with experimental binding energies. Entropy-corrected binding calculations were performed to investigate the effect of finite temperatures on the intermolecular interactions and thereby provide more meaningful values for the binding energies. Owing to the heavy computational costs for the optimization of the structures for this task (see details elsewhere in this example), $Cl^-$, $ClO_4^-$, $CrO_4^{2-}$, and $HAsO_4^{2-}$ were selected as validation cases to explore the importance of vibrational entropy in determining molecular selectivity. The binding energies of these four compounds with ferrocenium, accounting for both solvation and entropy corrections, were 2.90, 3.47, 5.53, and 4.73 kcal/mol, respectively. On comparison of these data with zero-temperature binding energies (0.02, 0.02, 1.62, and 0.91 kcal/mol, respectively), it was evident that vibrational entropy contributed greatly to the selectivity of the binding events. In addition, the overall trend in the interaction energies predicted by the zero-temperature calculations was preserved. These results further strengthened the mechanistic understanding of the electronic nature of the interactions, and of the strong charge transfer mediated discrimination between these compounds. These guidelines are expected to provide important future design rules for HMOA capture, and establish redox-electrodes as electrochemically-efficient and molecularly-tunable platforms for chemical and environmental separations.

Separation of arsenate indeed showed a significant selectivity and adsorption uptake in competition with chloride at 1 mM $AsO_4^-$, 20 mM NaCl (FIG. 4C), in agreement with theoretical calculations. XPS analysis indicated that arsenic, under +0.8 V adsorption and +0 V release remained in the pentavalent arsenate state (FIG. 20), while also confirming the strong selectivity over chloride by the surface elemental partitioning. The release experiments showed reversible performance equivalent to that of chromium (FIG. 17), with a desorption trend that supports the anionic bound state (higher release at more negative potentials). Finally, the removal efficiency for chromium and arsenic at 100 ppb was tested in the presence of a brackish concentration of sodium chloride (20 mM NaCl) and secondary effluent wastewater collected from the Deer Island Wastewater treatment plant (with a conductivity comparable to an ionic strength of ~20-30 mM). It was observed that >80% removal was achieved within 2 hrs of electrochemical adsorption (FIG. 4D), limited only by the capacity of the electrode.

Figure 5A:
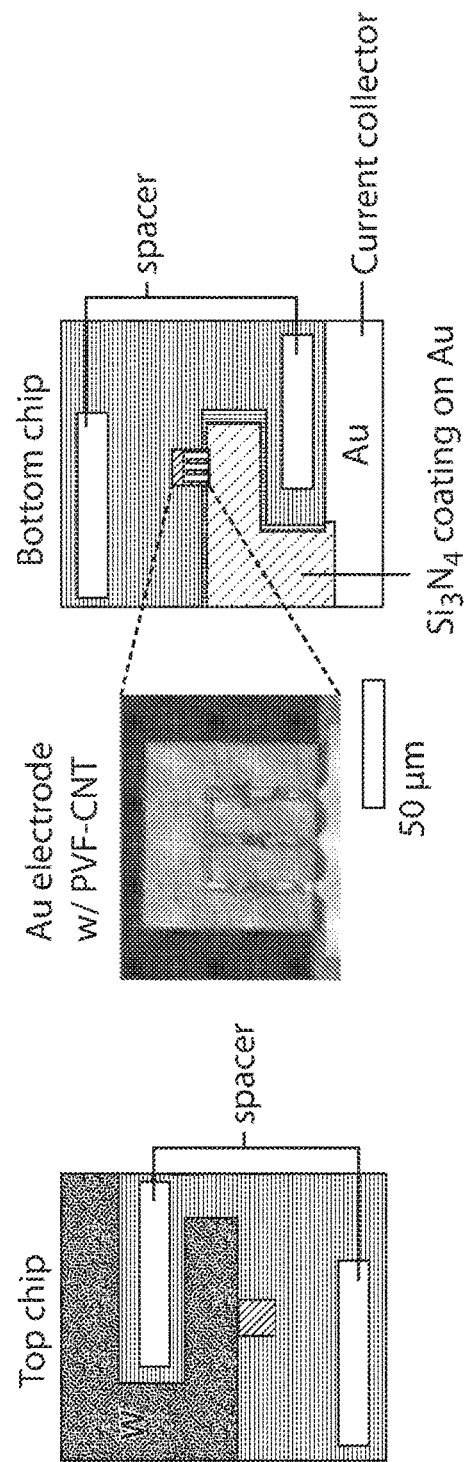
FIG. 5A shows a schematic illustration of the top and bottom chips for a liquid cell, and an optical micrograph image of a PVF film deposited on an Au electrode patterned on a $Si_3N_4$ membrane window, according to some embodiments.
Figure 5B:
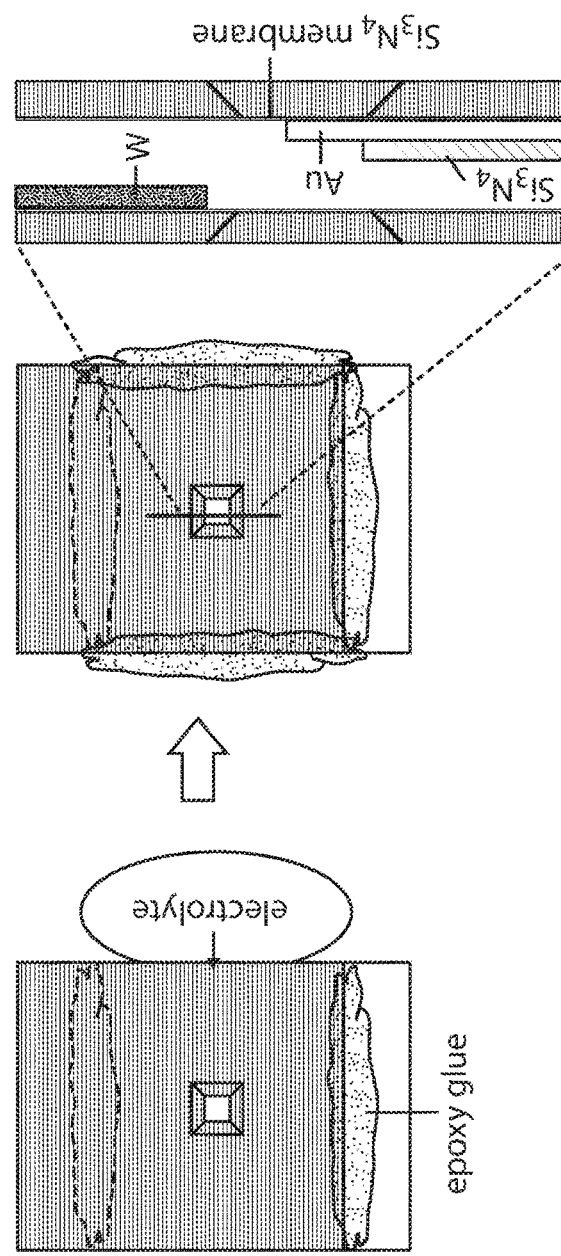
FIG. 5B shows a schematic illustration of a chip assembly process, according to some embodiments.

Finally, the nanoscale behavior of the metallopolymer under electrical stimulus was studied through in-situ transmission electron microscopy (TEM) measurements in a liquid-confined cell (FIG. 5A, FIG. 5B). In-situ electrochemical TEM has been introduced as a tool to study the kinetics and surface behavior of a variety of electrochemical materials and processes, ranging from lithium-ion batteries to electrodeposition. From a fundamental perspective, investigations on the nanoscale behavior of metallopolymers under electrochemical control are of great importance for the understanding of adsorption mechanisms and future materials design. During electrochemical oxidation of the electrode materials, ion and solvent transfer can cause local swelling of the polymers, and affect electrochemical and chemical properties. Indeed, studies of the behavior of thin-film ferrocene polymers under voltage and current response have played a central role in heterogeneous electrochemistry, as they provide a model system for fast electron-transfer and dynamics of solvation. Poly(vinyl)ferrocene was electrodeposited from chloroform onto gold microelectrodes to form a thin uniform film (see elsewhere in this example and FIG. 6-FIG. 11 for more details). Initially, 20 mM $NaClO_4$ was introduced into the liquid cell as a model electrolyte for simulating brackish conditions. Cyclic voltammetry at a 0.01 V/s scan rate of up to 2 V revealed a sharp expansion of the polymer film once the oxidation potential of the ferrocene (Fc) units was attained (FIG. 5C, with associated LSV in FIG. 12), with a 30% increase in thickness. This expansion was attributed to the ingression of the counter anions together with their associated waters of solvation as $Fc \rightarrow Fc^+$, a phenomenon that has been inferred through indirect spectroscopic measurements[36], but which was observed directly here through microscopic imaging under TEM.

Figure 5C:
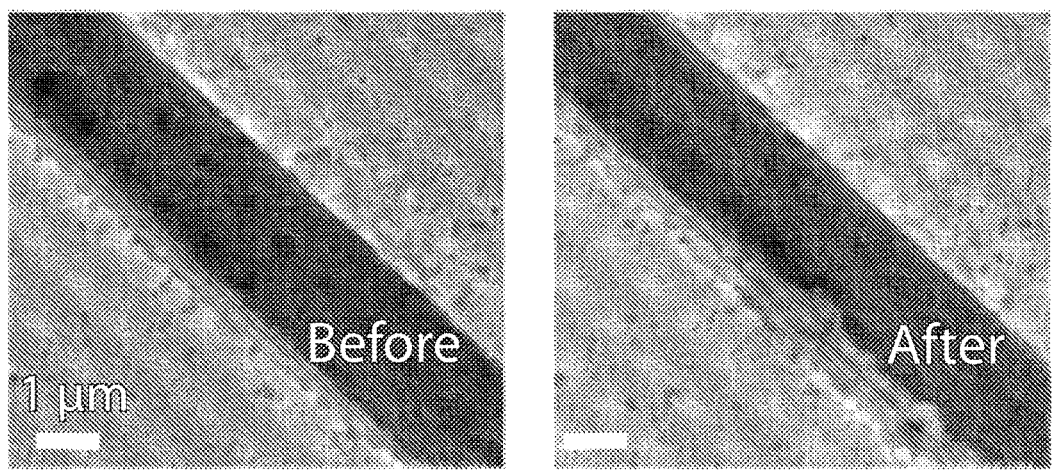
FIG. 5C shows in-situ transmission electron microscopy (TEM) micrographs of a PVF layer on top of a gold chip before and after introducing a solution of 20 mM $NaClO_4$ and applying a CV @ 0.1 V/s to the two-electrode system, according to some embodiments.

FIG. 5A shows: Schematic illustration of the top and bottom chips for the liquid cell. The optical micrograph image shows the PVF film deposited on the Au electrode patterned on the $Si_3N_4$ membrane window. FIG. 5B shows: Chip assembly process. The two chips were overlapped and the two sides of the perimeter sealed with epoxy glue. The electrolyte was contacted with the side opening and injected into the cell via the capillary effect. A magnified cross-sectional view at the windows is illustrated. Detailed fabrication procedures for each component are given elsewhere, in Kushima, A. et al. Liquid cell transmission electron microscopy observation of lithium metal growth and dissolution: Root growth, dead lithium and lithium flotsams. *Nano Energy* 32, 271-279 (2017), incorporated herein by reference in its entirety. The polymer electrodeposition process is described elsewhere in this example. FIG. 5C shows: In-situ TEM micrograph of PVF layer on top of gold chip. A solution of 20 mM $NaClO_4$ was introduced and a CV @ 0.1 V/s was applied to the two-electrode system; a clear expansion of the PVF film was seen following ion insertion.

Figure 5D:
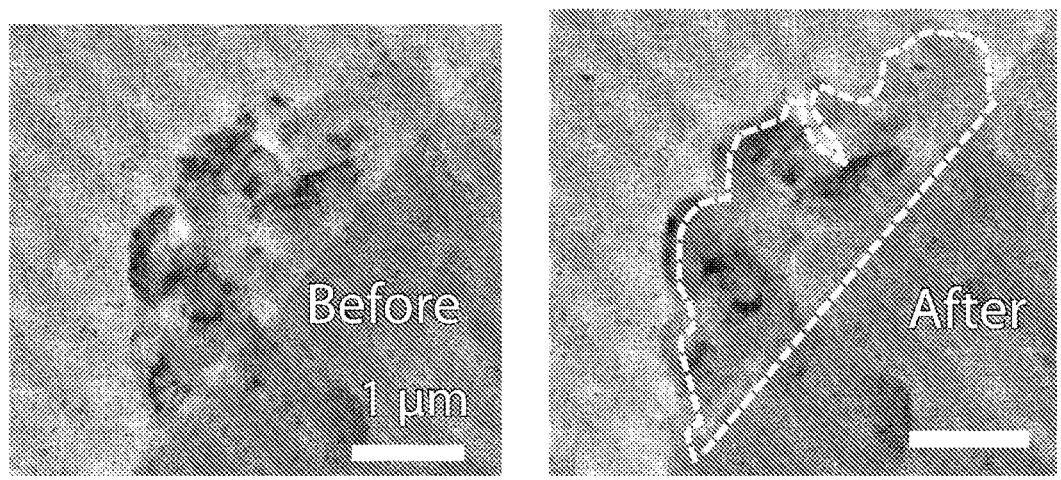
FIG. 5D shows in-situ TEM micrographs indicating swelling and contrast change of a PVF film under electrochemical modulation in the presence of 10 mM $(NH_4)_2Cr_2O_7$, according to some embodiments.

FIG. 5D shows: Swelling and contrast change of a PVF film under electrochemical modulation in the presence of 10 mM $(NH_4)_2Cr_2O_7$. See elsewhere in this example for all associated cyclic voltammograms for FIG. 2C and FIG. 2D.

Figure 12:
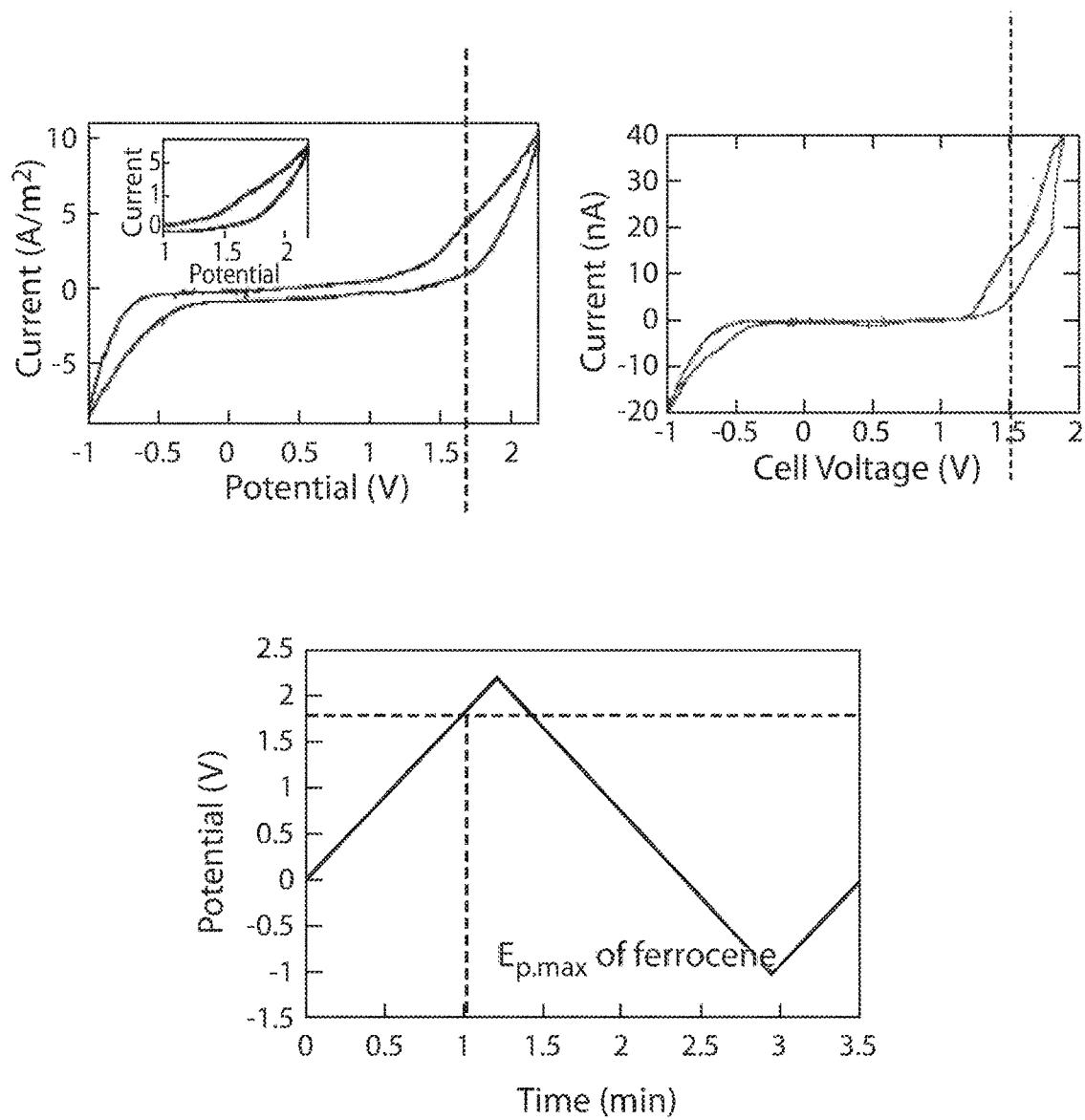
FIG. 12 shows plots for a comparison of microchip response in the presence of 20 mM $NaClO_4$ (left) and 10 mM $NH_4Cr_2O_7$ in solution (right), under a 0.01 V/s scan-rate, and (bottom) a linear scan voltammetry (LSV) plot for the range in which movies were taken, according to some embodiments.

Desorption occurred on a much slower time-scale due at least to electron transfer and ion-pair dissociation kinetics during ion release and diffusional restructuring of the interfacial film as the ferrocenium ($Fc^+$) reverts to Fc. Unlike purely organic polymers, metallopolymers were found to provide sufficient contrast for direct electron imaging due at least to the presence of the metal centers. Reversible ion uptake and desorption were clearly observed with dichromate (10 mM $NH_4Cr_2O_7$) as well. Due at least to the higher contrast of the heavier Cr ion (FIG. 5D), an up-concentration of the anion within the film was seen upon application of an oxidative potential. Chromium binding was observed in a series of movies taken at different locations on the coated electrode, indicating the fast kinetics of film swelling (<5 s). In the case of chromium, there was a shift in the oxidation potential of the PVF film towards lower potentials relative to those observed with the perchlorate anion, indicating the strong binding affinity of ferrocenium for chromate anions (FIG. 12). Finally, no second-phase particle growth was observed in the TEM measurements under the voltage ranges tested, indicating that molecular binding played a major role, and that phase transformation processes were not significant under these conditions.

In summary, this example demonstrates the successful investigation of the anion-selective properties of the redox metallopolymer ferrocene for the removal of chromium and arsenic heavy-metal oxyanions from water under realistic operating conditions. PVF-CNT electrodes were used for the selective adsorption of two of the most prevalent and toxic HMOAs, with a high adsorption capacity (>100 mg/g at saturation) and remarkable regeneration properties. For chromium, a coupling of the release and regeneration of the electrodes resulted in transformation of the hexavalent pollutant into the less harmful trivalent form. From a practical perspective, this two-step electroswing process may facilitate the purification of a water stream under dilute pollutant concentrations while simultaneously reducing the byproduct toxicity. In addition, the system presented fast kinetics, and was an order-of-magnitude more active compared to various ion-exchange beds or even non-redox electrochemical systems, making it suitable for, e.g., household and remote-site water purification, environmental remediation, and high-throughput industrial operations. In-situ TEM measurements with an electrochemical liquid-cell provided direct evidence of the redox-driven anion insertion into the poly(vinyl) ferrocenium film under charge, and the high affinity of the films for dichromate anions. This work highlights the power of redox-mediated/Faradaic systems for the selective environmental capture and remediation of heavy metal oxyanions, by showing strong binding selectivity and the possible coupling to an electron-transfer process that mitigates the toxicity of the adsorbed element. In addition, the counter-electrode reactions were found to be highly synergistic with the environmental transformation occurring at the metallopolymer electrode, pointing to the important role that electrochemical engineering can play in facilitating an efficient reactive separation process. It is also envisioned that the use of these platforms for the recovery and valorization of waste-streams in various chemical and electronic industries for a wider range of transition metal compounds.

Electrode Preparation and Testing: (a) PVF-CNT electrodes for electrochemical separation. The PVF-CNT electrodes were prepared as reported previously. A stock solution A of 80 mg poly(vinyl)ferrocene (PVF) (Polysciences, Inc) and 40 mg multiwalled-CNT (MWCNT, Sigma) was dissolved in 10 mL anhydrous chloroform, and a stock solution B of 40 mg of CNT in 10 mL chloroform was also prepared. The two stock solutions were sonicated for 2 hrs in icy water, and stocks A and B were mixed in a 1:1 ratio. Electrodes were drop-cast using 50 µL of solution, and left to dry at 25° C. For all systems, unless otherwise stated, the immersed electrochemical area was equivalent to 1 $cm^2$ (1 cm by 1 cm) with 2 mg of PVF per electrode.

(b) Electrochemical Adsorption: The electrochemical separations were carried out on a BASi cell in a three-electrode configuration with an aqueous Ag/AgCl reference electrode, and a Pt counter electrode, under ambient conditions. For adsorption and desorption tests, 5 mL of solution were used for the isotherm and equilibrium data measurements, and 8 mL for the kinetics tests. A background electrolyte concentration of 20 mM of either $NaClO_4$ or NaCl was used. To quantify kinetics, 0.1 mL aliquots were taken at variable time points for ICP assay. All electrochemical studies were performed on a VersaSTAT 4 potentiostat (Princeton Applied Research) with automatic IR compensation between 5Ω and 50 MΩ. The uptake values are reported as the adsorption capacity normalized by the mass of the polymer (2 mg of PVF per electrode, unless otherwise stated). For consistency, chronoamperometry was used for all the separation tests in this work with chronopotentiometric measurements yielding comparable results.

(c) In-situ TEM microchip. In-situ TEM observation of the chromate adsorption/desorption on PVF-CNT film was performed on a liquid confining cell. The details of the cell dimensions and the fabrication procedure are provided in Kushima, A. et al. Liquid cell transmission electron microscopy observation of lithium metal growth and dissolution: Root growth, dead lithium and lithium flotsams. *Nano Energy* 32, 271-279 (2017), incorporated herein by reference in its entirety. The liquid cell consisted of two separate chips with $Si_3N_4$ membrane windows (~70 nm thick). The top chip had a tungsten electrode (counter electrode) and the bottom chip a gold electrode (working electrode). The gold electrode was coated with $Si_3N_4$ except for the area on the membrane window to prevent the electrochemical reaction outside of the field of view. The cells/microchips were then held by a mini-alligator clip at the gold current collector, and immersed into a 1 mg/mL PVF solution in chloroform, with 100 mM tetrabutylammonium hexafluorophosphate ($TBAPF_6^-$). Electrodeposition was achieved by the application of a +0.8 V vs Ag/AgCl potential to the microchip for 5 min to achieve a favorable coating. The coating was observed under a high-resolution optical microscope. The optimization of the process under different electrochemical conditions, electrolyte chemistries and concentrations is given elsewhere in this example (FIG. 6-FIG. 11). Once the polymer film was deposited on the assembled chip, the electrolyte was injected and the cell was completely sealed. The cell was mounted on a Nanofactory Scanning Tunneling Microscope (STM)—TEM holder. Autolab PGSTAT101 was connected to the holder to perform the electrochemical tests. JEOL 2010F (operated at 200 kV acceleration voltage) was used for the in-situ TEM imaging. The configuration of the liquid cell chips and the assembly procedure are illustrated in FIG. 5A.

Liquid-phase analysis: (a) Inductively Coupled Plasma (ICP)—Optical Emission Spectroscopy (ICP-OES). A PerkinElmer Optima 8000 ICP-OES spectrometer was used to quantify the concentrations of chromium and arsenic in solution. To establish a baseline for the ICP readings, a 2% w/w $HNO_3$ solution was prepared from 70% $HNO_3$ (Sigma-Aldrich, ACS reagent), and used as the solution into which the adsorbed species were electrochemically discharged, as well as to dilute any concentrated samples. Calibration solutions were made by diluting the ICP calibration standards (1000 mg/L±2 mg/L, 2% w/w $HNO_3$) from Fluka Analytical, TraceCERT® prepared 2% w/w $HNO_3$ solution. A total of four calibration samples were prepared for each of the three cations examined, at concentrations of 10 mg/L, 1 mg/L, 0.5 mg/L, and 0.1 mg/L (with 2% w/w $HNO_3$ being 0 mg/L). After calibration, the linear fit was visually inspected, and the instrument was also set to perform a quality control check by resampling the 10 mg/L calibration solution to ascertain its calibrated concentration measurement. Each solution sample was measured in triplicate by the spectrometer to yield an averaged reading. (b) Spectrophotometric analysis of Cr oxidation state: To measure the content of Cr(VI) in the aqueous samples, a one-step colorimetric assay was used (BioAssay Systems QuantiChrom Chromium Assay Kit, DCRM-250). The method relied on a mix-incubate-measure protocol, and the samples of the solution were pre-diluted to fit within the 0.02-2 mg/L range for the assay. Whereas the amount of Cr(VI) was directly measured, the amount of Cr(III) was estimated by the difference in the total amount of Cr from ICP relative to that Cr(VI), and also confirmed by an acid treatment to convert all Cr(VI) to Cr(III).

Electronic Structure Calculations: Density functional theory calculations were performed based on a generalized gradient approximation (GGA-PBE form) treatment of the exchange correlation method, implemented in the Vienna ab initio simulation package (VASP). The projector augmented wave and plane-wave methods were used to describe core and valence electrons, respectively. The cutoff energy was set to be 400 eV, and in order to include the van der Waals interactions between moieties, Grimme's DFT-D3 scheme was adopted. Since the gas phase calculations greatly overestimate the interaction between molecules, an implicit water solvation model that described the electrostatics, cavitation, and dispersion effects was applied. In order to obtain the ground state, multiple different geometric configurations were used as initial structures for each system, which were then optimized without any symmetry constraints. The binding energy was defined as B.E.=$E_A^{-/2-}+E_{Fc}^+-E_{AFc}^{0/-}$, where E refers to the total energy of the studied moiety. According to these calculations, the overall interaction trend in the gas phase and with solvation were the same, and as such, discussion herein is based solely on the more physically-relevant interactions with water solvation. In order to account for the entropy contribution to the binding between the ferrocenium and anionic moieties, their Helmholtz free energies at room temperature (300 K) were calculated with the solvation effect included. Following careful optimization of the structures with convergence criteria of $1\times10^{-7}$ eV and $1\times10^{-5}$ eV/A for the total energy and force components respectively, the vibrational frequencies were calculated through perturbation of each atom in all three directions. The Helmholtz free energy was written as:

$$F(T)=E(0)+\tfrac{1}{2}\Sigma_s\hbar\omega_s+k_BT\Sigma_s \ln[1-\exp(-\hbar\omega_s/k_BT)],$$

where the first term, $E(0)$, represents the static energy at 0 K. The second and third terms correspond to the zero-point energy and vibrational energy at finite temperatures, respectively. The $\omega_s$ refers to the s-th vibrational frequency. The room temperature binding energy B.E. (T), accounting for vibrational entropy, was then evaluated by a simple difference: $B.E.(T)=F_{Fc+}(T)+F_{anion}(T)-F_{Fc-anion}(T)$. Variations in the temperature-dependent electron occupation and electron-phonon coupling were neglected. All these calculations were performed in VASP code.

Micro-Chip Preparation

This sub-section shows all the different coating strategies for the micro-chip, and the strong effect of both polymer concentration, deposition time and supporting electrolyte chemistry.

Figure 6:
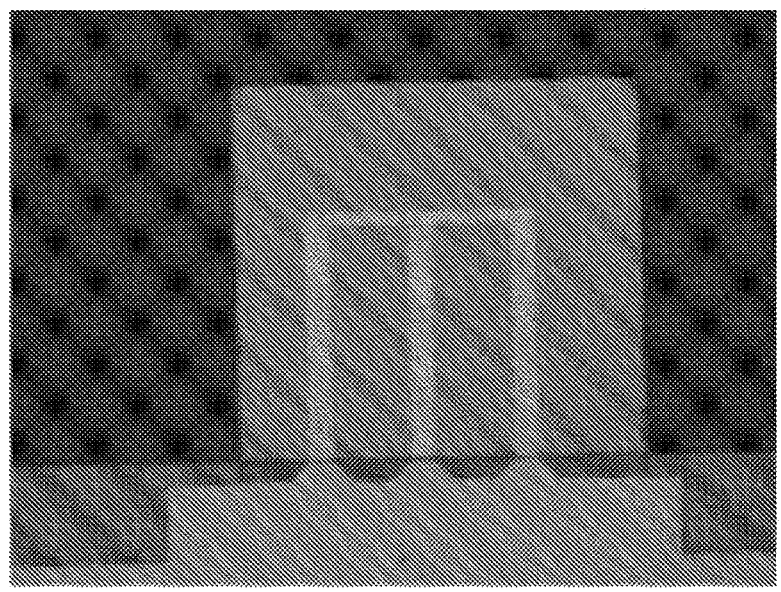
FIG. 6 shows an optical micrograph of an original Gold-Chip, according to some embodiments.

FIG. 6 shows the original Gold-Chip under Optical Microscope.

Figure 7:
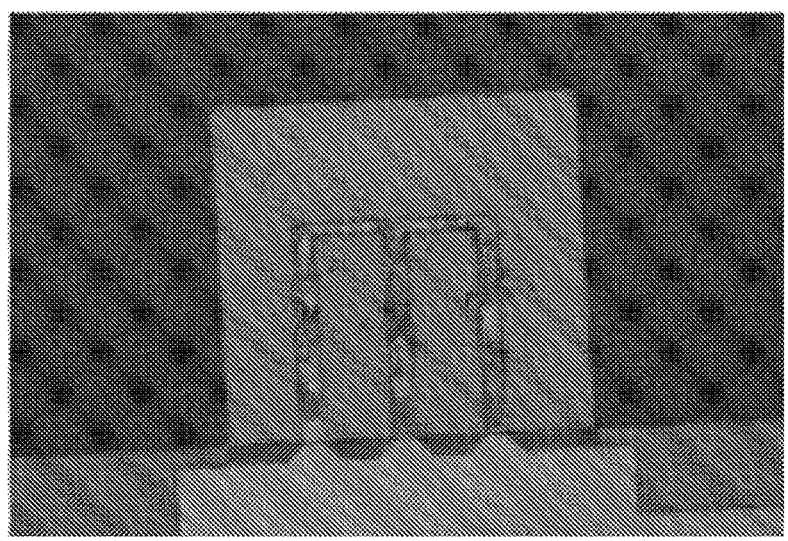
FIG. 7 shows an optical micrograph of a favorable electrodeposition using 0.4 mg/mL of 100 mM $TBAPF_6$ for 5 min under +0.8 V, according to some embodiments.

FIG. 7 shows a favorable electrodeposition using 0.4 mg/mL of 100 mM $TBAPF_6$ for 5 min under +0.8 V.

Figure 8:
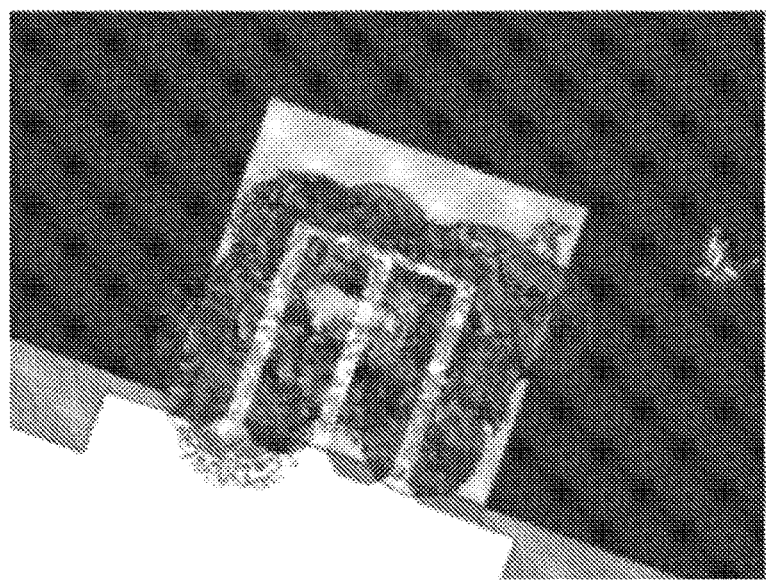
FIG. 8 shows an optical micrograph of +0.8 V vs Ag/AgCl, under 4 mg/mL of PVF in 100 mM $TBAPF_6$ for 5 min, according to some embodiments.

FIG. 8 shows +0.8 V vs Ag/AgCl, under 4 mg/mL of PVF in 100 mM $TBAPF_6$ for 5 min.

Figure 9:
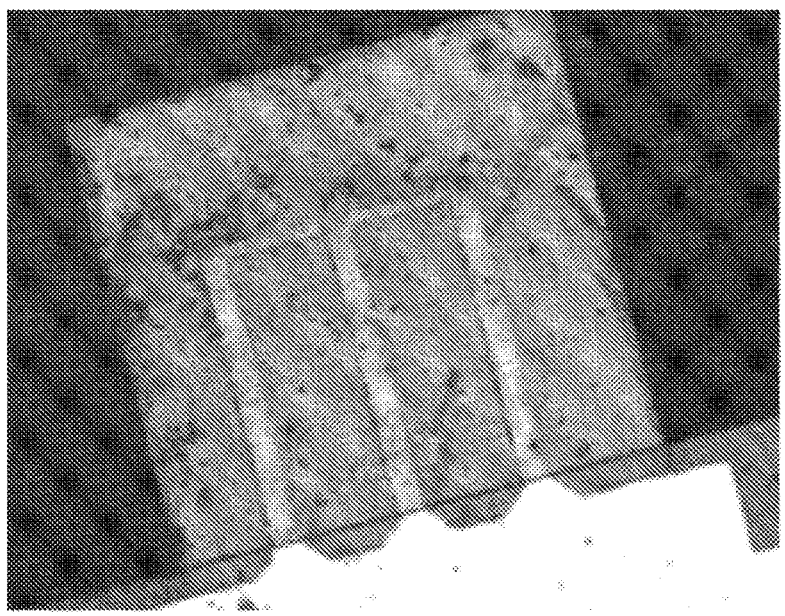
FIG. 9 shows an optical micrograph of +0.8 V vs Ag/AgCl, under 0.4 mg/mL of $TBAPF_6$ for 30 s, according to some embodiments.

FIG. 9 shows +0.8 V vs Ag/AgCl, under 0.4 mg/mL of $TBAPF_6$ for 30 s.

Figure 10:
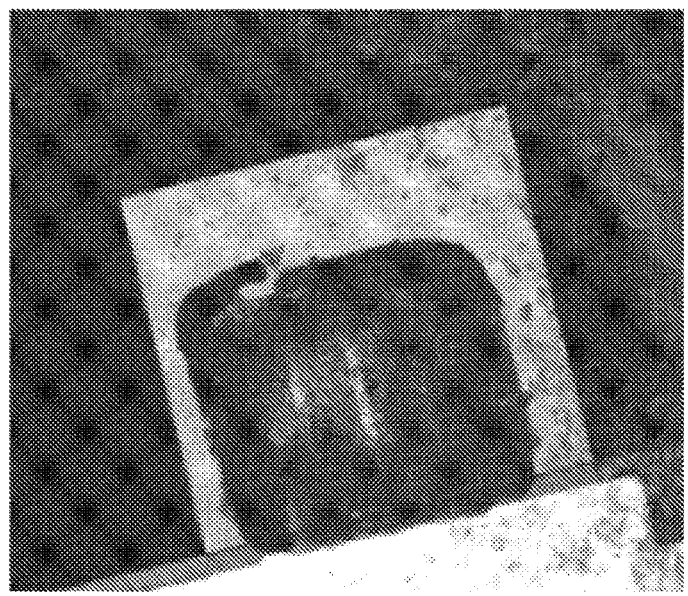
FIG. 10 shows an optical micrograph of +0.8 V vs Ag/AgCl, under 0.4 mg/mL of $TBAClO_4$ for 5 min (chip used with 5-gold electrodes), according to some embodiments.

FIG. 10 shows +0.8 V vs Ag/AgCl, under 0.4 mg/mL of $TBAClO_4$ for 5 min (chip used with 5-gold electrodes).

Figure 11:
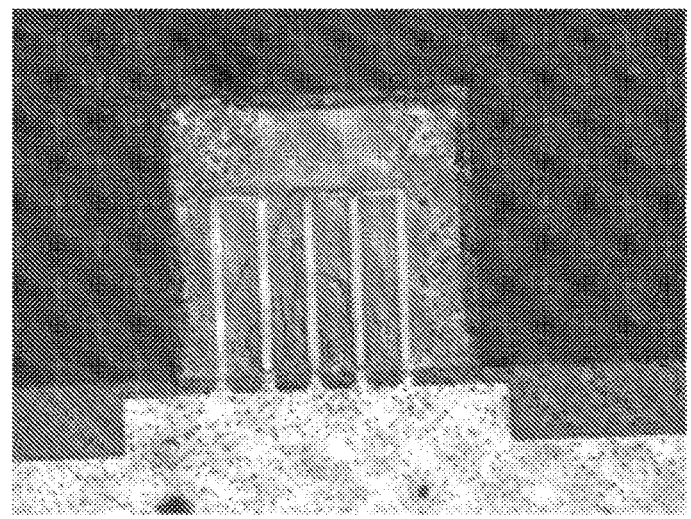
FIG. 11 shows an optical micrograph of drop-cast of a 0.4 mg/mL solution of PVF, without electrochemical potential, according to some embodiments.

FIG. 11 shows drop-cast of a 0.4 mg/mL solution of PVF, without electrochemical potential.

Micro-Chip In-Situ Electrochemical Results

FIG. 12 shows a comparison of microchip response in the presence of 20 mM $NaClO_4$ (left) and 10 mM $NH_4Cr_2O_7$ in solution (right), under a 0.01 V/s scan-rate. Note the much higher charging current and also oxidation favorable shift of the oxidation peak. FIG. 12 bottom: Linear scan voltammetry (LSV) for the range in which the movies were taken.

Electrochemical Measurements Using PVF-CNT Electrodes for Separations

FIG. 13 shows charging of PVF-CNT electrode during adsorption in 1 mM $(NH_4)_2Cr_2O_7$, 20 mM $NaClO_4$ at +0.8 V vs Ag/AgCl.

FIG. 14 shows: Left: Discharge of PVF-CNT electrode, loaded with dichromate under conditions specified in FIG. 13, at +0 V vs Ag/AgCl into clean electrolyte solution (20 mM $NaClO_4$). Right: Charge passed through PVF-CNT at +0 V during regeneration.

Figure 15:
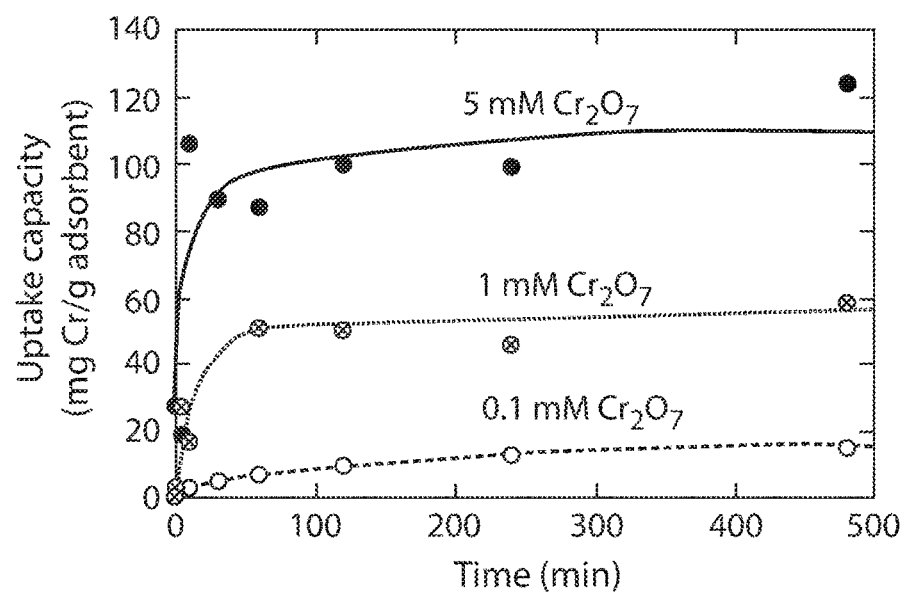
FIG. 15 shows a plot characterizing adsorption kinetics of chromium by PVF-CNT, @+0.8 V in the presence of 20 mM $NaClO_4$ at different dichromate concentrations, according to some embodiments.

FIG. 15 shows adsorption kinetics of chromium by PVF-CNT, @+0.8 V in the presence of 20 mM $NaClO_4$ at different dichromate concentrations.

Figure 16:
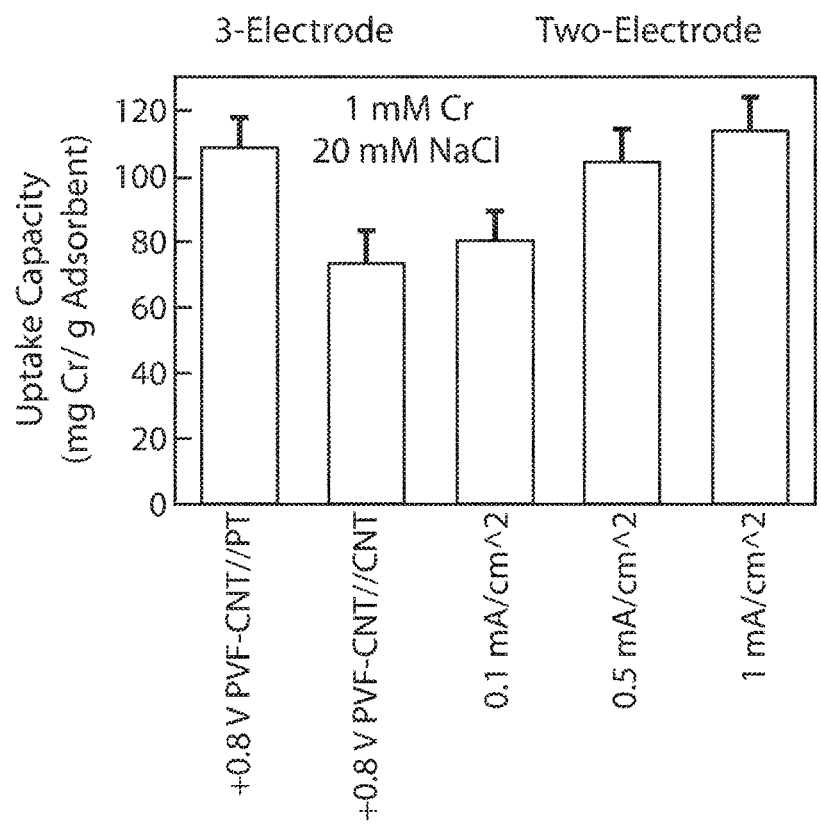
FIG. 16 shows a plot characterizing adsorption results of PVF-CNT working electrode at different electrode configurations, in 1 mM $(NH_4)_2Cr_2O_7$ in 20 mM NaCl, including a CNT counter and chronopotentiometric charging with a 2-electrode configuration, according to some embodiments.

FIG. 16 shows adsorption results of PVF-CNT working electrode at different electrode configurations, in 1 mM $(NH_4)_2Cr_2O_7$ in 20 mM NaCl, including a CNT counter and chronopotentiometric charging with a 2-electrode configuration.

Figure 17:
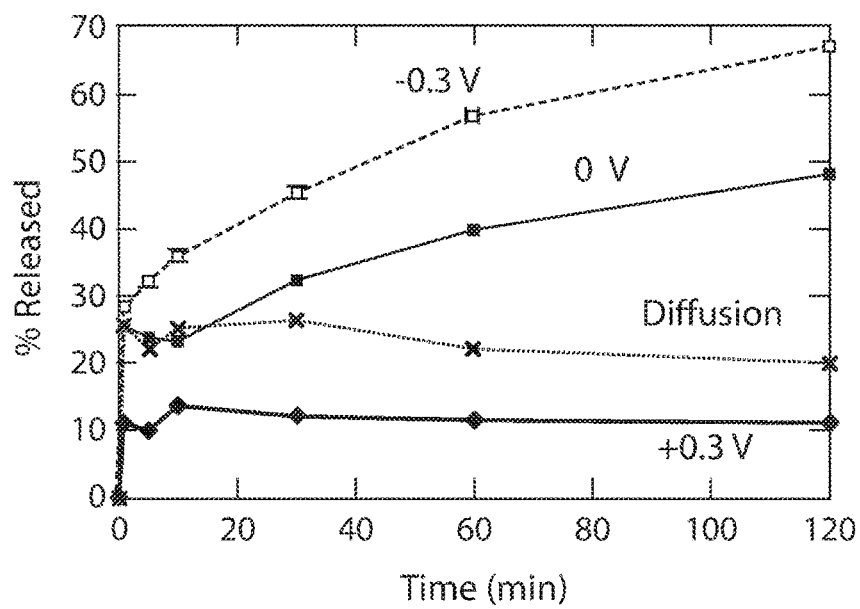
FIG. 17 shows a plot characterizing arsenic release kinetics with PVF-CNT in the presence of 20 mM NaCl at different potentials, after adsorption @+0.8 V in the presence of 1 mM $KH_2AsO_4$, according to some embodiments.

FIG. 17 shows arsenic Release Kinetics with PVF-CNT in the presence of 20 mM NaCl at different potentials, after adsorption @+0.8 V in the presence of 1 mM $KH_2AsO_4$.

Materials Characterization

A ZEISS Merlin High-Resolution SEM was used for the high resolution images in the main text, and the energy dispersive X-ray spectroscopy (EDS) was used to quantitate the amount of the different elements on the electrode. An accelerating voltage of 15-20 kV was used for the EDS measurements to ensure accurate capture of the iron and chromium peaks by EDS. The Physical Electronics Versaproble II X-ray Photoelectron spectrometer was used for the analysis of the surface of the electrodes.

Figure 18A:
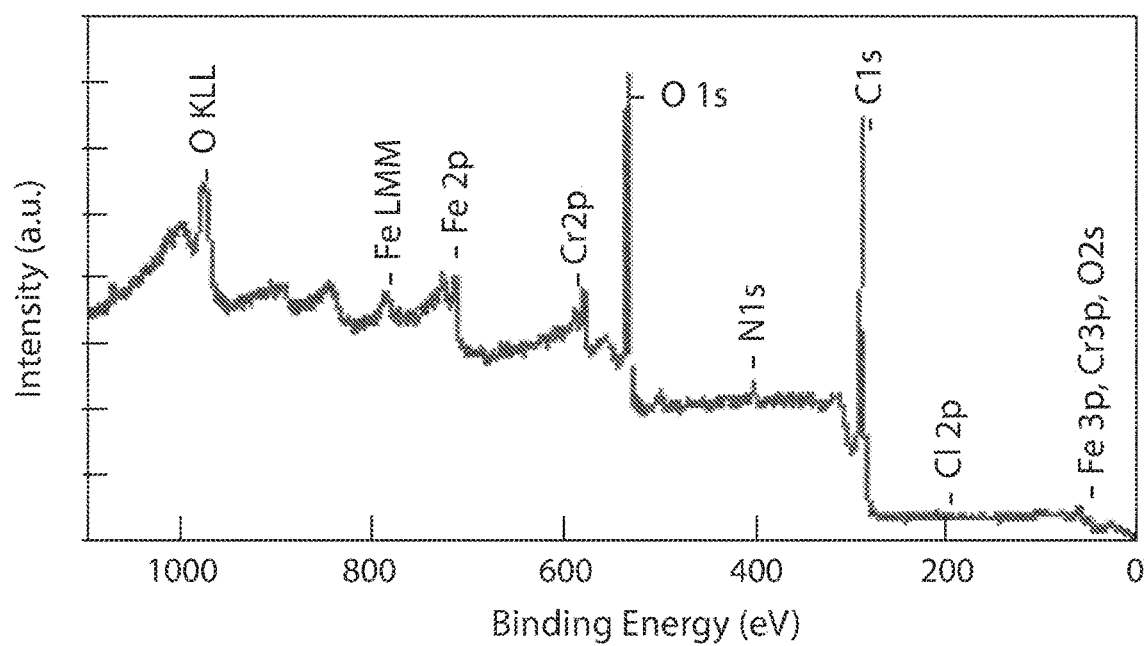
FIG. 18A shows an X-Ray Photoelectron Spectroscopy (XPS) survey scan for PVF-CNT after 10 mM dichromate adsorption, 20 mM $NaClO_4$ supporting electrolyte, for 60 min at +0.8 V, according to some embodiments.
Figure 18B:
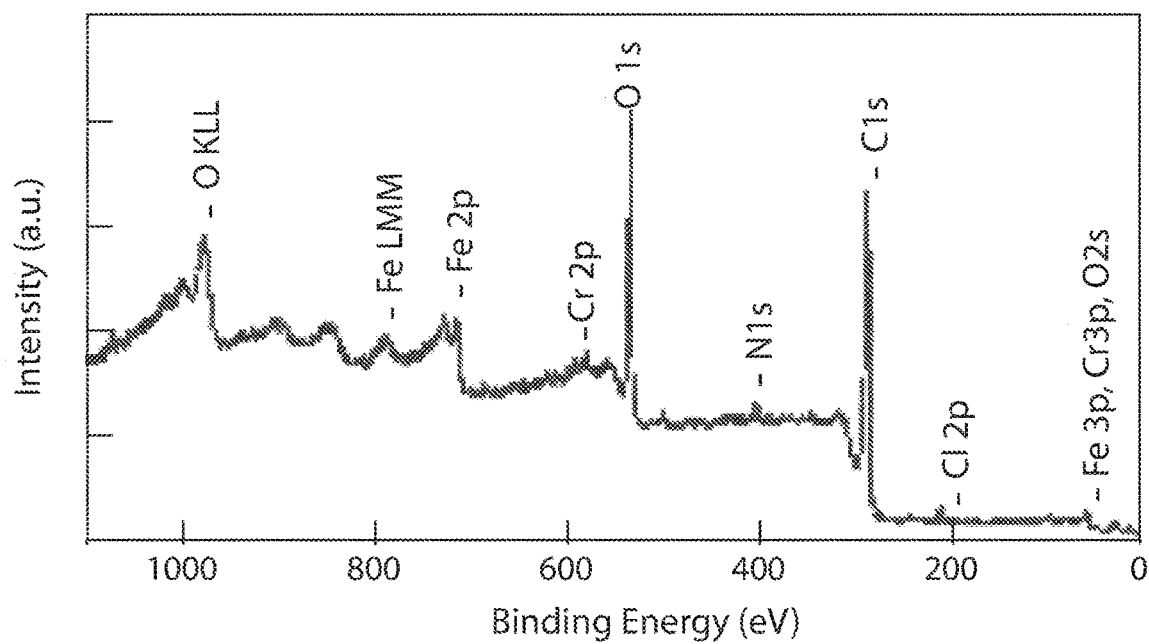
FIG. 18B shows an XPS survey scan for PVF-CNT after 1 mM dichromate adsorption, 20 mM $NaClO_4$ supporting electrolyte, according to some embodiments.
Figure 18C:
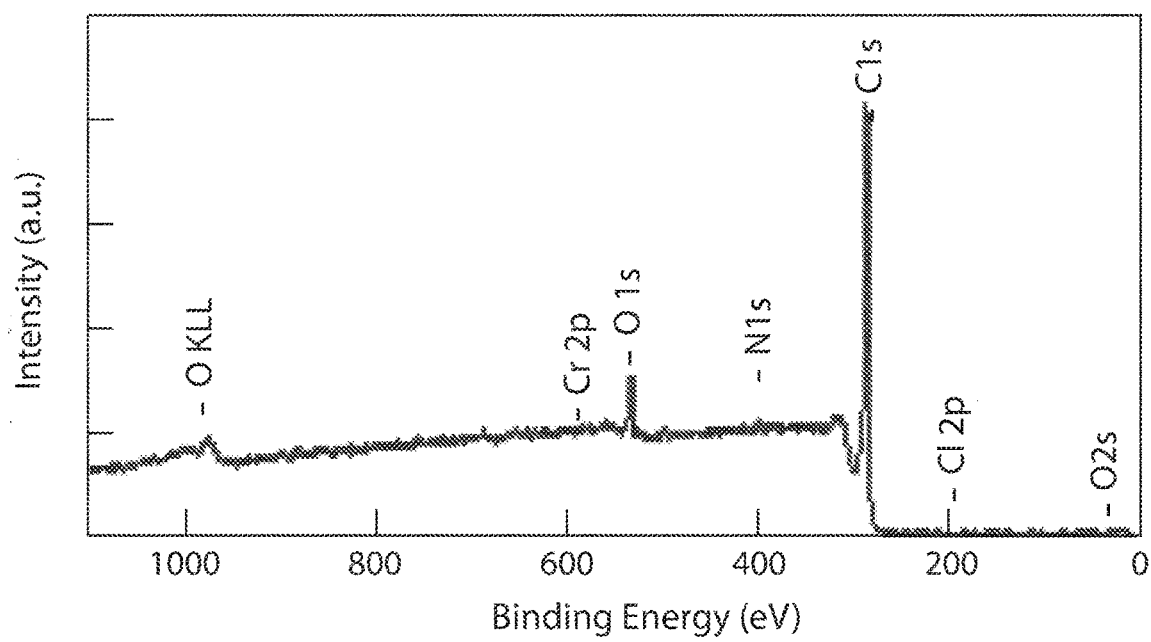
FIG. 18C shows an XPS survey scan for CNT after 10 mM dichromate adsorption, 20 mM $NaClO_4$ supporting electrolyte, according to some embodiments.
Figure 18D:
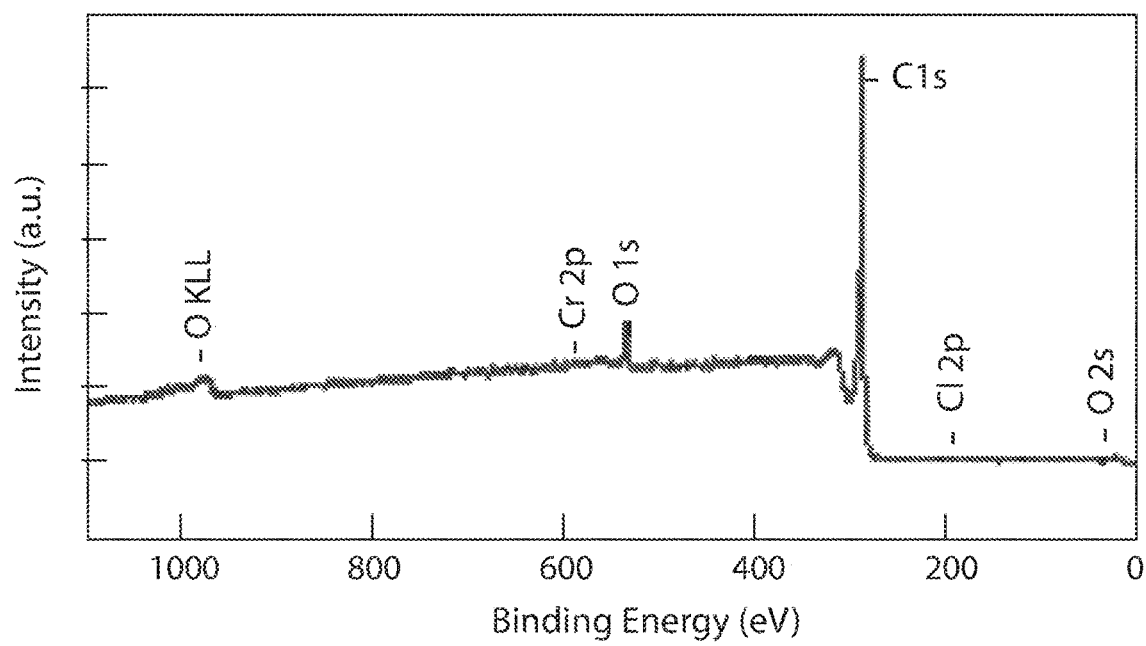
FIG. 18D shows an XPS survey scan for CNT after 1 mM dichromate adsorption, 20 mM $NaClO_4$ supporting electrolyte, according to some embodiments.
Figure 19A:
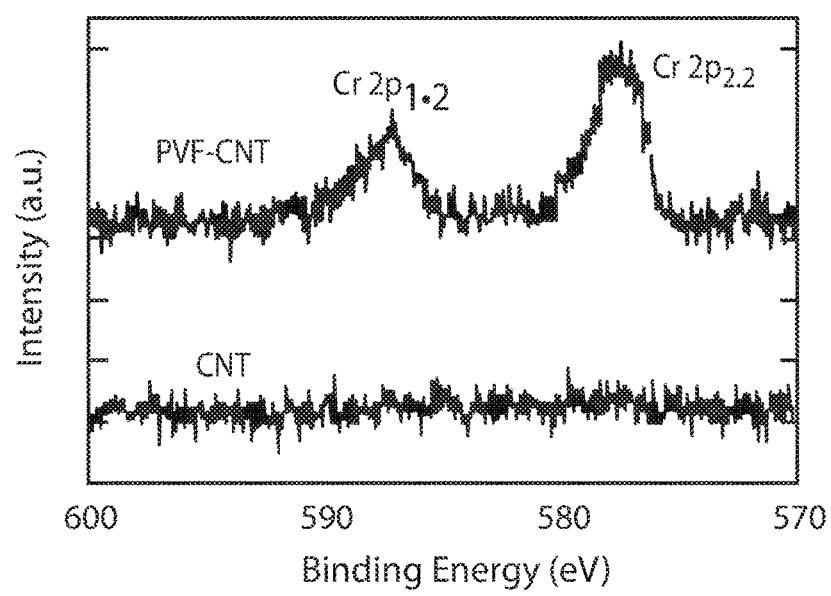
FIG. 19 shows a high resolution XPS analysis of the surface of PVF-CNT and CNT, both experiments after 1 mM dichromate adsorption, 20 mM $NaClO_4$ supporting electrolyte, depicted for different binding energy ranges in FIG. 19A-FIG. 19C, according to some embodiments.
Figure 19B:
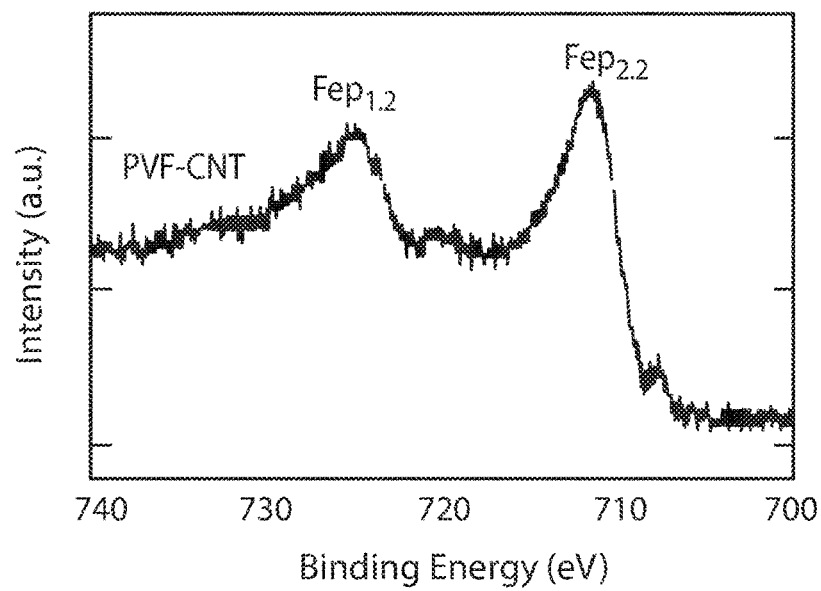
Figure 19C:
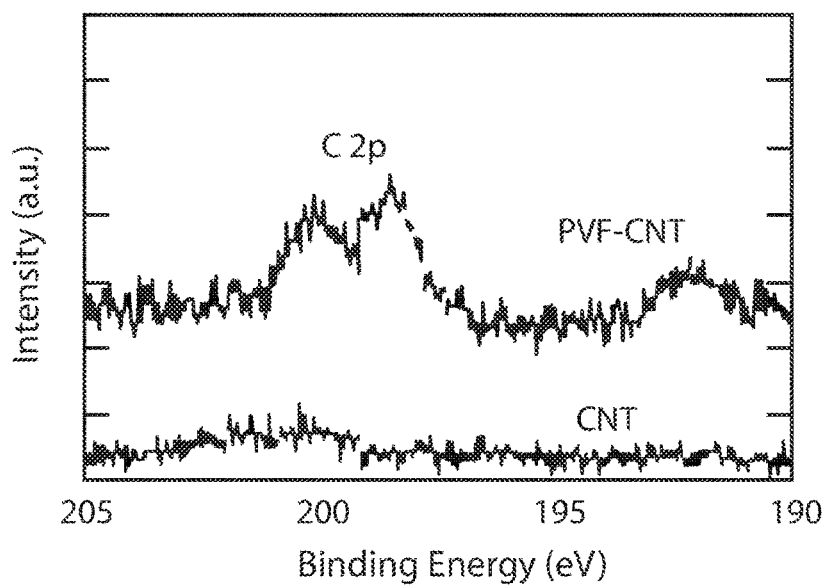

FIG. 18A shows: XPS survey scan for PVF-CNT after 10 mM dichromate adsorption, 20 mM $NaClO_4$ supporting electrolyte, for 60 min at +0.8 V. FIG. 18B shows: XPS survey scan for PVF-CNT after 1 mM dichromate adsorption, 20 mM $NaClO_4$ supporting electrolyte. FIG. 18C shows: XPS survey scan for CNT after 10 mM dichromate adsorption, 20 mM $NaClO_4$ supporting electrolyte. FIG. 18D shows: XPS survey scan for CNT after 1 mM dichromate adsorption, 20 mM $NaClO_4$ supporting electrolyte.

FIG. 19 shows: High resolution X-ray photoelectron spectroscopy analysis of the surface showed the presence of both Cr and Cl at the surface of PVF-CNT, while there was no Cr at the CNT surface, both experiments after 1 mM dichromate adsorption, 20 mM $NaClO_4$ supporting electrolyte. In addition, the fully oxidized state of ferrocene was noted from the Fe(III) peak for the PVF-CNT electrode.

Figure 20:
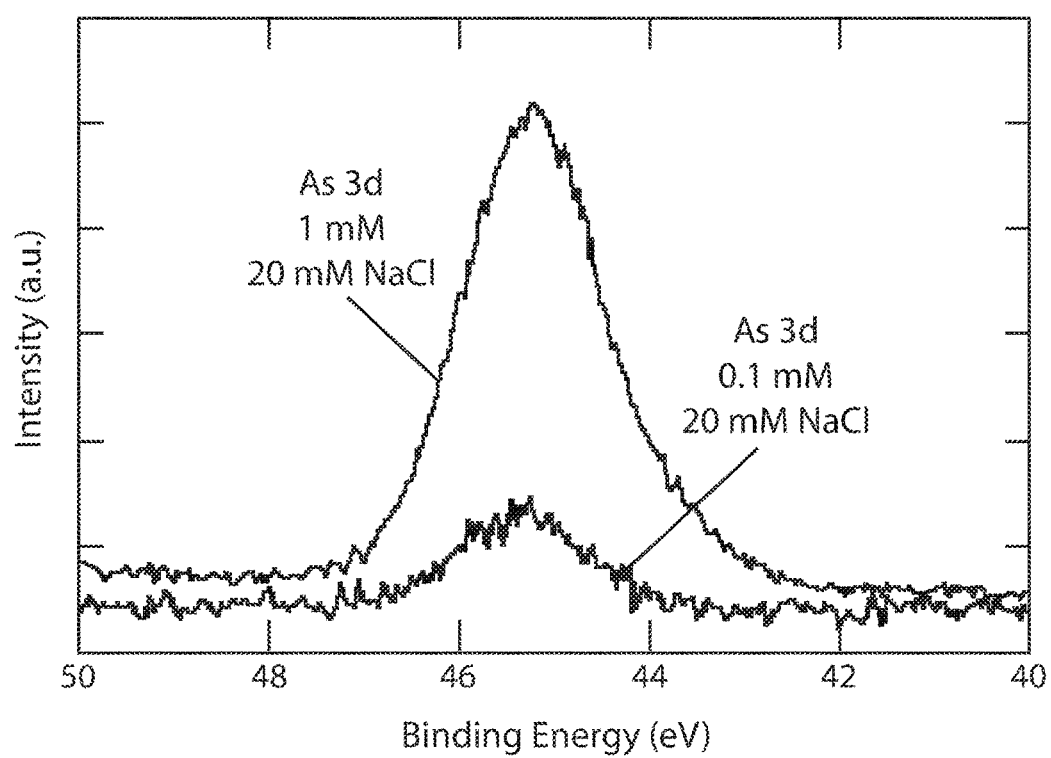
FIG. 20 shows a high resolution XPS analysis of the surface of PVF-CNT after 1 mM $HAsO_4^{2-}$ adsorption in 20 mM NaCl, for 60 min charging at +0.8 V, according to some embodiments.

FIG. 20 shows: High resolution X-ray photoelectron spectroscopy analysis of the surface of PVF-CNT after 1 mM $HAsO_4^{2-}$ adsorption in 20 mM NaCl, for 60 min charging at +0.8 V.

Measurements of pH

FIG. 21 shows: Solution pH before, after adsorption and after release of chromium (for a swing of 30 min adsorption at +0.8 V vs Ag/AgCl, 30 min release at +0 V vs Ag/AgCl).

FIG. 22 shows: Solution pH after electrosorption of the adsorption stock (in blue), at +0.8 V vs Ag/AgCl in 1 mM dichromate, 20 mM $NaClO_4$ for 30 min. Solution pH of the release solution (20 mM $NaClO_4$) for 30 min (in red). An increase in hydroxides was seen during charging and an increase in protons was seen during discharge.

Figure 23:
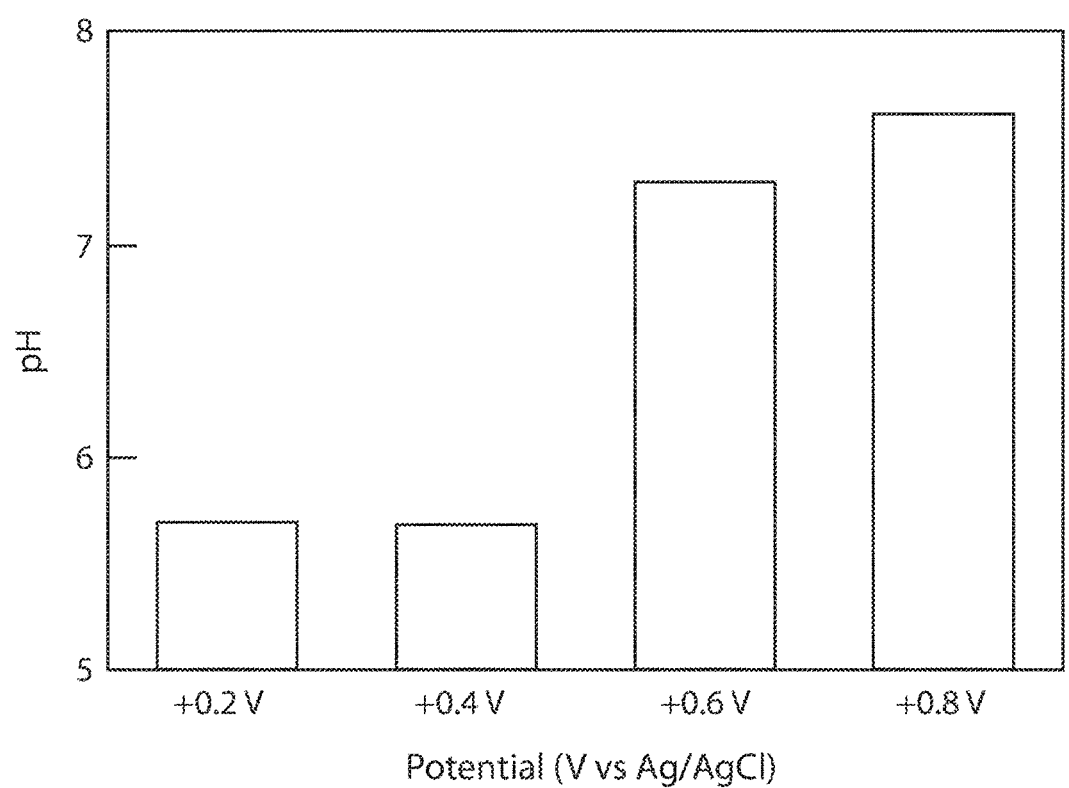
FIG. 23 shows a plot characterizing solution pH after electrochemical adsorption @ 1 mM dichromate, 20 mM $NaClO_4$, for 60 min using PVF-CNT, according to some embodiments.

FIG. 23 shows: Solution pH after electrochemical adsorption @ 1 mM dichromate, 20 mM $NaClO_4$, for 60 min using PVF-CNT.

Electronic Structure Calculation Results

TABLE S1

Summary of parameters from electronic structure calculations.

| | $Cl^-$ | $ClO_4^-$ | $CrO_4^{2-}$ | $HCrO_4^-$ | $Cr_2O_7^{2-}$ | $HAsO_4^{2-}$ | $H_2AsO_4^-$ |
|---|---|---|---|---|---|---|---|
| B.E. (kcal/mol) | 0.02 | 0.02 | 1.62 | 0.88 | 1.23 | 0.91 | 0.72 |
| $d_{O-H}$ (Å) | 2.65 | 2.51 | 2.37 | 2.38 | 2.27 | 2.27 | 2.41 |
| $\Delta Q$ (\|e\|) | 0.10 | 0.02 | 0.30 | 0.03 | 0.15 | 0.42 | 0.06 |
| I.P. (eV) | 7.29 | 7.27 | 5.61 | 6.80 | 6.60 | 5.20 | 6.26 |

Figure 24:
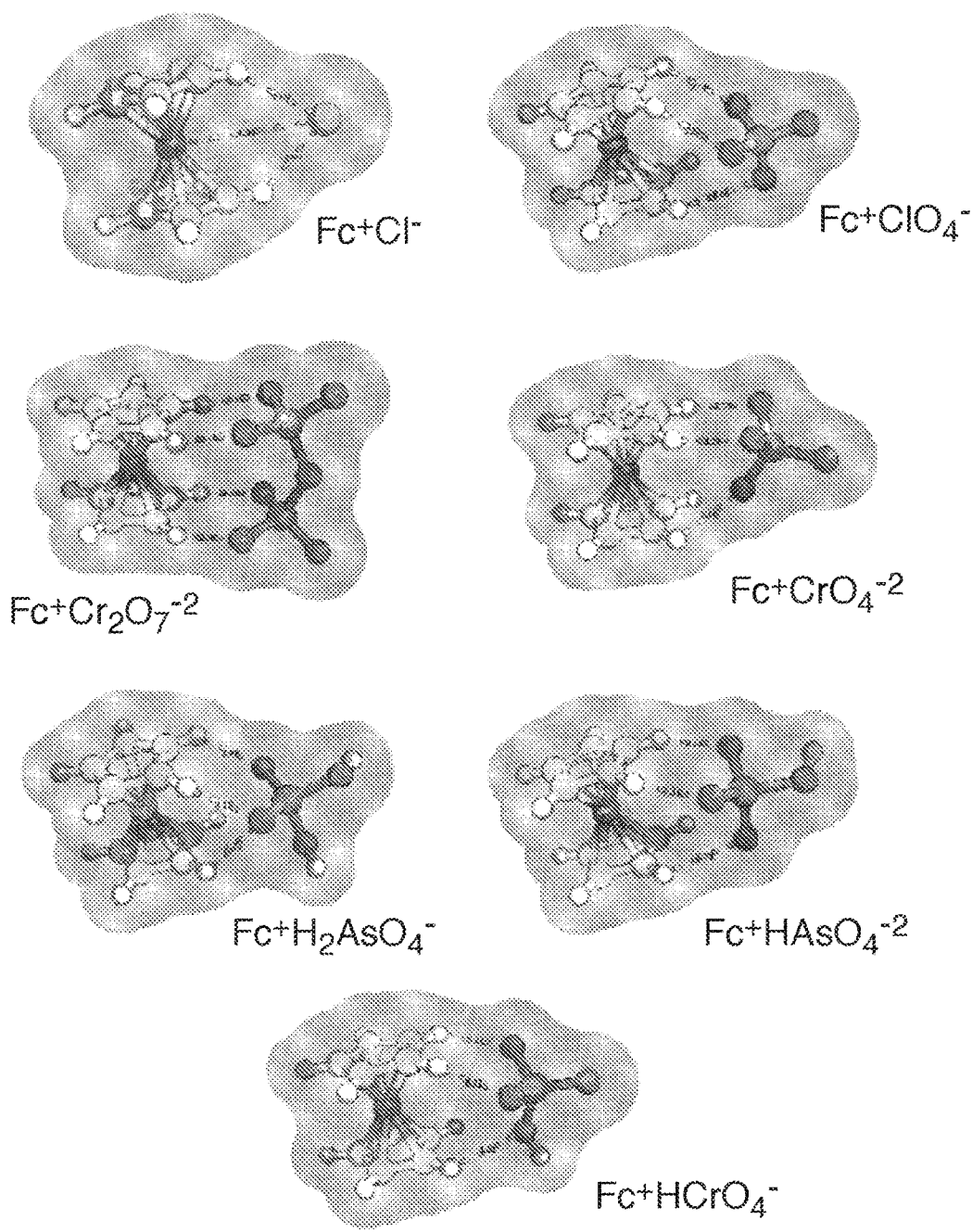
FIG. 24 shows a summary of schematic diagrams of optimized geometries (with solvation correction) between ferrocenium and the various anions, according to some embodiments.

FIG. 24 shows: Summary of optimized geometries (with solvation correction) between ferrocenium and the various anions.

TABLE S2

Detailed xyz coordinates for optimized geometries.
Coordinates (xyz, in Å)

Fc-Cl

| | | | |
|---|---|---|---|
| H | 6.505 | 10.162 | 11.181 |
| H | 8.154 | 8.027 | 11.459 |
| H | 10.696 | 8.944 | 11.576 |
| H | 10.636 | 11.625 | 11.424 |
| H | 8.049 | 12.406 | 11.162 |
| H | 6.664 | 10.003 | 8.033 |
| H | 8.348 | 7.878 | 8.105 |
| H | 10.882 | 8.821 | 8.163 |
| H | 10.788 | 11.504 | 8.077 |
| H | 8.182 | 12.263 | 8.012 |
| C | 7.585 | 10.200 | 11.296 |
| C | 8.456 | 9.071 | 11.458 |
| C | 9.793 | 9.554 | 11.556 |
| C | 9.767 | 10.974 | 11.437 |
| C | 8.400 | 11.385 | 11.284 |
| C | 7.749 | 10.047 | 8.023 |
| C | 8.640 | 8.923 | 8.046 |
| C | 9.977 | 9.416 | 8.040 |
| C | 9.929 | 10.841 | 8.033 |
| C | 8.551 | 11.241 | 8.014 |
| Fe | 8.890 | 10.163 | 9.719 |
| Cl | 12.752 | 8.290 | 9.965 |

Fc-ClO$_4$

| | | | |
|---|---|---|---|
| H | 6.100 | 9.594 | 11.130 |
| H | 7.755 | 7.445 | 11.375 |
| H | 10.281 | 8.382 | 11.680 |
| H | 10.200 | 11.057 | 11.645 |
| H | 7.633 | 11.834 | 11.298 |
| H | 6.418 | 9.689 | 7.968 |
| H | 7.916 | 7.422 | 8.127 |
| H | 10.515 | 8.157 | 8.292 |
| H | 10.646 | 10.832 | 8.237 |
| H | 8.127 | 11.809 | 8.041 |
| C | 7.174 | 9.625 | 11.292 |
| C | 8.047 | 8.490 | 11.430 |
| C | 9.377 | 8.982 | 11.620 |
| C | 9.334 | 10.403 | 11.600 |
| C | 7.981 | 10.810 | 11.394 |
| C | 7.502 | 9.639 | 8.024 |
| C | 8.294 | 8.441 | 8.095 |
| C | 9.668 | 8.825 | 8.158 |
| C | 9.737 | 10.245 | 8.133 |
| C | 8.405 | 10.758 | 8.053 |
| Fe | 8.544 | 9.626 | 9.779 |
| O | 13.087 | 9.394 | 8.407 |
| O | 14.427 | 9.167 | 10.377 |
| O | 12.414 | 10.451 | 10.441 |
| O | 12.308 | 8.068 | 10.235 |
| Cl | 13.061 | 9.271 | 9.866 |

Fc-CrO$_4^-$

| | | | |
|---|---|---|---|
| H | 5.913 | 9.651 | 11.263 |
| H | 7.480 | 7.455 | 11.362 |
| H | 10.080 | 8.287 | 11.397 |
| H | 10.104 | 10.964 | 11.337 |
| H | 7.506 | 11.834 | 11.258 |
| H | 6.002 | 9.702 | 7.981 |
| H | 7.467 | 7.434 | 8.048 |
| H | 10.092 | 8.146 | 8.144 |
| H | 10.233 | 10.832 | 8.103 |
| H | 7.693 | 11.809 | 7.984 |
| C | 6.998 | 9.648 | 11.343 |
| C | 7.826 | 8.485 | 11.386 |
| C | 9.189 | 8.915 | 11.395 |
| C | 9.202 | 10.354 | 11.355 |
| C | 7.841 | 10.802 | 11.325 |
| C | 7.087 | 9.646 | 7.957 |
| C | 7.862 | 8.446 | 8.003 |
| C | 9.242 | 8.815 | 8.054 |

TABLE S2-continued

Detailed xyz coordinates for optimized geometries.
Coordinates (xyz, in Å)

| | | | |
|---|---|---|---|
| C | 9.317 | 10.253 | 8.036 |
| C | 7.981 | 10.761 | 7.974 |
| Fe | 8.283 | 9.614 | 9.684 |
| O | 12.015 | 9.404 | 9.326 |
| O | 14.481 | 9.383 | 10.457 |
| O | 12.447 | 10.776 | 11.641 |
| O | 12.415 | 8.040 | 11.650 |
| Cr | 12.841 | 9.400 | 10.780 |

Fc-HCrO$_4$

| | | | |
|---|---|---|---|
| H | 5.582 | 9.676 | 10.978 |
| H | 7.163 | 7.517 | 11.459 |
| H | 9.668 | 8.424 | 11.991 |
| H | 9.645 | 11.086 | 11.871 |
| H | 7.129 | 11.901 | 11.233 |
| H | 6.229 | 9.649 | 7.867 |
| H | 7.714 | 7.399 | 8.220 |
| H | 10.279 | 8.158 | 8.645 |
| H | 10.403 | 10.823 | 8.563 |
| H | 7.906 | 11.785 | 8.084 |
| H | 13.119 | 8.967 | 8.770 |
| C | 6.634 | 9.699 | 11.251 |
| C | 7.467 | 8.558 | 11.517 |
| C | 8.779 | 9.033 | 11.829 |
| C | 8.767 | 10.454 | 11.754 |
| C | 7.449 | 10.875 | 11.397 |
| C | 7.302 | 9.609 | 8.035 |
| C | 8.089 | 8.419 | 8.208 |
| C | 9.445 | 8.815 | 8.413 |
| C | 9.509 | 10.236 | 8.374 |
| C | 8.189 | 10.738 | 8.143 |
| Fe | 8.154 | 9.643 | 9.890 |
| O | 12.593 | 9.608 | 9.288 |
| O | 14.260 | 9.112 | 11.485 |
| O | 12.020 | 10.578 | 11.806 |
| O | 11.862 | 7.914 | 11.424 |
| Cr | 12.691 | 9.285 | 11.062 |

Fc-Cr$_2$O$_7^-$

| | | | |
|---|---|---|---|
| H | 5.948 | 9.716 | 11.531 |
| H | 7.518 | 7.504 | 11.368 |
| H | 10.098 | 8.344 | 11.058 |
| H | 10.121 | 10.997 | 11.019 |
| H | 7.556 | 11.894 | 11.310 |
| H | 5.507 | 9.646 | 8.393 |
| H | 7.095 | 7.451 | 8.171 |
| H | 9.650 | 8.321 | 7.753 |
| H | 9.639 | 10.974 | 7.709 |
| H | 7.081 | 11.842 | 8.106 |
| C | 7.030 | 9.705 | 11.429 |
| C | 7.862 | 8.535 | 11.350 |
| C | 9.217 | 8.969 | 11.196 |
| C | 9.230 | 10.395 | 11.179 |
| C | 7.883 | 10.857 | 11.319 |
| C | 6.575 | 9.646 | 8.190 |
| C | 7.415 | 8.484 | 8.066 |
| C | 8.751 | 8.934 | 7.822 |
| C | 8.745 | 10.360 | 7.798 |
| C | 7.407 | 10.808 | 8.029 |
| Fe | 8.007 | 9.668 | 9.638 |
| O | 13.739 | 9.398 | 9.519 |
| O | 13.876 | 9.401 | 6.748 |
| O | 11.905 | 10.792 | 7.930 |
| O | 11.840 | 8.105 | 7.927 |
| O | 12.285 | 8.132 | 11.551 |
| O | 14.582 | 9.378 | 12.158 |
| O | 12.408 | 10.816 | 11.530 |
| Cr | 12.810 | 9.426 | 7.991 |
| Cr | 13.235 | 9.432 | 11.235 |

Fc-HAsO$_4^-$

| | | | |
|---|---|---|---|
| H | 14.847 | 11.015 | 11.202 |
| H | 5.944 | 9.757 | 11.401 |
| H | 7.605 | 7.609 | 11.547 |
| H | 10.169 | 8.566 | 11.725 |
| H | 10.094 | 11.195 | 11.705 |
| H | 7.477 | 11.999 | 11.519 |

TABLE S2-continued

Detailed xyz coordinates for optimized geometries.
Coordinates (xyz, in Å)

| | | | |
|---|---|---|---|
| H | 6.210 | 9.765 | 8.161 |
| H | 7.851 | 7.599 | 8.304 |
| H | 10.408 | 8.519 | 8.509 |
| H | 10.363 | 11.165 | 8.492 |
| H | 7.769 | 11.991 | 8.274 |
| C | 7.024 | 9.789 | 11.516 |
| C | 7.903 | 8.653 | 11.604 |
| C | 9.242 | 9.141 | 11.731 |
| C | 9.200 | 10.567 | 11.721 |
| C | 7.835 | 10.974 | 11.589 |
| C | 7.295 | 9.785 | 8.222 |
| C | 8.163 | 8.640 | 8.288 |
| C | 9.509 | 9.115 | 8.374 |
| C | 9.484 | 10.539 | 8.366 |
| C | 8.120 | 10.962 | 8.273 |
| Fe | 8.351 | 9.818 | 9.967 |
| O | 12.715 | 10.004 | 8.800 |
| O | 12.261 | 11.440 | 11.230 |
| O | 12.415 | 8.567 | 11.221 |
| O | 14.701 | 10.132 | 10.808 |
| As | 12.882 | 10.033 | 10.493 |
| Fc-H$_2$AsO$_4$ | | | |
| H | 13.615 | 9.136 | 8.570 |
| H | 14.554 | 11.054 | 11.327 |
| H | 5.692 | 9.752 | 11.387 |
| H | 7.359 | 7.605 | 11.567 |
| H | 9.898 | 8.571 | 11.888 |
| H | 9.781 | 11.226 | 11.944 |
| H | 7.196 | 11.990 | 11.648 |
| H | 6.126 | 9.774 | 8.139 |
| H | 7.750 | 7.602 | 8.409 |
| H | 10.291 | 8.515 | 8.736 |
| H | 10.239 | 11.192 | 8.650 |
| H | 7.684 | 11.989 | 8.271 |
| C | 6.763 | 9.784 | 11.563 |
| C | 7.645 | 8.649 | 11.657 |
| C | 8.975 | 9.147 | 11.866 |
| C | 8.911 | 10.571 | 11.909 |
| C | 7.556 | 10.967 | 11.720 |
| C | 7.206 | 9.789 | 8.249 |
| C | 8.064 | 8.642 | 8.393 |
| C | 9.410 | 9.120 | 8.535 |
| C | 9.384 | 10.543 | 8.471 |
| C | 8.032 | 10.960 | 8.300 |
| Fe | 8.167 | 9.819 | 10.063 |
| O | 13.241 | 10.023 | 8.753 |
| O | 11.817 | 11.467 | 10.628 |
| O | 12.029 | 8.535 | 10.846 |
| O | 14.212 | 10.140 | 11.409 |
| As | 12.666 | 10.035 | 10.472 |

Adsorption and Recovery of Vanadium

Figure 25A:
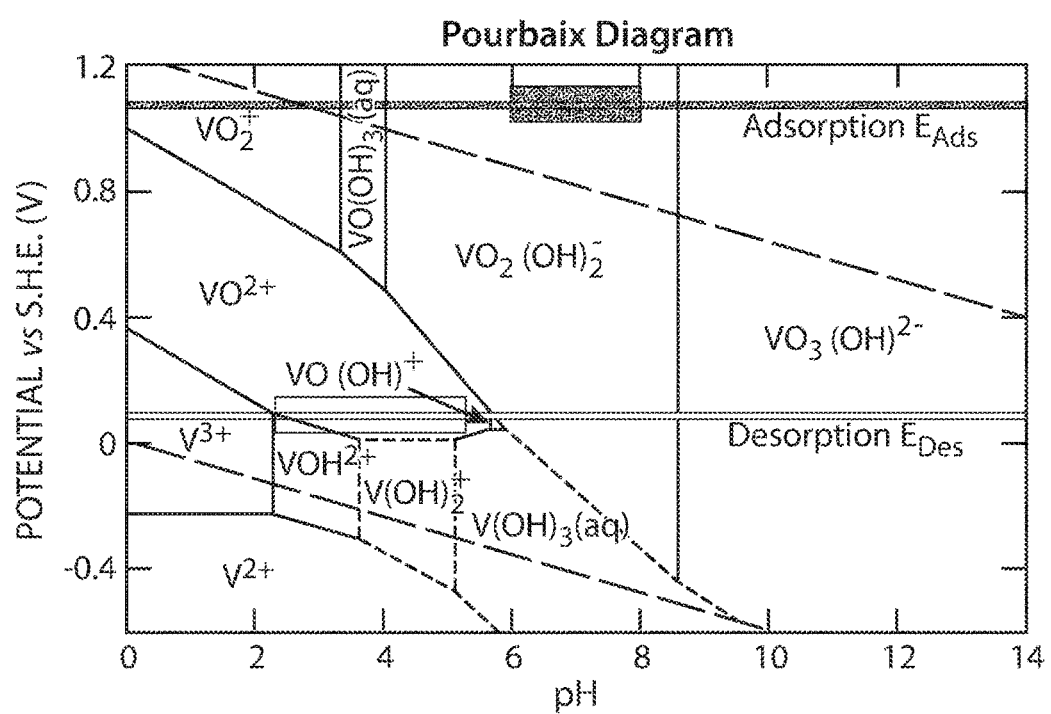
FIG. 25A shows a Pourbaix diagram for vanadium speciation predominance, according to some embodiments.
Figure 25B:
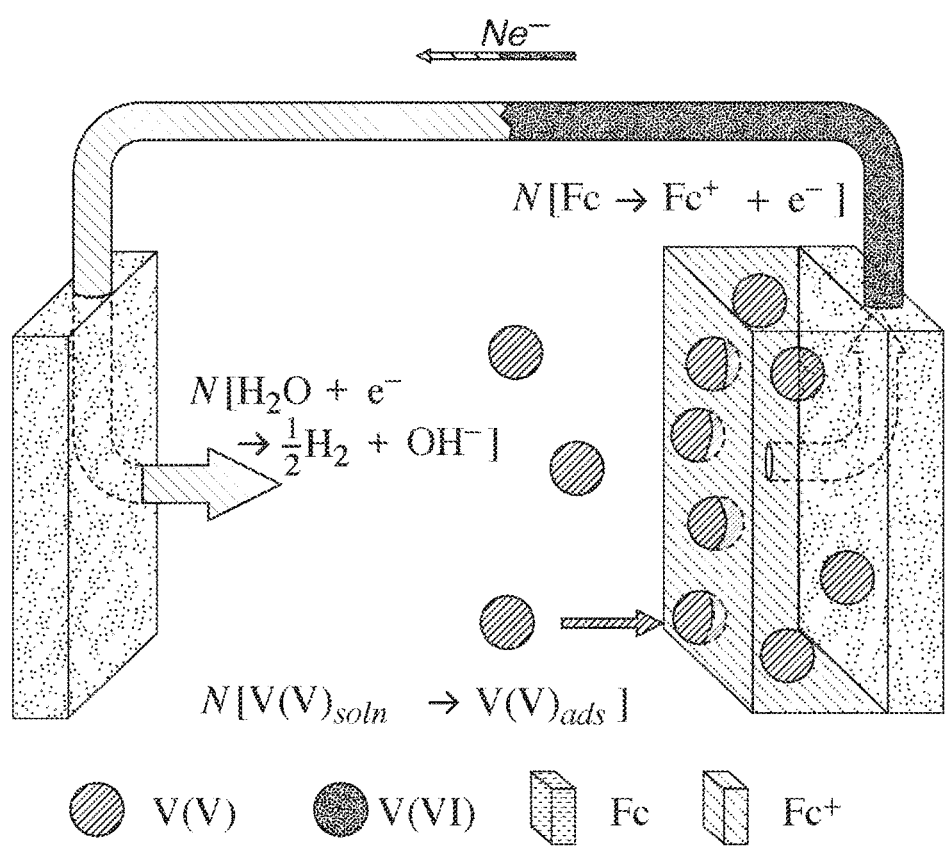
FIG. 25B shows a schematic diagram indicating Faradaic reactions occurring at the surface of an electrode pair, shown during adsorption of vanadium ion(s) on an electrode comprising PVF, according to some embodiments.
Figure 25C:
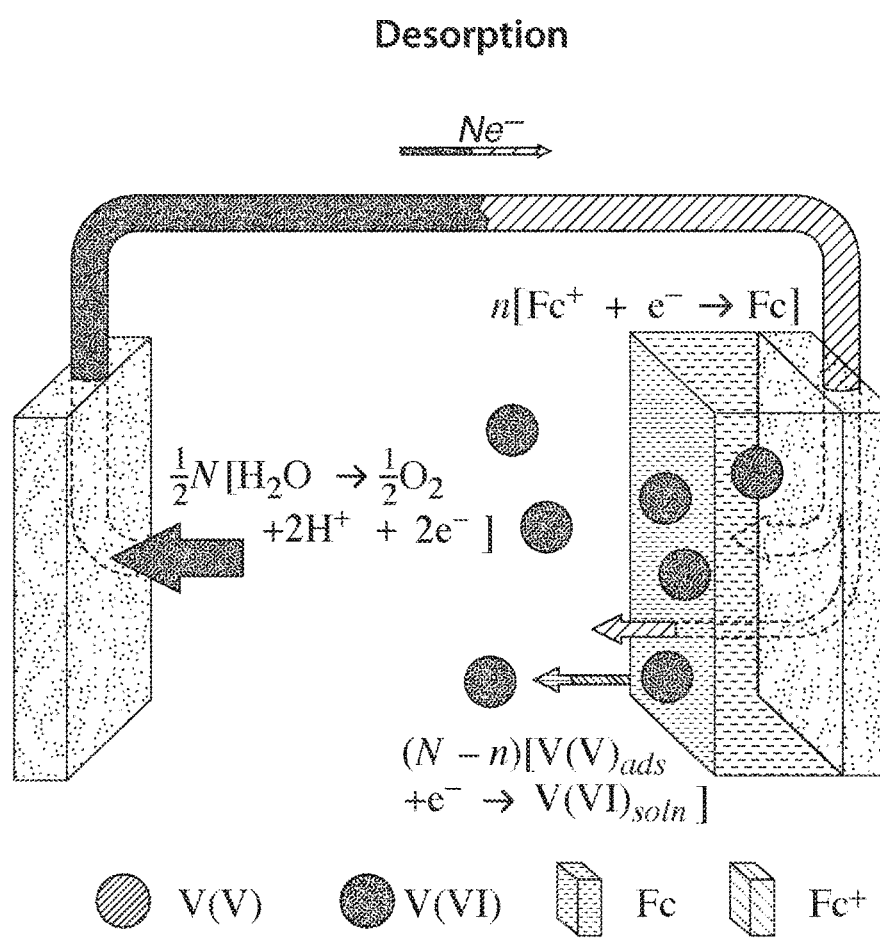
FIG. 25C shows a schematic diagram indicating Faradaic reactions occurring at the surface of an electrode pair, shown during desorption of vanadium ion(s) from an electrode comprising PVF, according to some embodiments.

The selective asymmetrical electrodes of this study were used to manipulate pH, change oxidation state, and control adsorption and desorption of competing metal ions during leaching processes. Work in this study on chromium and arsenic, elsewhere in this example, demonstrated fast kinetics, high capacity, selective adsorption, and an opportunity to manipulate oxidation state and speciation of heavy metal oxyanions. Vanadium was adsorbed under neutral to basic conditions as V(V) and released in acidic conditions as V(VI). Schematic diagrams of a proposed vanadium mechanism are depicted in FIG. 25B-FIG. 25C. FIG. 25A shows a Pourbaix diagram for vanadium speciation predominance, according to some embodiments.

Figure 25D:
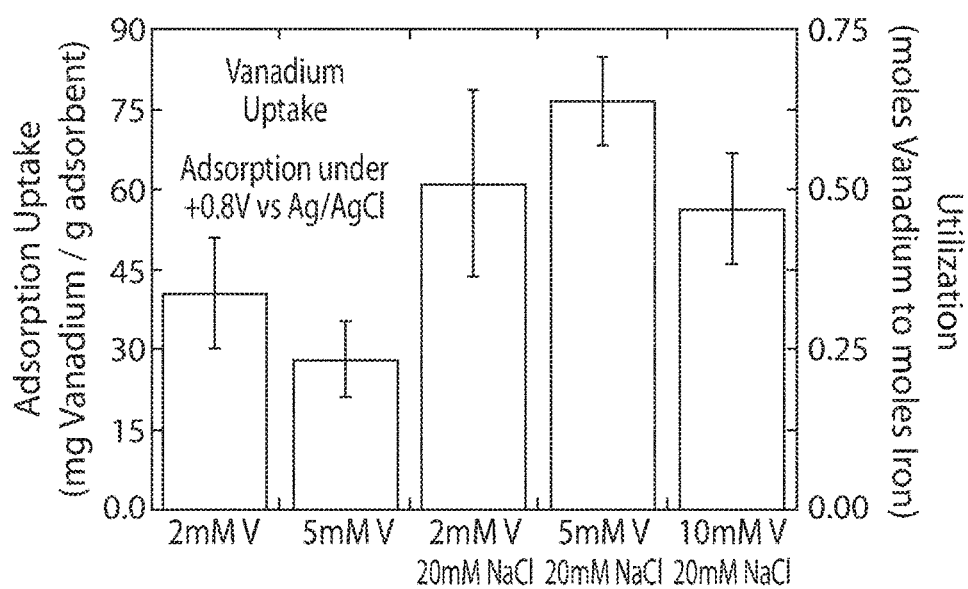
FIG. 25D is a plot characterizing adsorption uptake of vanadium ion(s) under different conditions, according to some embodiments.
Figure 25E:
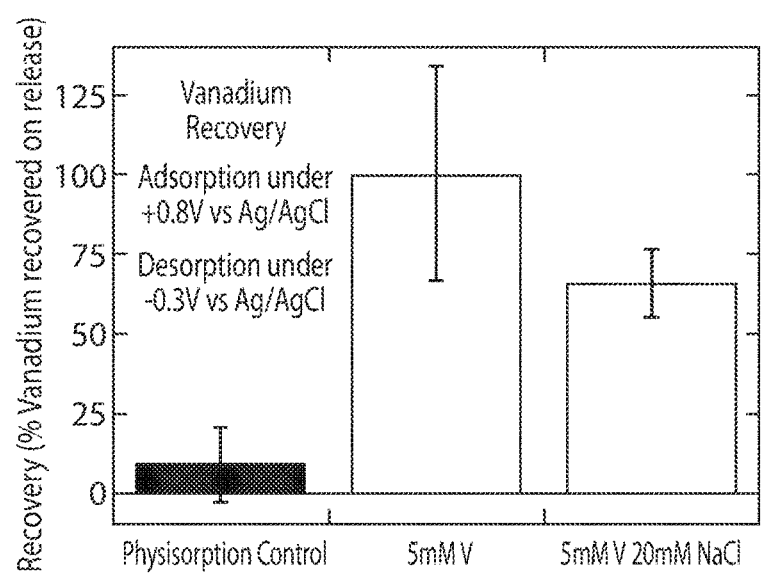
FIG. 25E is a plot characterizing recovery percentage of vanadium ion(s) on release under different conditions, according to some embodiments.

FIG. 25D is a plot characterizing adsorption uptake of vanadium under different conditions, in accordance with certain embodiments. FIG. 25E is a plot characterizing recovery percentage of vanadium on release under different conditions, in accordance with certain embodiments. Initial preliminary results with vanadium indicated high adsorption uptake and recovery, with and without competing electrolyte.

FIG. 26 is a table indicating anions (e.g., oxyanions) that exist and could be adsorbed by electrodes of this study under neutral pH. Oxyanions of certain metals exist under more acidic or basic conditions, which could be exploited. Adsorption and desorption potentials are variable within limits and could be changed with redox active materials other than ferrocene. Competing anions that may be relevant in vanadium leaching include but are not limited to $SO_4^{2-}$, $CO_3^{2-}$, $AlO^{2-}$, $PO_4^{3-}$, $CrO_4^{2-}$, $FeO_4^{2-}$, $MnO_4^{2-}$. Differences in the intrinsic electronegativity of each anion could be used to adsorb selectively and desorb selectively. Finally, pH could be manipulated via the cathode to stabilize different speciations. The columns labeled "State Prior" and "State After" in FIG. 26 refer to the possible oxidation state(s) before capture and after release respectively. In these two right-most columns of FIG. 26, a dash represents no change in oxidation state expected, e.g., for Arsenic (As). In these two right-most columns of FIG. 26, a number represents an expected change from one oxidation state to another. In the case of Antimony (Sb) & Vanadium (V), a change in oxidation state may or may not occur (to 4 or 5 respectively), depending on conditions. The oxidation state an anion takes on release may depend on the pH, applied potential, and/or other conditions.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
applying an electrical potential across a first electrode comprising a first conductive substrate and a first redox species immobilized to the first conductive substrate and a second electrode, such that a target species comprising a heavy metal, a transition metal, and/or a metalloid is adsorbed on the first electrode based on a specific chemical interaction between the first redox species and the target species;
splitting water at the second electrode;
electrochemically transforming the target species by reduction; and
releasing the target species from the first electrode such that, after the release, the heavy metal, the transition metal, and/or the metalloid has an oxidation state that is different from the oxidation state of the heavy metal, transition metal, and/or metalloid just prior to the adsorption of the target species on the first electrode,
wherein splitting the water at the second electrode comprises generating protons and lowering a pH of a fluid in contact with the first electrode, and wherein electrochemically transforming the target species by reduction comprises reducing the target species using the protons as a co-reagent.

2. A method, comprising:
applying an electrical potential across a first electrode comprising a first conductive substrate and a first redox species immobilized to the first conductive substrate and a second electrode, such that a target species comprising a heavy metal, a transition metal, and/or a metalloid is adsorbed on the first electrode;
splitting water at the second electrode;
electrochemically transforming the target species by reduction; and
releasing the target species from the first electrode such that, after the release, an atom of the target species has an oxidation state that is different from the oxidation state of that atom just prior to the adsorption of the target species on the first electrode,
wherein splitting the water at the second electrode comprises generating protons and lowering a pH of a fluid in contact with the first electrode, and wherein electrochemically transforming the target species by reduction comprises reducing the target species using the protons as a co-reagent.

3. The method of claim 2, wherein the target species comprises As, Sb, Tc, Cr, Mo, W, and/or V.

4. The method of claim 2, wherein the target species comprises As, Cr, and/or V.

5. The method of claim 2, further comprising contacting the first electrode with the fluid, wherein the fluid comprises the target species.

6. The method of claim 5, wherein the target species is at a concentration of between or equal to 10,000 ppb and 100 ppb in the fluid prior to applying the electrical potential.

7. The method of claim 2, wherein releasing the target species comprises applying a second electrical potential to the first electrode such that the target species is released from the first electrode.

8. The method of claim 2, wherein the target species comprises any ionic variation of hexavalent chromium (VI).

9. The method of claim 8, wherein the hexavalent chromium (VI) is present as $Cr_2O_7^{2-}$, $CrO_4^{2-}$, and/or $HCrO_4^-$.

10. The method of claim 2, wherein the target species comprises Cr(VI) just prior to its adsorption on the first electrode, and, after the target species has been released from the first electrode, the target species comprises Cr(III).

11. The method of claim 2, wherein the electrical potential is less than 1.2 V vs. a standard hydrogen electrode.

12. The method of claim 2, further comprising altering the pH of the fluid in contact with the first electrode, such that the fluid has a first pH value prior to the adsorption of the target species on the first electrode and the fluid has a second pH value after the release of the target species.

13. The method of claim 12, wherein the first pH value is different from the second pH value by at least 0.5 pH units.

14. The method of claim 12, wherein the first pH value is higher than the second pH value.

15. The method of claim 2, wherein electrochemically transforming the target species by reduction comprises electrochemically transforming the heavy metal, the transition metal, and/or the metalloid from a positive oxidation state to a lower positive oxidation state.

16. A method, comprising:
applying an electrical potential across a first electrode comprising a first conductive substrate and a first redox species immobilized to the first conductive substrate and a second electrode, such that a target species comprising a heavy metal, a transition metal, and/or a metalloid is adsorbed on the first electrode, wherein the first redox species comprises an organometallic compound comprising at least one metal-carbon bond;

splitting water at the second electrode;
electrochemically transforming the heavy metal, the transition metal, and/or the metalloid from a positive oxidation state to a lower positive oxidation state; and
releasing the target species from the first electrode,
wherein splitting the water at the second electrode comprises generating protons and lowering a pH of a fluid in contact with the first electrode, and wherein electrochemically transforming the heavy metal, the transition metal, and/or the metalloid from a positive oxidation state to a lower positive oxidation state comprises reducing the heavy metal, the transition metal, and/or the metalloid using the protons as a co-reagent.

17. The method of claim 16, wherein the first redox species comprises a metallocene.

18. The method of claim 16, wherein the first redox species comprises polyvinyl(ferrocene).

* * * * *